United States Patent
Morikuni

(10) Patent No.: US 11,422,453 B2
(45) Date of Patent: *Aug. 23, 2022

(54) LENS AND PROJECTION-TYPE IMAGE DISPLAY APPARATUS

(71) Applicant: SEIKO EPSON CORPORATION, Tokyo (JP)

(72) Inventor: Eiji Morikuni, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 463 days.

This patent is subject to a terminal disclaimer.

(21) Appl. No.: 16/522,749

(22) Filed: Jul. 26, 2019

(65) Prior Publication Data

US 2020/0033714 A1 Jan. 30, 2020

(30) Foreign Application Priority Data

Jul. 27, 2018 (JP) .............................. JP2018-141033

(51) Int. Cl.
*G03B 21/28* (2006.01)
*G02B 13/18* (2006.01)
(Continued)

(52) U.S. Cl.
CPC .............. *G03B 21/28* (2013.01); *G02B 7/02* (2013.01); *G02B 13/18* (2013.01);
(Continued)

(58) Field of Classification Search
CPC .... G02B 13/16; G02B 13/18; G02B 17/0804; G02B 17/0812; G02B 17/0856;
(Continued)

(56) References Cited

U.S. PATENT DOCUMENTS 6,201,646 B1* 3/2001 Togino ............... G02B 17/0848
359/629
6,510,006 B1* 1/2003 Togino ............... A61B 1/00163
348/65
(Continued)

FOREIGN PATENT DOCUMENTS

CN 101430484 A 5/2009
EP 1494057 A2 1/2005
(Continued)

OTHER PUBLICATIONS

Jan. 22, 2020 Extended European Search Report issued in European Patent Application No. 19188317.2.
(Continued)

*Primary Examiner* — Joseph P Martinez
*Assistant Examiner* — Vipin Patel
(74) *Attorney, Agent, or Firm* — Oliff PLC

(57) ABSTRACT

A lens has a first transmissive surface, a reflective surface, and a second transmissive surface sequentially arranged from a demagnifying side toward a magnifying side. The first transmissive surface and the reflective surface are located at the lower side of an imaginary axis extending in an axis-Z direction, and the second transmissive surface is located at the upper side of the imaginary axis. The reflective surface has a concave shape, and the second transmissive surface has a convex shape protruding toward the magnifying side. An imaginary line that connects an upper intersection to a lower intersection inclines with respect to an imaginary vertical line perpendicular to the imaginary axis in a plane YZ.

19 Claims, 41 Drawing Sheets

(51) Int. Cl.
  *H04N 5/74*   (2006.01)
  *G02B 7/02*   (2021.01)
  *G02B 17/08*  (2006.01)
  *G02B 27/18*  (2006.01)
  *G03B 21/14*  (2006.01)

(52) U.S. Cl.
  CPC ..... *G02B 17/0804* (2013.01); *G02B 17/0856* (2013.01); *G02B 27/18* (2013.01); *G03B 21/145* (2013.01); *H04N 5/74* (2013.01)

(58) Field of Classification Search
  CPC ........ G02B 17/086; G02B 27/18; G02B 7/02; G03B 21/145; G03B 21/28; H04N 5/74
  See application file for complete search history.

(56) References Cited

U.S. PATENT DOCUMENTS

| | | |
|---|---|---|
| 8,014,075 B2 | 9/2011 | Minefuji |
| 10,451,962 B2 | 10/2019 | Amano |
| 2004/0156117 A1 | 8/2004 | Takaura et al. |
| 2006/0126032 A1 | 6/2006 | Takaura et al. |
| 2006/0193036 A1 | 8/2006 | Suzuki |
| 2007/0184368 A1 | 8/2007 | Nishikawa et al. |
| 2008/0304019 A1 | 12/2008 | Takaura et al. |
| 2009/0015801 A1 | 1/2009 | Takaura et al. |
| 2009/0015910 A1 | 1/2009 | Takaura et al. |
| 2009/0021703 A1 | 1/2009 | Takaura et al. |
| 2009/0116124 A1 | 5/2009 | Minefuji |
| 2009/0231690 A1 | 9/2009 | Nishikawa et al. |
| 2010/0039625 A1 | 2/2010 | Takaura et al. |
| 2010/0053737 A1 | 3/2010 | Fujita et al. |
| 2010/0091393 A1 | 4/2010 | Togino |
| 2010/0128345 A1 | 5/2010 | Suzuki |
| 2010/0165308 A1 | 7/2010 | Morikuni et al. |
| 2010/0310724 A1 | 12/2010 | Nakata et al. |
| 2011/0038039 A1 | 2/2011 | Takaura et al. |
| 2012/0050891 A1 | 3/2012 | Seidl et al. |
| 2014/0204351 A1 | 7/2014 | Matsuo |
| 2015/0323767 A1 | 11/2015 | Morikuni et al. |
| 2016/0112685 A1 | 4/2016 | Matsuo |
| 2016/0246037 A1 | 8/2016 | Amano |
| 2017/0059971 A1 | 3/2017 | Takano et al. |
| 2018/0059519 A1 | 3/2018 | Nagatoshi et al. |
| 2018/0307041 A1 | 10/2018 | Masui et al. |
| 2019/0011684 A1 | 1/2019 | Ishihara et al. |
| 2020/0142291 A1 | 5/2020 | Nishikawa |

FOREIGN PATENT DOCUMENTS

| | | |
|---|---|---|
| EP | 2730961 A1 | 5/2014 |
| JP | H09-258105 A | 10/1997 |
| JP | 2004-246042 A | 9/2004 |
| JP | 2004-258620 A | 9/2004 |
| JP | 2004-361777 A | 12/2004 |
| JP | 2006-235516 A | 9/2006 |
| JP | 2007-079524 A | 3/2007 |
| JP | 2010-020344 A | 1/2010 |
| JP | 4396769 B2 | 1/2010 |
| JP | 5145486 B1 | 2/2013 |
| JP | 2017-156712 A | 9/2017 |
| JP | 2017-156713 A | 9/2017 |
| JP | 2017-156714 A | 9/2017 |
| JP | 2019-133061 A | 8/2019 |
| WO | 2008/120650 A1 | 10/2008 |
| WO | 2013/005444 A1 | 1/2013 |
| WO | 2018/066714 A1 | 4/2018 |
| WO | 2019/151252 A1 | 8/2019 |

OTHER PUBLICATIONS

Jun. 29, 2020 Office Action Issued in U.S. Appl. No. 16/522,846.
Jan. 8, 2020 Extended Search Report issued in European Patent Application No. 19188585.4.
Aug. 21, 2020 Notice of Allowance issued in U.S. Appl. No. 16/524,510.
Oct. 14, 2020 Notice of Allowance issued in U.S. Appl. No. 16/522,846.
U.S. Appl. No. 16/524,510, filed Jul. 29, 2019 in the name of Eiji Morikuni.
U.S. Appl. No. 16/522,846, filed Jul. 26, 2019 in the name of Eiji Morikuni.
Dec. 1, 2020 Office Action issued in U.S. Appl. No. 16/522,846.
Dec. 9, 2020 Office Action Issued in U.S. Appl. No. 16/524,510.
Mar. 4, 2021 Notice of Allowance issued in U.S. Appl. No. 16/522,846.
Mar. 12, 2021 Office Action issued in U.S. Appl. No. 16/524,510.
Dec. 12, 2019 European Search Report issued in European Patent Application No. 19188314.9.

\* cited by examiner

LENS AND PROJECTION-TYPE IMAGE DISPLAY APPARATUS

The present application is based on, and claims priority from JP Application Serial Number 2018-141033, filed Jul. 27, 2018, the disclosure of which is hereby incorporated by reference herein in its entirety.

BACKGROUND

1. Technical Field

The present disclosure relates to a lens having a concave reflective surface between two transmissive surfaces, and to a projection-type image display apparatus including the lens.

2. Related Art

JP-A-2017-156713 describes an optical system that forms an image formed by a display device on a screen. The optical system described in JP-A-2017-156713 includes a front group, an aperture stop, and a rear group sequentially arranged from the demagnifying side toward the magnifying side. The front group has a transmissive surface and a concave reflective surface. The rear group has a transmissive surface that is convex shape protruding toward the magnifying side. The opening of the aperture stop is so provided as to be perpendicular to the optical axis of the front group. A pupil of the optical system is perpendicular to the optical axis. The optical system is formed by some lenses.

JP-A-2017-156713 is an embodiment of the related art.

The optical system described in JP-A-2017-156713 causes brightness reduction of upper periphery of a final image formed on the screen.

SUMMARY

An advantage of some aspects of the present disclosure is to provide a lens capable of suppressing a decrease in the amount of light at the upper periphery of a magnifying-side image formation plane. Another advantage of some aspects of the present disclosure is to provide a projection-type image display apparatus including the lens.

A lens according to an aspect of the present disclosure has a first transmissive surface, a reflective surface, and a second transmissive surface sequentially arranged from a demagnifying side toward a magnifying side. Three axes perpendicular to one another are called axes X, Y, and Z, with an axis-Z direction being a direction in which the first transmissive surface and the reflective surface are arranged, an upper side being one side of the axis Y, a lower side being another side of the axis Y, and a plane YZ being a plane perpendicular to the axis X and containing the axes Y and Z. The first transmissive surface and the reflective surface are located at the lower side of an imaginary axis extending in the axis-Z direction. The second transmissive surface is located at the upper side of the imaginary axis. The reflective surface has a concave shape. The second transmissive surface has a convex shape protruding toward the magnifying side. An imaginary line that connects an upper intersection to a lower intersection inclines with respect to an imaginary vertical line perpendicular to the imaginary axis in the plane YZ, the upper intersection being an intersection where an upper peripheral light ray of an upper-end light flux that is a light ray passing through an axis-Y-direction upper end of an effective range of the second transmissive surface and an upper peripheral light ray of a lower-end light flux that is a light ray passing through an axis-Y-direction lower end of the effective range intersect with each other in the plane YZ, and the lower intersection being an intersection where a lower peripheral light ray of the upper-end light flux and a lower peripheral light ray of the lower-end light flux intersect with each other in the plane YZ.

In the aspect of the present disclosure, the first transmissive surface, the reflective surface, and the second transmissive surface may form a coaxial optical system having surfaces rotationally symmetric with respect to the imaginary axis, and the imaginary axis may be a design reference axis.

In the aspect of the present disclosure, the lens may satisfy a conditional expression below:

$$0° < \theta < 90° + \gamma \quad (1)$$

where $\theta$ is an inclination angle over which a side of the imaginary line that is a side facing the upper intersection rotates counterclockwise relative to the imaginary vertical line around an intersection of the imaginary vertical line and the imaginary line, and $\gamma$ is an angle from the imaginary axis to the lower peripheral light ray, which is a light ray of the lower-end light flux and intersects the imaginary axis.

In the aspect of the present disclosure, the lens may satisfy a conditional expression (2) below:

$$90° < \theta \quad (2).$$

In the aspect of the present disclosure, any of the first transmissive surface, the reflective surface, and the second transmissive surface may be an aspheric surface.

In the aspect of the present disclosure, the lens may further include a light blocker that blocks light rays that incline with respect to the imaginary line and do not fall within the effective range through which the imaginary line passes.

In the aspect of the present disclosure, any of the first transmissive surface, the reflective surface, and the second transmissive surface may be a free-form surface.

A projection-type image display apparatus according to another aspect of the present disclosure includes any of the lenses described above and an image formation section that displays a projection image in a demagnifying-side image formation plane of the lens.

A projection-type image display apparatus according to another aspect of the present disclosure includes a first optical system, a second optical system, and a display. The first optical system is any of the lenses described above. The second optical system is disposed between the first optical system and the light modulator. A projection image displayed by the display is projected via the second optical system and the first optical system.

DESCRIPTION OF EXEMPLARY EMBODIMENTS

A lens and a projection-type image display apparatus including the lens according to an embodiment of the present disclosure will be described below in detail with reference to the drawings.

Embodiment 1

Figure 1:
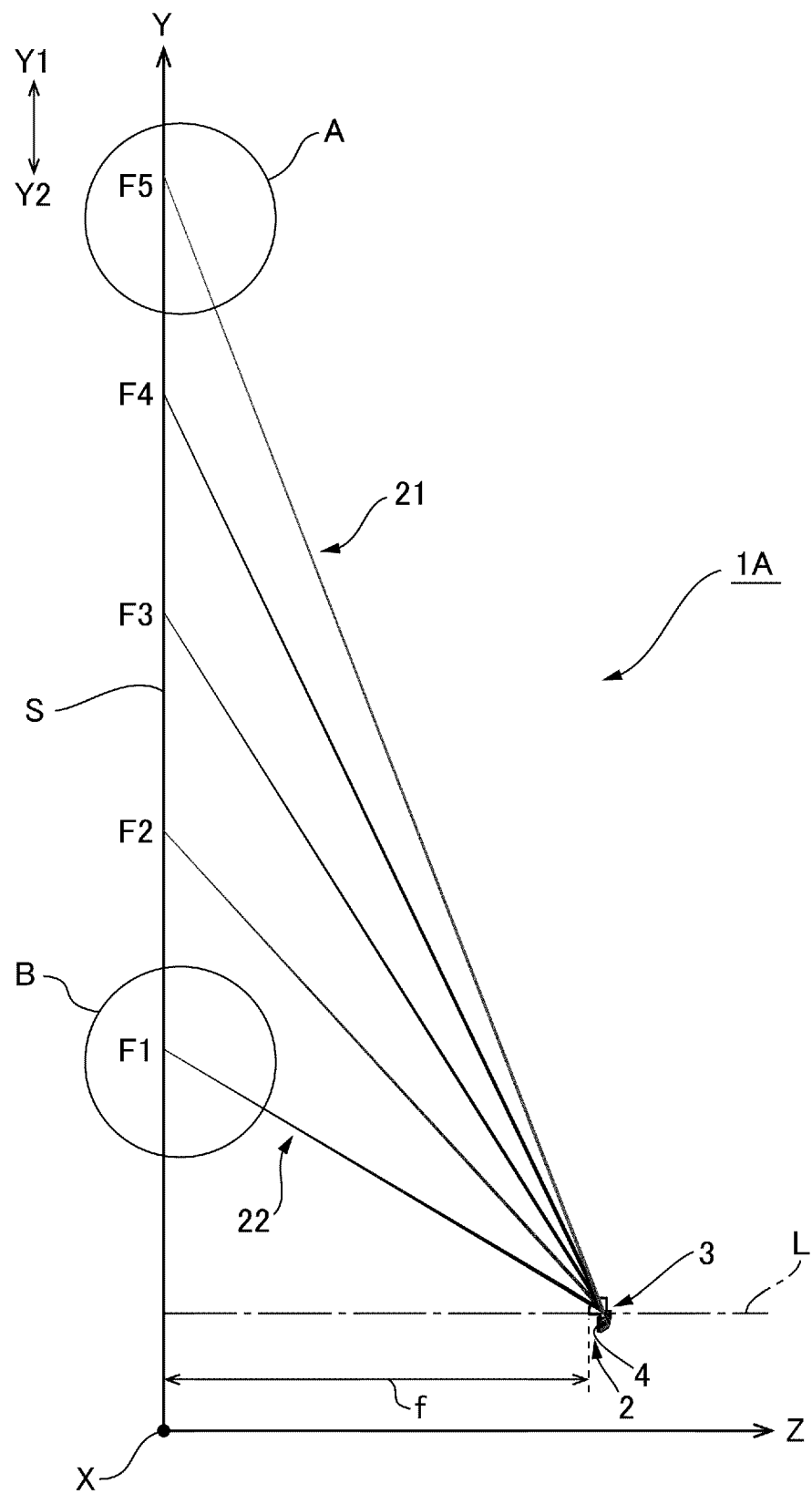
FIG. 1 is a light ray diagram of a projection-type image display apparatus according to Embodiment 1 of the present disclosure.
Figure 2:
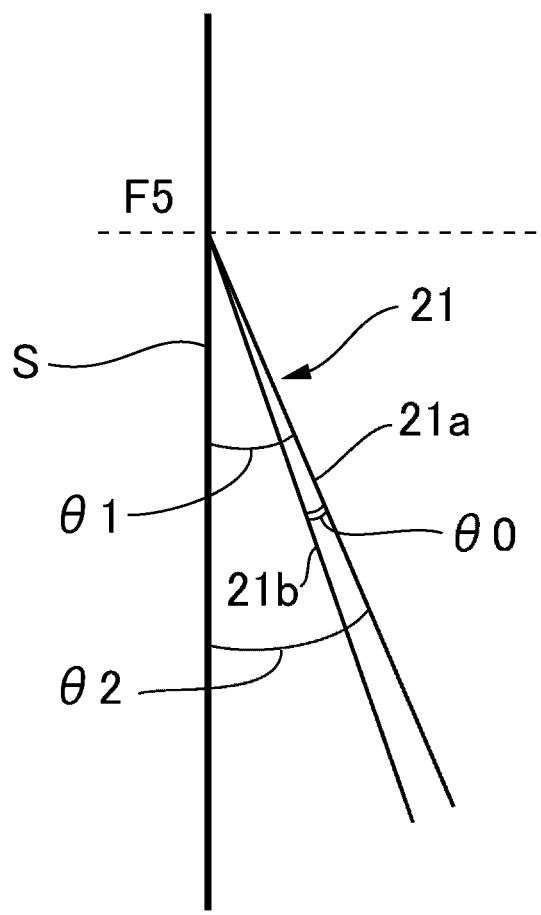
FIG. 2 is a partially enlarged view of a portion A in FIG. 1.
Figure 3:
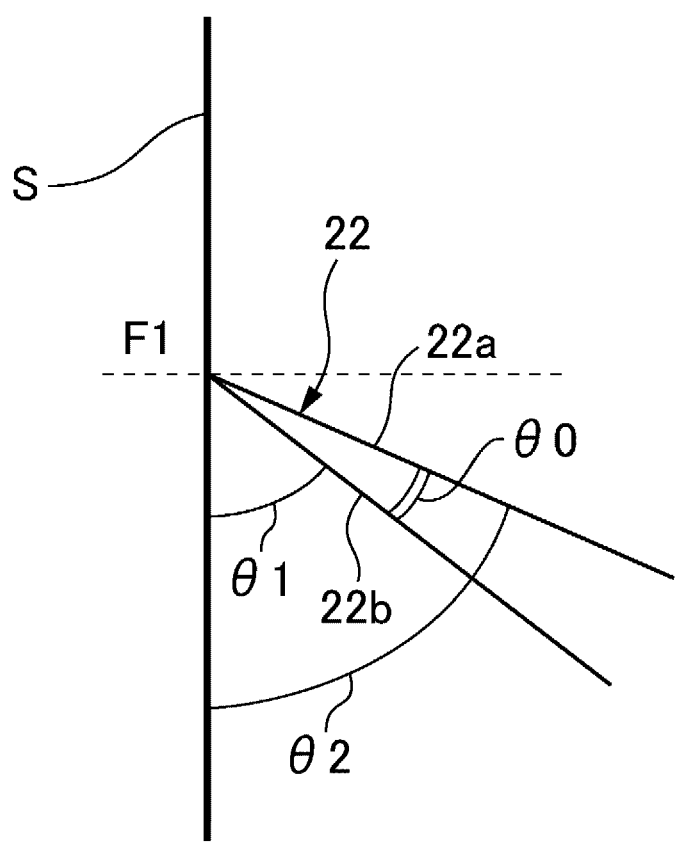
FIG. 3 is a partially enlarged view of a portion B in FIG. 1.
Figure 4:
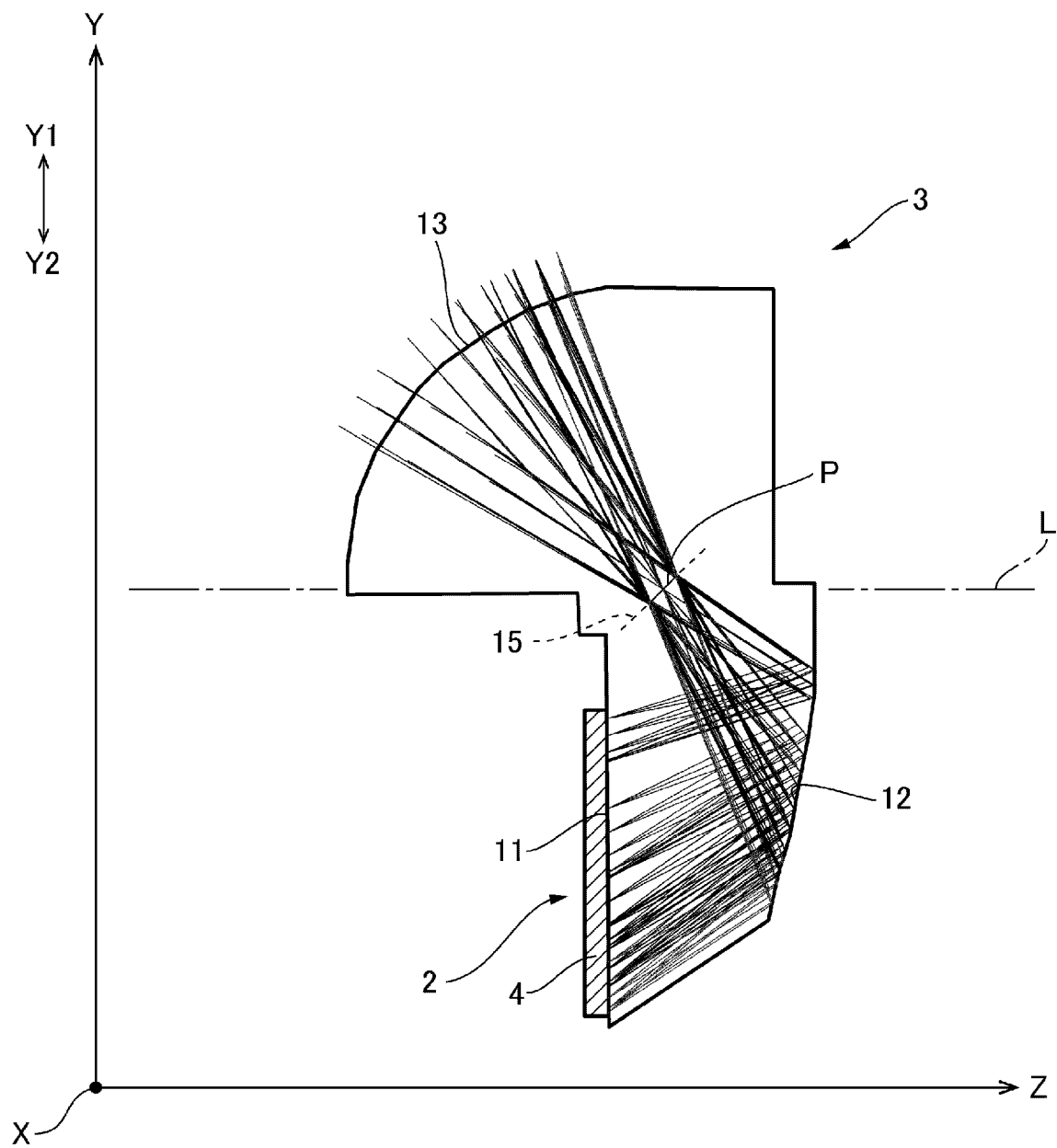
FIG. 4 is a light ray diagram showing light rays passing through a lens in the projection-type image display apparatus in FIG. 1.
Figure 5:
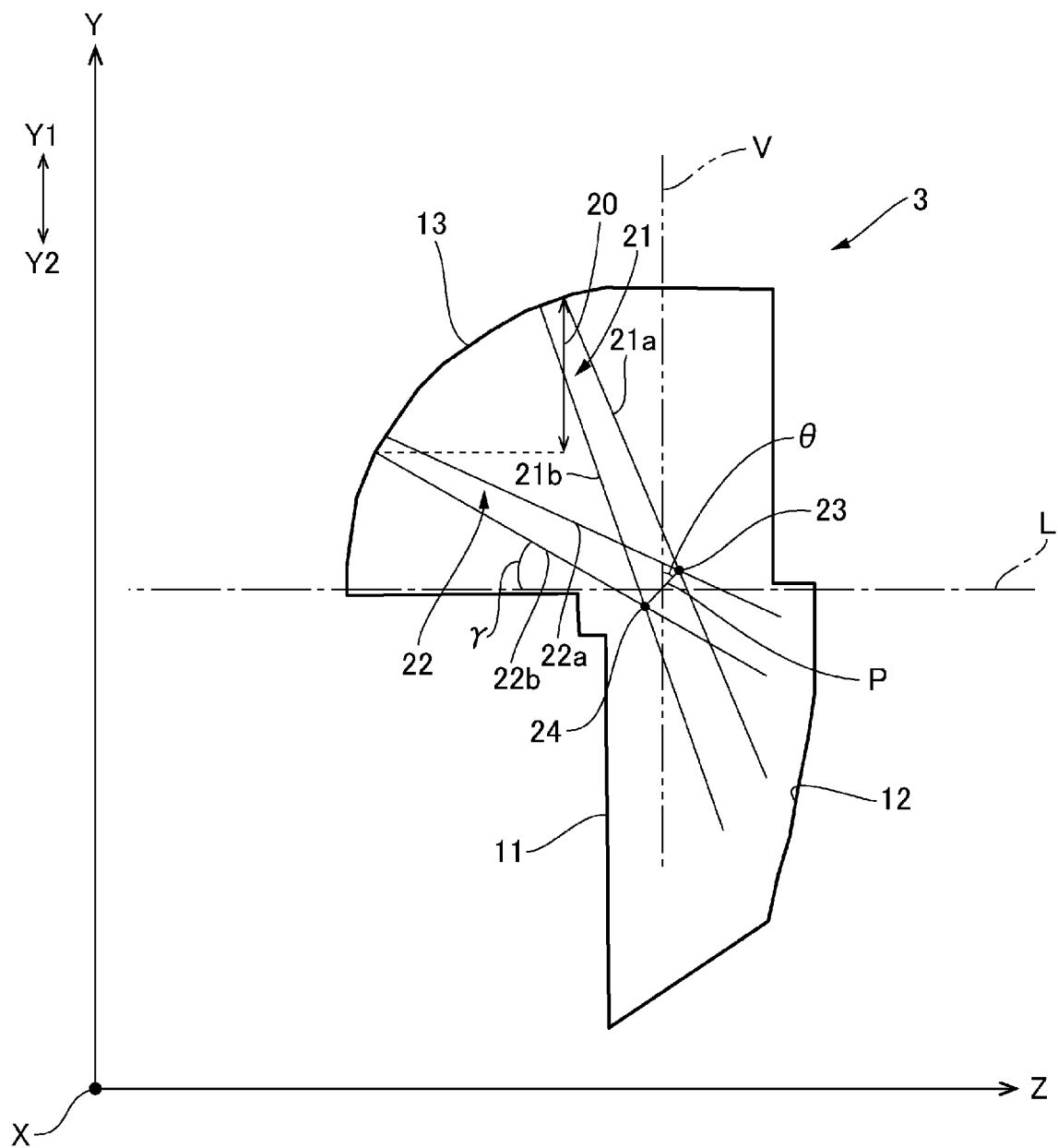
FIG. 5 describes an imaginary line specified in the lens in FIG. 4.

FIG. 1 is a light ray diagram of a projection-type image display apparatus according to Embodiment 1 of the present disclosure. FIG. 2 is a partially enlarged view of a portion A in FIG. 1. The portion A is a portion of a screen that is the portion where the image height is maximized in the direction along an axis Y and therearound. FIG. 3 is a partially enlarged view of a portion B in FIG. 1. The portion B is a portion of the screen that is the portion where the image height is minimized in the direction along the axis Y and therearound. FIG. 4 is a light ray diagram showing light rays passing through a lens in the projection-type image display apparatus in FIG. 1. FIG. 5 describes an imaginary line specified in the lens.

A projection-type image display apparatus 1A according to the present embodiment includes an image formation section 2 and a lens 3, as shown in FIG. 1. The image formation section 2 forms a projection image in the demagnifying-side image formation plane of the lens 3. A screen S is disposed in the magnifying-side image formation plane of the lens 3. In other words, the screen S is the magnifying-side image formation plane of the lens 3.

The image formation section 2 is a display. The display, for example, includes a light source apparatus and a light modulator. In the present embodiment, the light modulator is a liquid crystal light valve 4. The liquid crystal light valve 4 includes a liquid crystal panel, a light-incident-side polarizer, and a light-exiting-side polarizer. The liquid crystal light valve 4 modulates the spatial distribution of the light intensity incident from the light source apparatus on a pixel basis to form the projection image. In FIGS. 1 and 4, the liquid crystal light valve 4 is shown as the image formation section 2.

The lens 3 is made of resin. The lens 3 has a first transmissive surface 11, a reflective surface 12, and a second transmissive surface 13 sequentially arranged from the demagnifying side toward the magnifying side, as shown in FIG. 4. In the case where the lens 3 is made of resin, the lens 3 can be manufactured in injection molding. A lens having a complicated shape, such as a free-form surface, is therefore readily manufactured.

The liquid crystal light valve 4 is attached to the first transmissive surface 11. The projection image displayed on the liquid crystal light valve 4 is projected on the screen S via the first transmissive surface 11, the reflective surface 12, and the second transmissive surface 13 in the present order. The final image projected on the screen S has an oblong shape elongated in the lateral direction. In the present embodiment, the final image has an aspect ratio of 16:10.

In the following description, three axes perpendicular to one another are called axes X, Y, and Z. A first direction in which the first transmissive surface 11 and the reflective surface 12 are arranged is called an axis-Z direction. A second direction, which is called an axis-y direction, coincides with the vertical direction of the screen S. One side of the axis Y is called an upper side Y1, and the other side of the axis Y is called a lower side Y2. A first plane perpendicular to the axis X and containing the axes Y and Z is called a plane YZ. FIGS. 1 to 5 each show the plane YZ. The lateral direction of the screen S coincides with a third direction, which is called the axis-X direction. In the following description, an imaginary axis L extending in the axis-Z direction is set in the plane YZ. In the present embodiment, the imaginary axis L is a reference axis used in the design of the lens 3. The imaginary axis L is perpendicular to the screen S, which is the magnifying-side image formation plane. The imaginary axis L is substantially perpendicular to the screen S in some cases.

The first transmissive surface 11 and the reflective surface 12 are located at the lower side Y2 of the imaginary axis L. The second transmissive surface 13 is located at the upper axis-Y-direction upper end of an effective range 20 of the second transmissive surface 13, and an upper peripheral light ray 22a of a lower-end light flux 22, where the lower-end light flux 22 is the light flux passing through the axis-Y-direction lower end of the effective range 20, intersect with each other in the plane YZ, and the lower intersection 24 being an intersection where a lower peripheral light ray 21b of the upper-end light flux 21 and a lower peripheral light ray 22b of the lower-end light flux 22 intersect with each other in the plane YZ. The imaginary line P inclines by 45° with respect to an imaginary vertical line V, which is perpendicular to the imaginary axis L in the plane YZ. In the present embodiment, the imaginary axis L, which is the optical axis, passes through the center of the imaginary line P. The imaginary line P is therefore the pupil in the plane YZ. In the present specification, also when the optical axis does not pass through the center of the imaginary line P, the imaginary line P, which connects the upper intersection 23 and the lower intersection 24 to each other in the plane YZ, is referred to as a "pupil."

Lens data on the lens 3 are as follows: In the lens data, the surface number 1 is the second transmissive surface 13 and is a refractive surface. The surface number 2 is the pupil. The surface number 3 is the reflective surface 12. The surface number 4 is the first transmissive surface 11 and is a refractive surface. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | Surface type | r | d | nd | vd | Y | X |
| --- | --- | --- | --- | --- | --- | --- | --- |
| Object plane | Spherical | 0 | 295 | | | | |
| 1 | Aspheric | 15 | 10 | 1.531132 | 55.75 | 9.35 | 9.35 |
| 2 | Spherical | 0 | 5 | 1.531132 | 55.75 | 0.65 | 1 |
| 3 | Aspheric | −11 | −6.7503 | 1.531132 | 55.75 | 10.368 | 10.368 |
| 4 (Image plane) | Spherical | 0 | 0 | 1.531132 | 55.75 | 13.754 | 13.754 | side Y1 of the imaginary axis L. The reflective surface 12 has a concave shape. The reflective surface 12 is provided by externally forming a reflective coating on the lens 3. The second transmissive surface 13 has a convex shape protruding toward the magnifying side.

In the present embodiment, the first transmissive surface 11, the reflective surface 12, and the second transmissive surface 13 form a coaxial optical system. Therefore, the imaginary axis L is the reference axis used in the design of the lens 3 and is the optical axis of the lens 3. The upper and lower halves of the lens 3 are configured to be rotationally symmetric with respect to the imaginary axis L. That is, the first transmissive surface 11, the reflective surface 12, and the second transmissive surface 13 are so shaped that the cross-sectional shape in the plane YZ shown in FIG. 4 is rotated around the imaginary axis L over an angular range of 90° toward one side and the other side of the axis-X direction.

An imaginary line P can be specified in the lens 3, as shown in FIG. 5. The imaginary line P connects an upper intersection 23 to a lower intersection 24, the upper intersection 23 being an intersection where an upper peripheral light ray 21a of an upper-end light flux 21, where the upper-end light flux 21 is the light flux passing through the The refractive index nd of the lens 3 is 1.531132. The Abbe number vd of the lens 3 is 55.75. The on-axis inter-surface distance d in the field of the object plane is the distance between the screen S and the surface number 1. The on-axis inter-surface distance d in the field of the object plane is therefore a projection distance f of the projection-type image display apparatus LA. In the present embodiment, f=295 mm.

In the present embodiment, the surface number 1 is an aspheric surface. The decenter & return α of the surface number 2 is −45°. That is, the pupil inclines by 45° with respect to the imaginary vertical line V, which is perpendicular to the optical axis in the plane YZ. The surface number 3 is an aspheric surface. The surface number 4 is a spherical surface.

Aspheric data of the surface number 1 are as follows.

| | |
| --- | --- |
| Conic constant | 1.191933E+00 |
| Fourth-order coefficient | 8.185879E−04 |
| Sixth-order coefficient | −1.185338E−05 |

-continued

| Eighth-order coefficient | 1.057894E−07 |
| --- | --- |
| Tenth-order coefficient | −2.762786E−10 |

Aspheric data of the surface number 3 are as follows.

| Conic constant | −1.114283E+02 |
| --- | --- |
| Fourth-order coefficient | −1.612935E−04 |
| Sixth-order coefficient | 1.601981E−06 |
| Eighth-order coefficient | −9.655743E−09 |
| Tenth-order coefficient | 2.369119E−11 |

Projection Image

Figure 6:
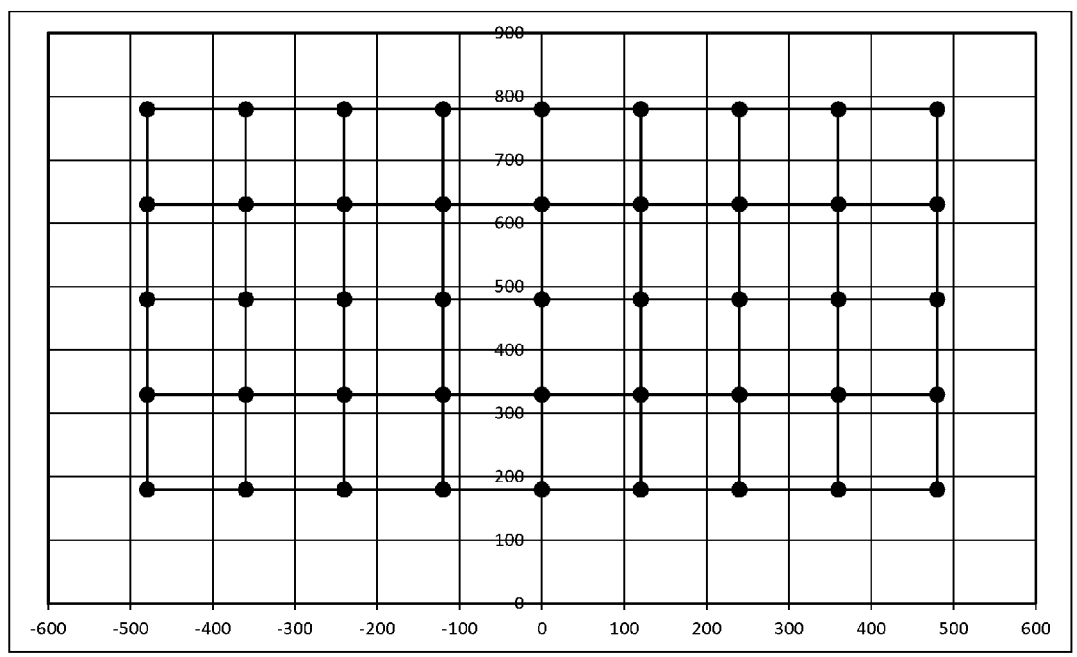
FIG. 6 shows a distortion lattice on a screen.
Figure 7:
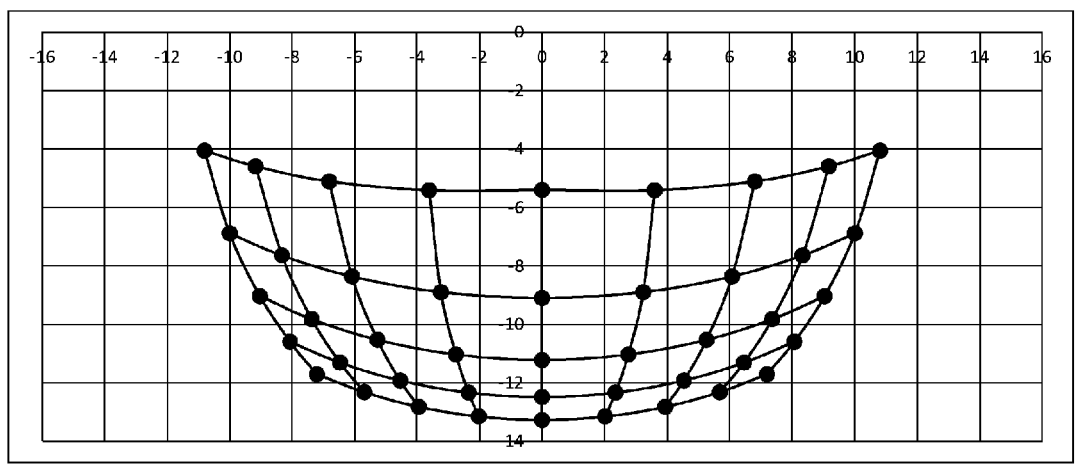
FIG. 7 shows a distortion lattice in the demagnifying-side image formation plane of the lens.

The projection image formed by the image formation section 2 will next be described. FIG. 6 shows a distortion lattice on the screen S. FIG. 7 shows the distortion lattice in the demagnifying-side image formation plane of the lens 3. The distortion lattice in the demagnifying-side image formation plane is distorted but has no field curvature.

The image formation section 2 forms a projection image that is an inverted final image turned upside down in the demagnifying-side image formation plane. The image formation section 2 forms an image distorted in advance in the demagnifying-side image formation plane of the lens 3 so that an oblong projection image is projected on the screen S, which is the magnifying-side image formation plane. More specifically, the image formation section 2 forms a distorted projection image corresponding to the distortion lattice shown in FIG. 7 in the demagnifying-side image formation plane so that a final image corresponding to the distortion lattice shown in FIG. 6 is projected on the screen S. The projection image has a shape reducing the trapezoidal distortion of the final image formed on the screen S. That is, the projection image has distortion opposite the trapezoidal distortion of the final image. The projection image is therefore so formed that the shortest edge thereof is the edge having the highest image height on the screen S.

Lens Performance

Figure 8:
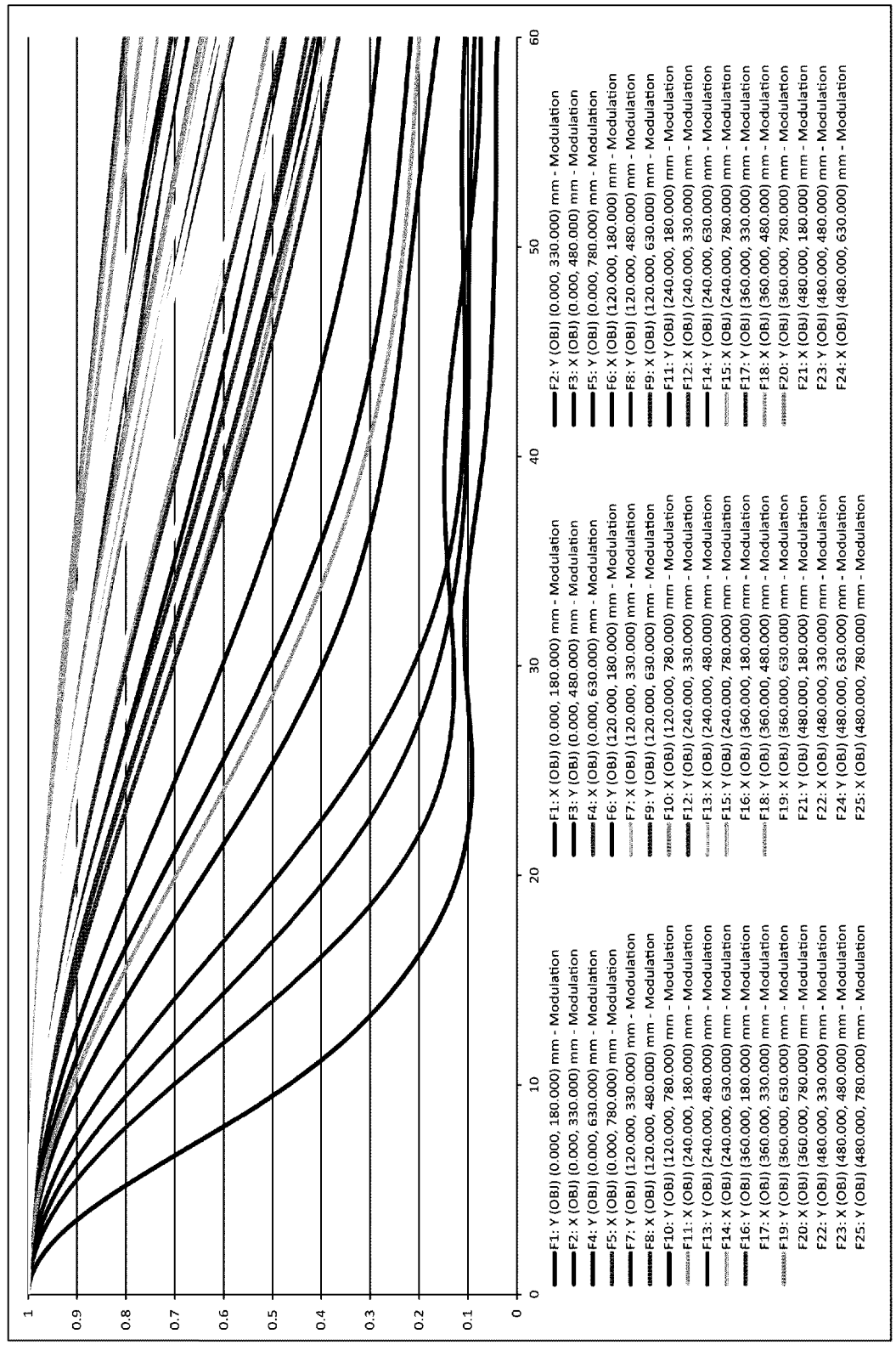
FIG. 8 shows an MTF of the lens on the demagnifying side.

In the present embodiment, the reflective surface 12 and the second transmissive surface 13 are each an aspheric surface. The amount of aberrations produced by the lens can therefore be suppressed. FIG. 8 shows an MTF of the lens 3 on the demagnifying side. The MTF was calculated under the following conditions: The image formation planes were divided along the axis Y; and the resultant halves were each divided into 25 areas. Light rays used in the calculation of the MTF are so weighted that the weighting ratio among light rays having a wavelength of 620 nm, light rays having a wavelength of 550 nm, and light rays having a wavelength of 470 nm is 2:7:1. The horizontal axis of FIG. 8, which shows the MTF, represents the spatial frequency. A spatial frequency of 30 cycles corresponds to a resolution of 16.7 μm. The vertical axis of FIG. 8 represents a contrast reproduction ratio. In the present embodiment, FIG. 8 shows that the resolution decreases on the side close to the optical axis. Decrease in the resolution in the other area is, however, suppressed.

Figure 9:
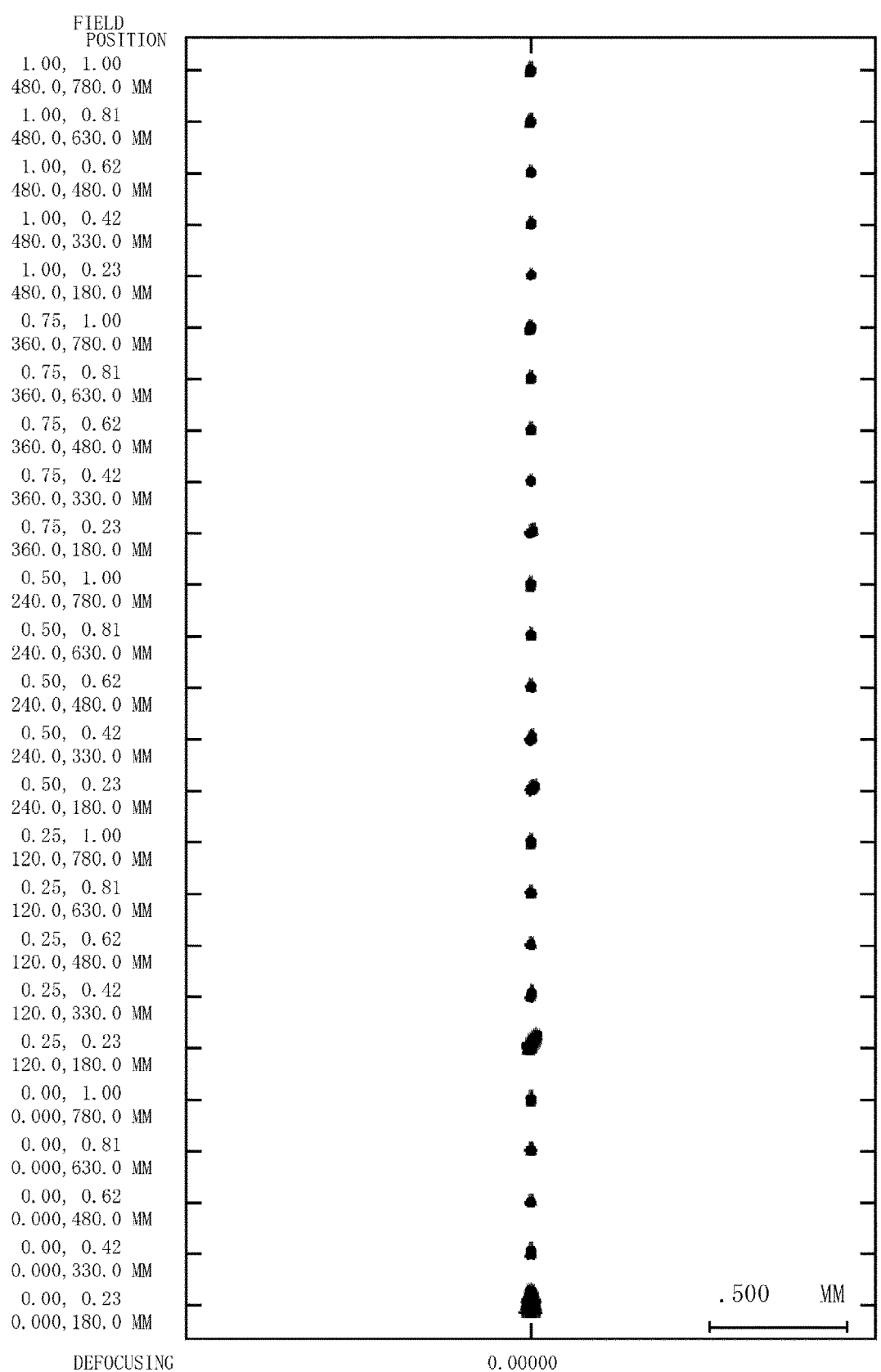
FIG. 9 is a spot diagram showing spots produced by the lens.

FIG. 9 is a spot diagram showing spots produced by the lens 3. The spot diagram shown in FIG. 9 shows that the size of the spot increases in lower image height positions on the screen S. Portions of the projection image that is the portions projected in the lower image height positions on the screen S are, however, the portions each having a large lattice interval of the distortion lattice in the demagnifying-side image formation plane of the lens shown in FIG. 7. The image formation section 2 can therefore express each of the image portions projected in the lower image height positions on the screen S by using a greater number of pixels. The projection-type image display apparatus 1A according to the present embodiment can therefore suppress a decrease in the resolution of the final image at the locations where the spot diagram shows large spots, that is, in the lower image height positions on the screen S.

The lens 3 according to the present embodiment satisfies the following conditional expression (1).

$$0° < \theta < 90° + \gamma \quad (1)$$

θ: Inclination angle over which an end of the imaginary line P facing the upper intersection 23 rotates counterclockwise relative to the imaginary vertical line V around the intersection of the imaginary vertical line V and the imaginary line P γ: angle from the imaginary axis L to the lower peripheral light ray 22b passing through the effective range 20 of the second transmissive surface 13 and intersects the imaginary axis L.

That is, in the present embodiment, the imaginary line P inclines by 45° with respect to the imaginary vertical line V. In other words, in the present embodiment, the pupil inclines by 45° with respect to the imaginary vertical line V. Therefore, θ=45°, which satisfies the conditional expression (1).

In the present embodiment, in which the conditional expression (1) is satisfied, the pupil inclines with respect to the imaginary vertical line V. In a case where θ=0° in the conditional expression (1), the imaginary line P is perpendicular to the imaginary axis L. That is, the pupil is perpendicular to the design reference axis. In a case where θ is greater than the upper limit in the conditional expression (1), the lower-end light flux 22 is blocked. In the present embodiment, in which the conditional expression (1) is satisfied, the lower-end light flux 22 passing through the lower end of the effective range 20 of the second transmissive surface 13 is not blocked and reaches the screen S.

Further, since the lens 3 according to the present embodiment satisfies the conditional expression (1), a decrease of brightness at the upper periphery of the screen S can be suppressed, as compared with a case where the imaginary line P is parallel to the imaginary vertical line V.

That is, when the pupil is perpendicular to the imaginary axis L, a divergence angle θ0 of a light flux that reaches an upper portion of the screen S decreases as the angle of view on the magnifying side increases. The divergence angle θ0 is shown in FIGS. 2 and 3. In the case where the pupil is perpendicular to the imaginary axis L, the difference in the divergence angle θ0 between the light flux that reaches the upper portion of the screen S and a light flux that reaches a lower portion of the screen S increases as the angle of view on the magnifying side increases. As a result, the amount of light at the upper periphery of the screen S is smaller than the amount of light at the lower periphery of the screen S.

On the other hand, in the present embodiment, in which the conditional expression (1) is satisfied, the pupil inclines with respect to the imaginary vertical line V, which is perpendicular to the imaginary line P. As a result, the divergence angle θ0 of the light flux that reaches the upper portion of the screen S increases. The amount of light that reaches the upper portion of the screen S therefore increases. Further, when the divergence angle θ0 of the light flux that reaches the upper portion of the screen S increases, the difference in the divergence angle θ0 between the light flux that reaches the upper portion of the image formation plane and the light flux that reaches the lower portion of the image formation plane decreases. The situation in which the amount of light at the upper periphery of the screen S is smaller than the amount of light at the lower periphery of the screen S can therefore be suppressed.

Data on the divergence angle θ0 of each of light fluxes F1 to F5, which reach corresponding image heights on the screen S, are shown below. The light flux F1 is a light flux that reaches the lowest image height position, as shown in FIG. 1. The light flux F5 is a light flux that reaches the highest image height position. The light fluxes F2 to F4 are light fluxes that reach height positions between the height position that the light flux F1 reaches and the height position that the light flux F5 reaches. Assuming that the coordinate of the light flux F1 on the axis Y is 180 in the plane YZ and the coordinate of the light flux F5 on the axis Y is 780 in the plane YZ, and the coordinate of the light flux F2 on the axis Y is 330 and the coordinate of the light flux F3 on the axis Y is 480. The coordinate of the light flux F4 on the axis Y is 630. An angle θ1 is the angle of the lower peripheral light ray of each of the light fluxes F1 to F5 and is the angle at which the lower peripheral light ray of each of the light fluxes F1 to F5 intersects the screen S, as shown in FIGS. 2 and 3. An angle θ2 is the angle of the upper peripheral light ray of each of the light fluxes F1 to F5 and is the angle at which the upper peripheral light ray of each of the light fluxes F1 to F5 intersects the screen S, as shown in FIGS. 2 and 3. The angle θ0 is the divergence angle and is the difference between θ2 and θ1. Reference character R denotes a divergence angle ratio. The divergence angle ratio is the proportion assuming that the divergence angle of the light flux F1, which has the highest divergence angle, is 100%.

Data on the divergence angle θ0 of each of the light fluxes F1 to F5, which reach the corresponding image heights on the screen S, are as follows.

| Light flux | θ1 | θ2 | θ0 | R |
|---|---|---|---|---|
| F1 | 30.33 | 30.68 | 0.35 | 100% |
| F2 | 47.09 | 47.33 | 0.24 | 69% |
| F3 | 57.46 | 57.63 | 0.17 | 49% |
| F4 | 64.09 | 64.23 | 0.13 | 37% |
| F5 | 68.59 | 68.70 | 0.10 | 30% |

In the present embodiment, the divergence angle θ0 of the light flux F5, which reaches the highest image height position, is 30% of the divergence angle θ0 of the light flux F1, which reaches the lowest image height position. The divergence angle θ0 of the light flux F4, which reaches the second highest image height position, is 37% of the divergence angle θ0 of the light flux F1, which reaches the lowest image height position. The divergence angle θ0 of the light flux F3, which reaches the third highest image height position, is 49% of the divergence angle θ0 of the light flux F1, which reaches the lowest image height position. The divergence angle θ0 of the light flux F4, which reaches the fourth highest image height position, is 69% of the divergence angle θ0 of the light flux F1, which reaches the lowest image height position. These values are greater than those when the imaginary line P is perpendicular to the imaginary axis L, as shown below.

Comparative Embodiment

Figure 10:
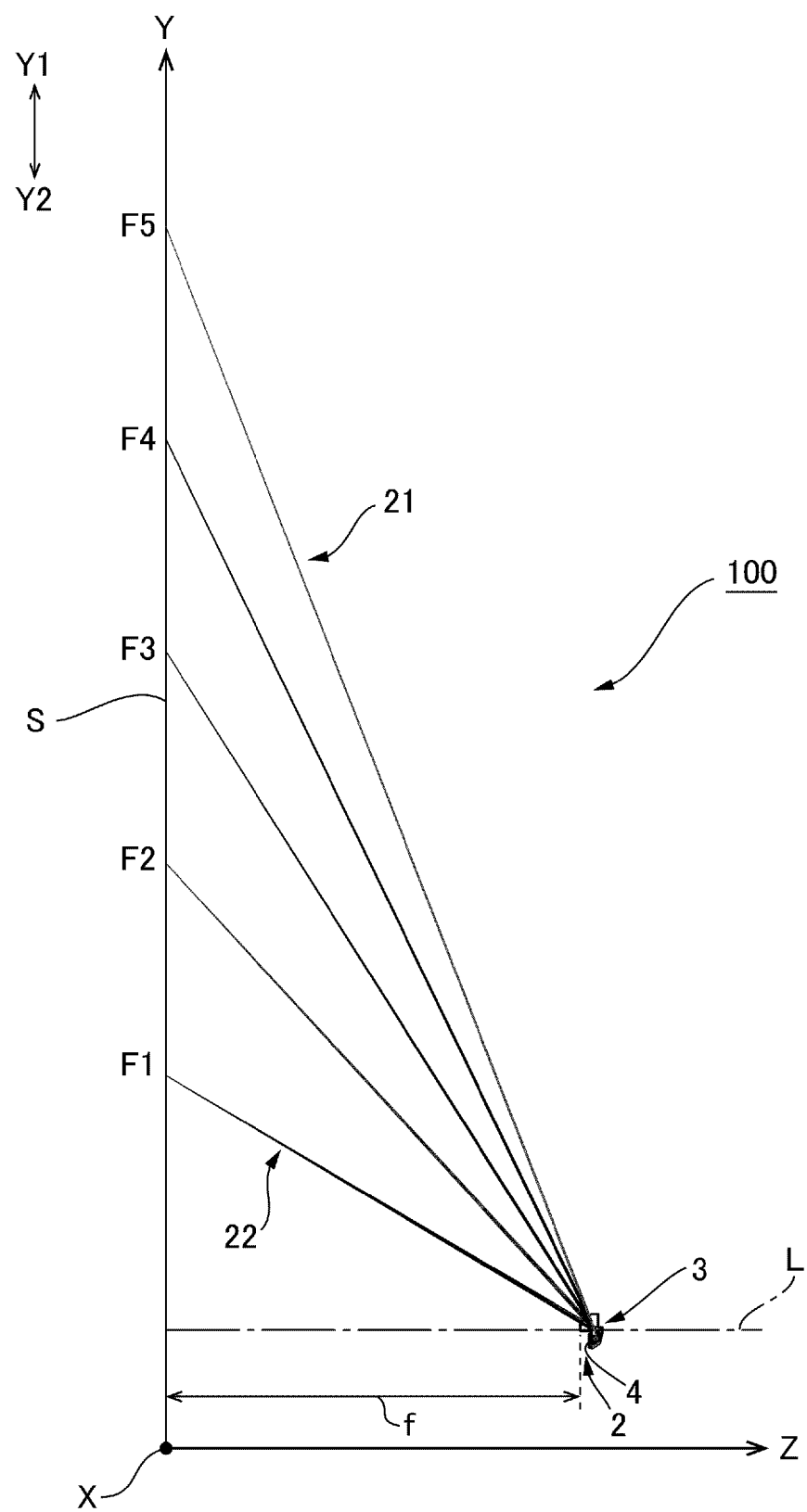
FIG. 10 is a light ray diagram of a projection-type image display apparatus according to Comparative Embodiment.
Figure 11:
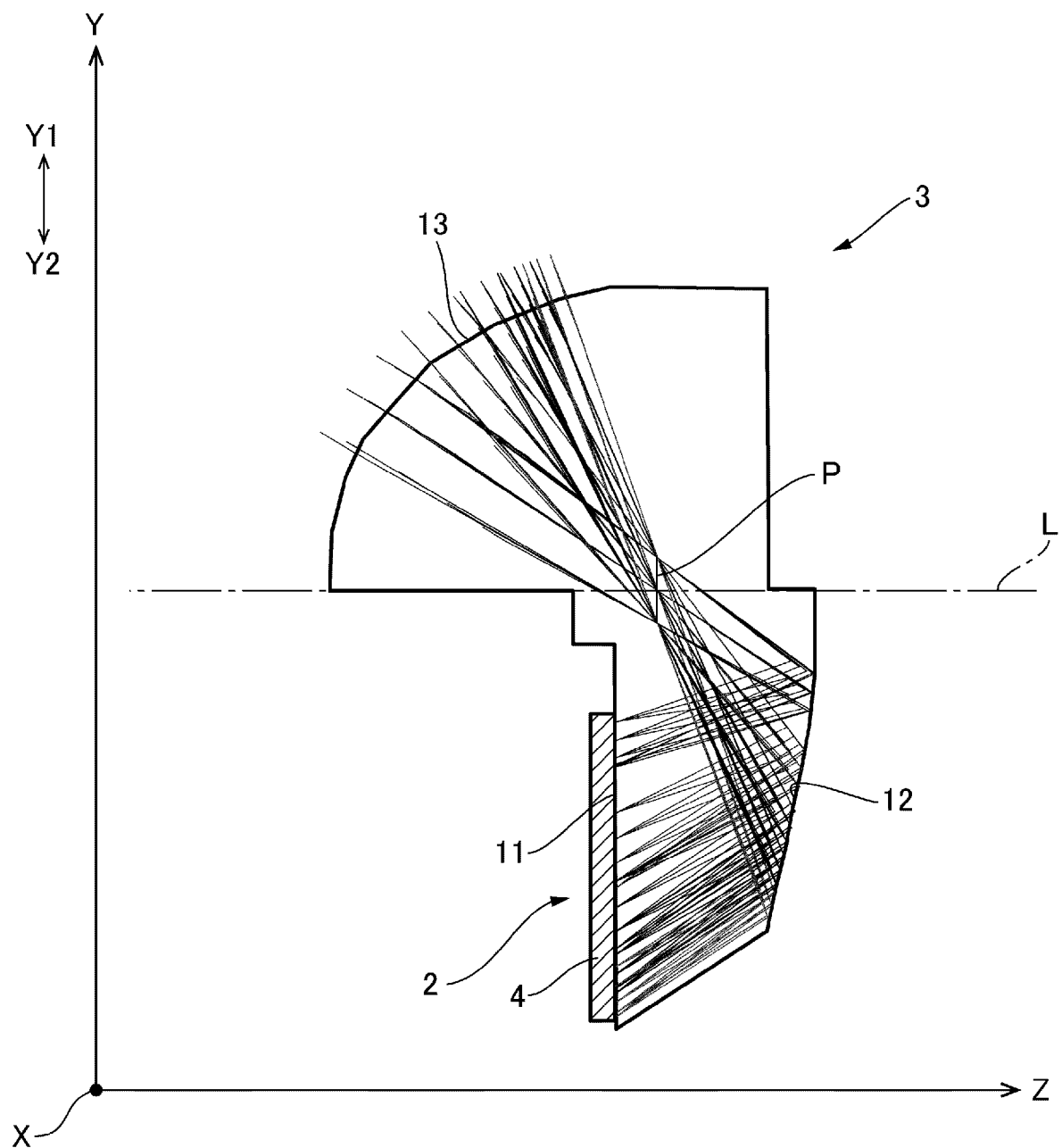
FIG. 11 is a light ray diagram showing light rays passing through a lens in the projection-type image display apparatus according to Comparative Embodiment.
Figure 12:
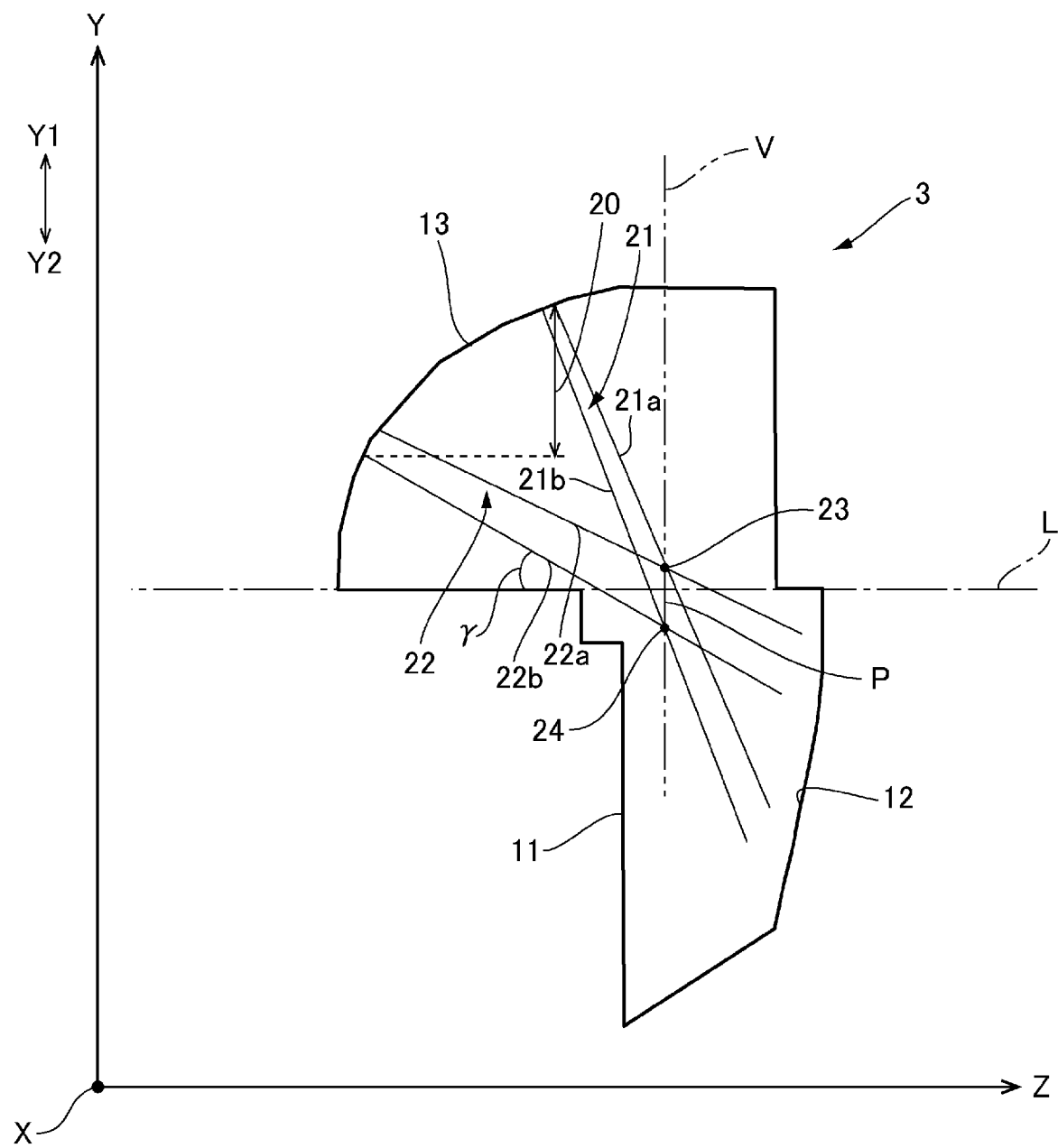
FIG. 12 describes an imaginary line specified in the lens in FIG. 11.

A more detailed description will next be made of the fact that Embodiment 1 can provide the effect of suppressing a decrease of brightness at the upper periphery of the screen S with reference to Comparative Embodiment. FIG. 10 is a light ray diagram of a projection-type image display apparatus according to Comparative Embodiment. FIG. 11 is a light ray diagram showing light rays passing through a lens in the projection-type image display apparatus according to Comparative Embodiment. FIG. 12 describes an imaginary line specified in the lens. A projection-type image display apparatus 100 according to the present embodiment has the same configuration as that of the projection-type image display apparatus 1A according to Embodiment 1 except that the imaginary line P is perpendicular to the imaginary axis L. The corresponding components therefore have the same reference characters.

The projection-type image display apparatus 100 according to the present embodiment includes the image formation section 2 and the lens 3, as shown in FIG. 10. The image formation section 2 is disposed on the demagnifying side of the lens 3. The image formation section 2 is a display. The display, for example, includes a light source apparatus and a light modulator. The light modulator includes the liquid crystal light valve 4. The lens 3 is made of resin. The lens 3 has the first transmissive surface 11, the reflective surface 12, and the second transmissive surface 13 sequentially arranged from the demagnifying side toward the magnifying side, as shown in FIG. 11. The liquid crystal light valve 4 is attached to the first transmissive surface 11. The projection image displayed on the liquid crystal light valve 4 is projected on the screen S via the first transmissive surface 11, the reflective surface 12, and the second transmissive surface 13 in the present order. The final image projected on the screen S has an oblong shape elongated in the lateral direction. The final image has the aspect ratio of 16:10. Also in the present embodiment, the imaginary axis L extending in the axis-Z direction is set in the plane YZ. The imaginary axis L is the reference axis used in the design of the lens.

The first transmissive surface 11 and the reflective surface 12 are located at the lower side Y2 of the imaginary axis L. The second transmissive surface 13 is located at the upper side Y1 of the imaginary axis L. The reflective surface 12 has a concave shape. The reflective surface 12 is provided by externally forming a reflective coating on the lens 3. The second transmissive surface 13 has a convex shape protruding toward the magnifying side. The first transmissive surface 11, the reflective surface 12, and the second transmissive surface 13 form a coaxial optical system. Therefore, the imaginary axis L is the reference axis used in the design of the lens 3 and is the optical axis of the lens 3. The upper and lower halves of the lens 3 are configured to be rotationally symmetric with respect to the imaginary axis L. That is, the first transmissive surface 11, the reflective surface 12, and the second transmissive surface 13 are so shaped that the cross-sectional shape in the plane YZ shown in FIG. 11 is rotated around the imaginary axis L over the angular range of 90° toward one side and the other side of the axis-X direction.

The imaginary line P can be specified in the lens 3, as shown in FIG. 12. The imaginary line P connects the upper intersection 23 to the lower intersection 24, the upper intersection 23 being an intersection where the upper peripheral light ray 21a of the upper-end light flux 21, where the upper-end light flux 21 is the light flux passing through the axis-Y-direction upper end of the effective range 20 of the second transmissive surface 13, and the upper peripheral light ray 22a of the lower-end light flux 22, where the lower-end light flux 22 is the light flux passing through the axis-Y-direction lower end of the effective range 20, intersect with each other in the plane YZ, and the lower intersection 24 being an intersection where the lower peripheral light ray 21b of the upper-end light flux 21 and the lower peripheral light ray 22b of the lower-end light flux 22 intersect with each other in the plane YZ. The imaginary line P is parallel to the imaginary vertical line V, which is perpendicular to the imaginary axis L in the plane YZ. In the present embodiment, the imaginary axis L, which is the optical axis, passes through the center of the imaginary line P. The imaginary line P is therefore the pupil in the plane YZ.

Lens data on the lens 3 according to Comparative Embodiment are as follows: In the lens data, the surface number 1 is the second transmissive surface 13 and is a refractive surface. The surface number 2 is the pupil. The surface number 3 is the reflective surface 12. The surface number 4 is the first transmissive surface 11 and is a refractive surface. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | Surface type | r | d | nd | vd | Y | X |
|---|---|---|---|---|---|---|---|
| Object plane | Spherical | 0 | 295 | | | | |
| 1 | Aspheric | 15 | 10 | 1.531132 | 55.75 | 9.019 | 9.019 |
| 2 | Spherical | 0 | 5 | 1.531132 | 55.75 | 1 | 1 |
| 3 | Aspheric | −11 | −6.277 | 1.531132 | 55.75 | 10.558 | 10.558 |
| 4 (Image plane) | Spherical | 0 | 0 | 1.531132 | 55.75 | 13.389 | 13.389 |

The refractive index nd of the lens 3 is 1.531132. The Abbe number vd of the lens 3 is 55.75. The on-axis inter-surface distance d in the field of the object plane is the distance between the screen S and the surface number 1. The on-axis inter-surface distance d in the field of the object plane is therefore the projection distance f of the projection-type image display apparatus 100. In the present embodiment, f=295 mm.

In the present embodiment, the surface number 1 is an aspheric surface. The decenter & return α of the surface number 2 is 0°. That is, the pupil does not incline with respect to the imaginary vertical line V, which is perpendicular to the optical axis in the plane YZ. The surface number 3 is an aspheric surface. The surface number 4 is a spherical surface.

Aspheric data of the surface number 1 are as follows.

| | |
|---|---|
| Conic constant | 1.597914E+00 |
| Fourth-order coefficient | 1.003949E−03 |
| Sixth-order coefficient | −1.770946E−05 |
| Eighth-order coefficient | 1.911983E−07 |
| Tenth-order coefficient | −6.508832E−10 |

Aspheric data of the surface number 3 are as follows.

| | |
|---|---|
| Conic constant | −9.4411E+01 |
| Fourth-order coefficient | −1.369046E−04 |
| Sixth-order coefficient | 1.096019E−06 |
| Eighth-order coefficient | −5.971179E−09 |
| Tenth-order coefficient | 1.384487E−11 |

Projection Image

Figure 13:
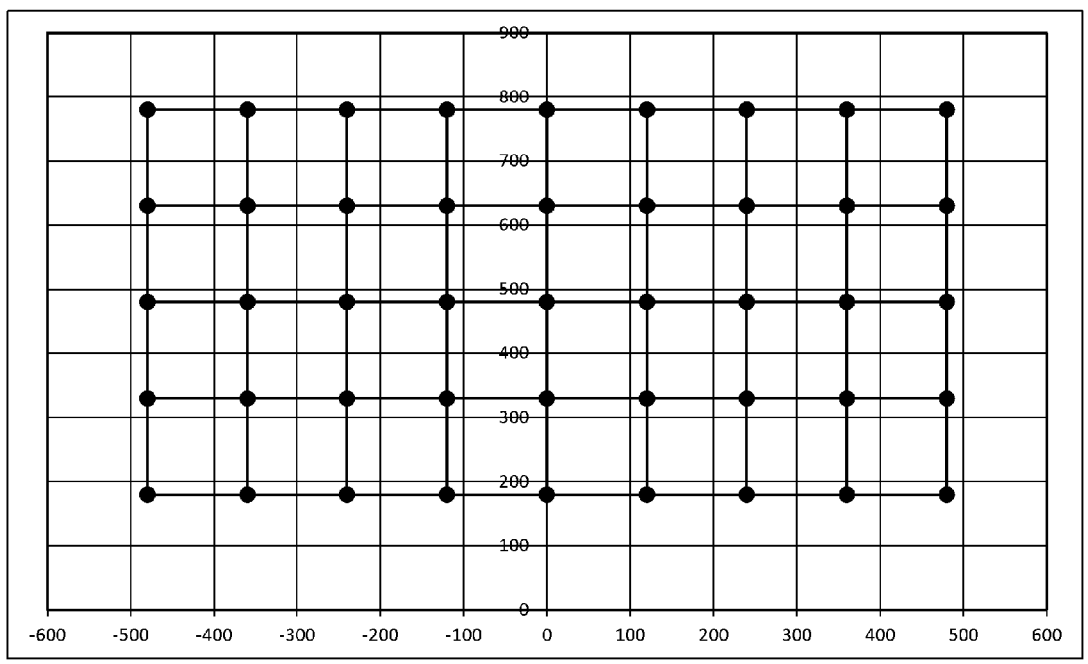
FIG. 13 shows a distortion lattice on the screen.
Figure 14:
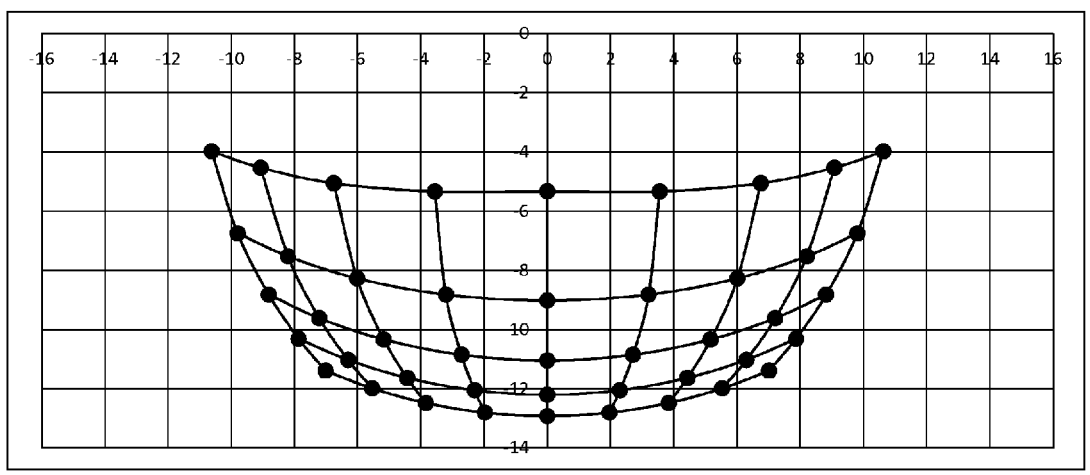
FIG. 14 shows a distortion lattice in the demagnifying-side image formation plane of the lens.

The projection image formed by the image formation section 2 will next be described. FIG. 13 shows a distortion lattice on the screen S. FIG. 14 shows the distortion lattice in the demagnifying-side image formation plane of the lens 3. The distortion lattice in the demagnifying-side image formation plane of the lens 3 is distorted but has no field curvature. The image formation section 2 forms a projection image that is an inverted final image turned upside down in the demagnifying-side image formation plane. The image formation section 2 forms an image distorted in advance in the demagnifying-side image formation plane of the lens 3 so that an oblong projection image is projected on the screen S, which is the magnifying-side image formation plane. That is, the image formation section 2 forms a distorted projection image corresponding to the distortion lattice shown in FIG. 14 in the demagnifying-side image formation plane so that a final image corresponding to the distortion lattice shown in FIG. 13 is projected on the screen S.

Lens Performance

Figure 15:
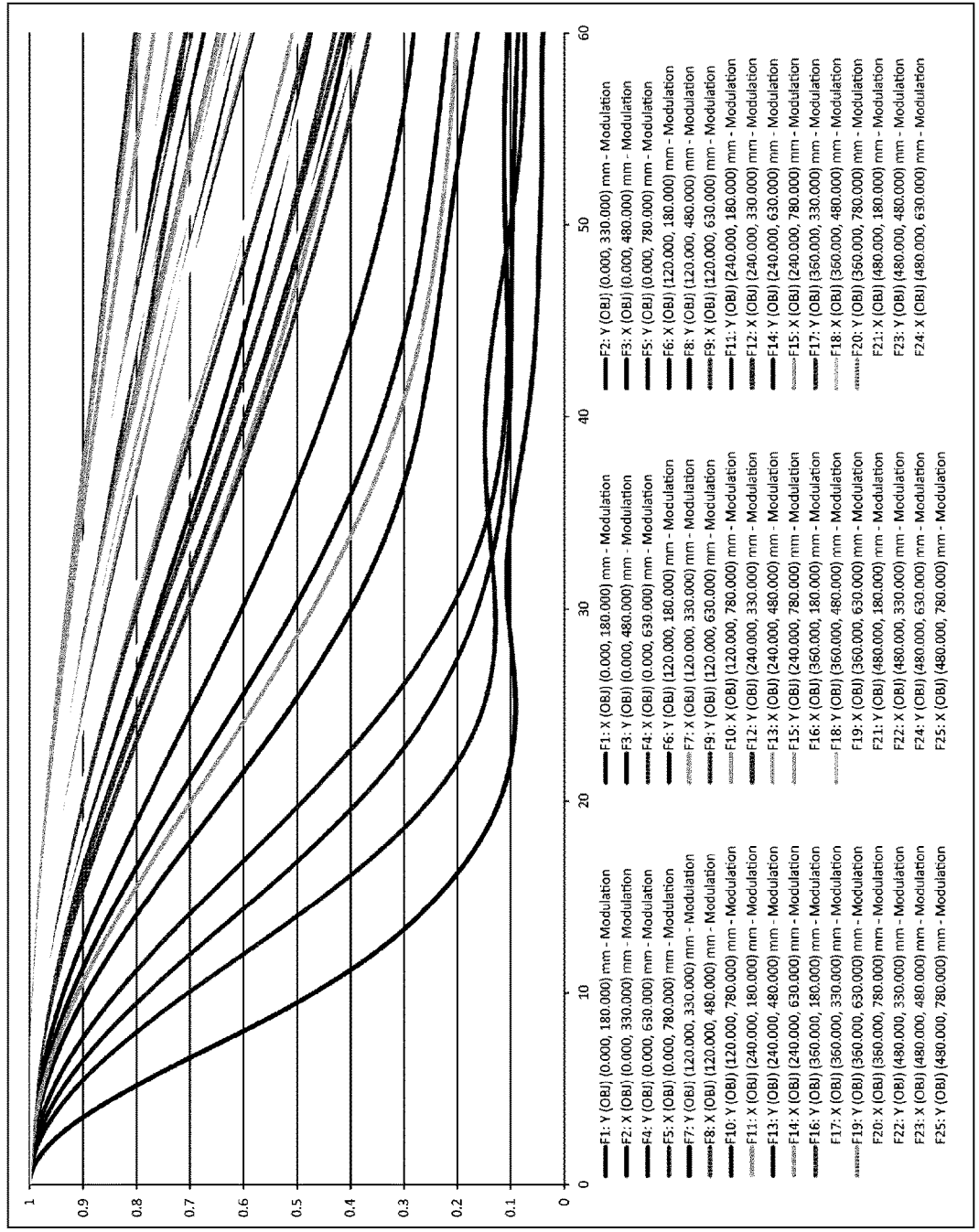
FIG. 15 shows an MTF of the lens according to Comparative Embodiment on the demagnifying side.
Figure 16:
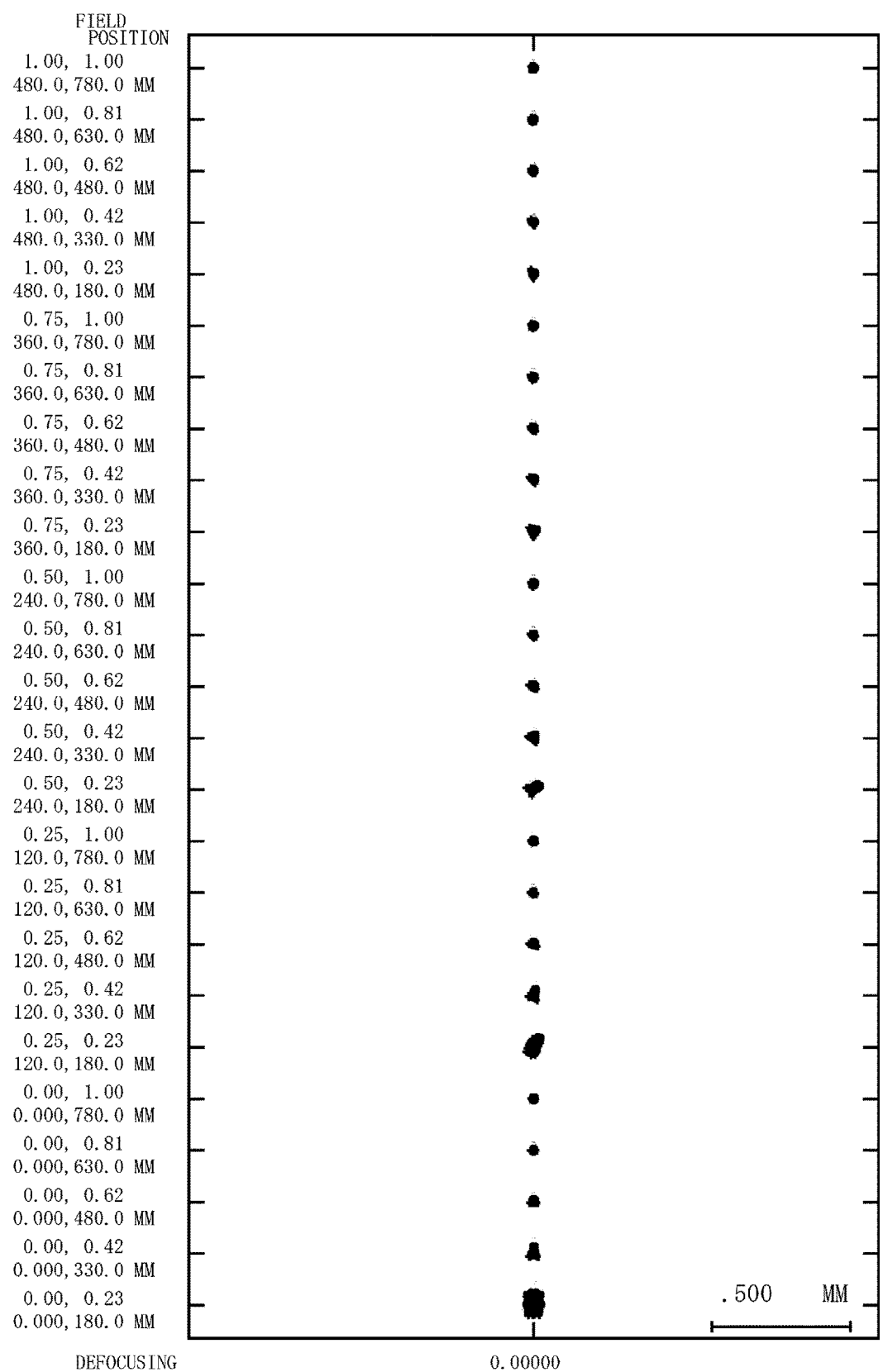
FIG. 16 is a spot diagram showing spots produced by the lens according to Comparative Embodiment.

FIG. 15 shows an MTF of the lens 3 according to Comparative Embodiment on the demagnifying side. The MTF was calculated in the same manner in the embodiment described above. FIG. 16 is a spot diagram showing spots produced by the lens 3 according to Comparative Embodiment.

The lens 3 according to the present embodiment does not satisfy the following conditional expression (1).

$$0°<\theta<90°+\gamma \qquad (1)$$

θ: Inclination angle over which an end of the imaginary line P facing the upper intersection 23 rotates counterclockwise relative to the imaginary vertical line V around the intersection of the imaginary vertical line V and the imaginary line P γ: angle from the imaginary axis L to the lower peripheral light ray 22b passing through the effective range 20 of the second transmissive surface 13 and intersects the imaginary axis L.

That is, in the present embodiment, the imaginary line P is parallel to the imaginary vertical line V. In other words, in the present embodiment, the pupil is perpendicular to the imaginary axis L. Therefore, θ=0°, which does not satisfy the conditional expression (1).

Since the conditional expression (1) is not satisfied, brightness at the upper periphery of the screen S decreases. That is, when the pupil is perpendicular to the imaginary axis L, the divergence angle θ0 of each of the light fluxes that reach the upper portion of the screen S decreases as the angle of view on the magnifying side increases. Further, the difference in the divergence angle θ0 between the light fluxes that reach the upper portion of the screen S and the light fluxes that reach the lower portion of the screen S increases. As a result, the amount of light at the upper periphery of the screen S is smaller than the amount of light at the lower periphery of the screen S.

Data on the divergence angle θ0 of each of light fluxes F1 to F5, which reach the corresponding image heights on the screen S, are shown below. The angle θ1 is the angle of the lower peripheral light ray of each of the light fluxes F1 to F5 and is the angle at which the lower peripheral light ray of each of the light fluxes F1 to F5 intersects the screen S. The angle $\theta 2$ is the angle of the upper peripheral light ray of each of the light fluxes F1 to F5 and is the angle at which the upper peripheral light ray of each of the light fluxes F1 to F5 intersects the screen S. The angle $\theta 0$ is the divergence angle and is the difference between $\theta 2$ and $\theta 1$. Reference character R denotes the divergence angle ratio. The divergence angle ratio is the proportion assuming that the divergence angle of the light flux F1, which has the highest divergence angle, is 100%.

| Light flux | θ1 | θ2 | θ0 | R |
|---|---|---|---|---|
| F1 | 30.26 | 30.73 | 0.48 | 100% |
| F2 | 47.07 | 47.31 | 0.24 | 51% |
| F3 | 57.46 | 57.59 | 0.14 | 29% |
| F4 | 64.10 | 64.19 | 0.09 | 18% |
| F5 | 68.60 | 68.66 | 0.06 | 13% |

In the present embodiment, the divergence angle $\theta 0$ of the light flux F5, which reaches the highest image height position, is 13% of the divergence angle $\theta 0$ of the light flux F1, which reaches the lowest image height position. The divergence angle $\theta 0$ of the light flux F4, which reaches the second highest image height position, is 18% of the divergence angle $\theta 0$ of the light flux F1, which reaches the lowest image height position. The divergence angle $\theta 0$ of the light flux F3, which reaches the third highest image height position, is 29% of the divergence angle $\theta 0$ of the light flux F1, which reaches the lowest image height position. The divergence angle $\theta 0$ of the light flux F4, which reaches the fourth highest image height position, is 51% of the divergence angle $\theta 0$ of the light flux F1, which reaches the lowest image height position.

Figure 17:
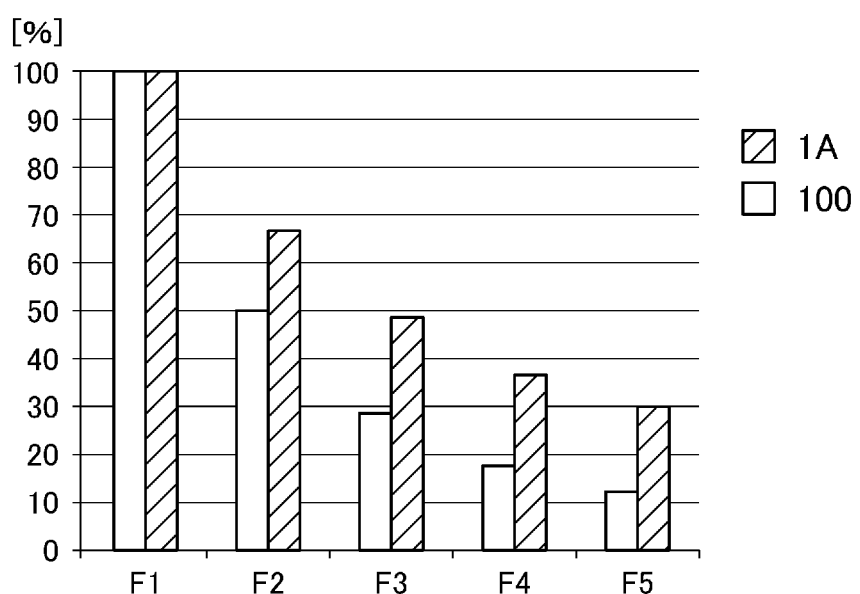
FIG. 17 shows graphs that compare a divergence angle of each light flux between Embodiment 1 and Comparative Embodiment.

FIG. 17 shows graphs that compare the divergence angle $\theta 0$ of each of light fluxes F1 to F5, which reach the corresponding image heights on the screen S, between Embodiment 1 and Comparative Embodiment. In the projection-type image display apparatus 1A according to Embodiment 1, the divergence angle $\theta 0$ of all the light rays of the light fluxes F2 to F5 is greater than the divergence angle $\theta 0$ of the light rays of the light fluxes F2 to F5 in the projection-type image display apparatus 100 according to Comparative Embodiment, as shown in FIG. 17. Embodiment 1 can therefore suppress, as compared with Comparative Embodiment, the degree by which the amount of light at the upper periphery of the screen S is smaller than the amount of light at the lower periphery.

Embodiment 2

Figure 18:
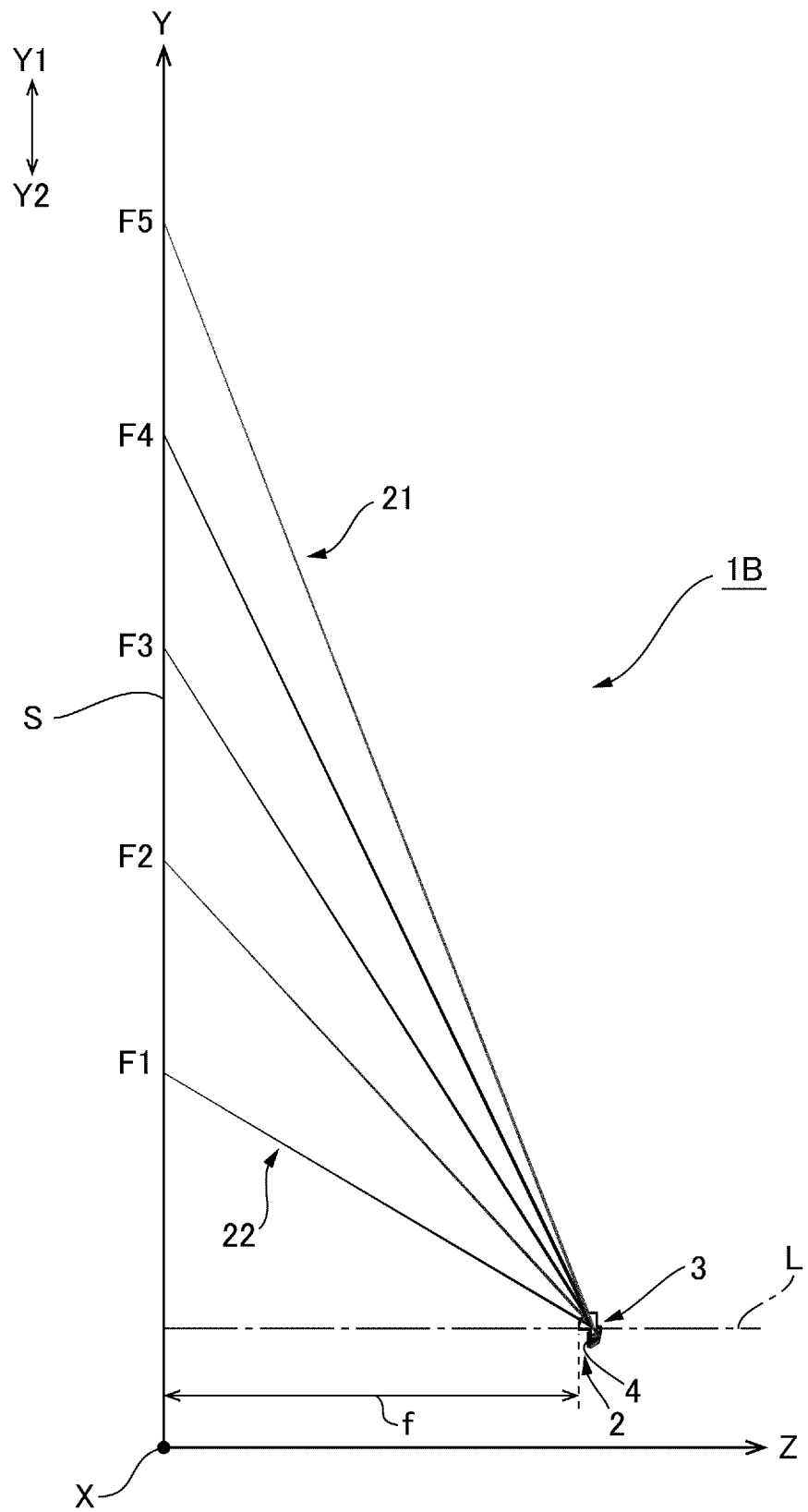
FIG. 18 is a light ray diagram of a projection-type image display apparatus according to Embodiment 2.
Figure 19:
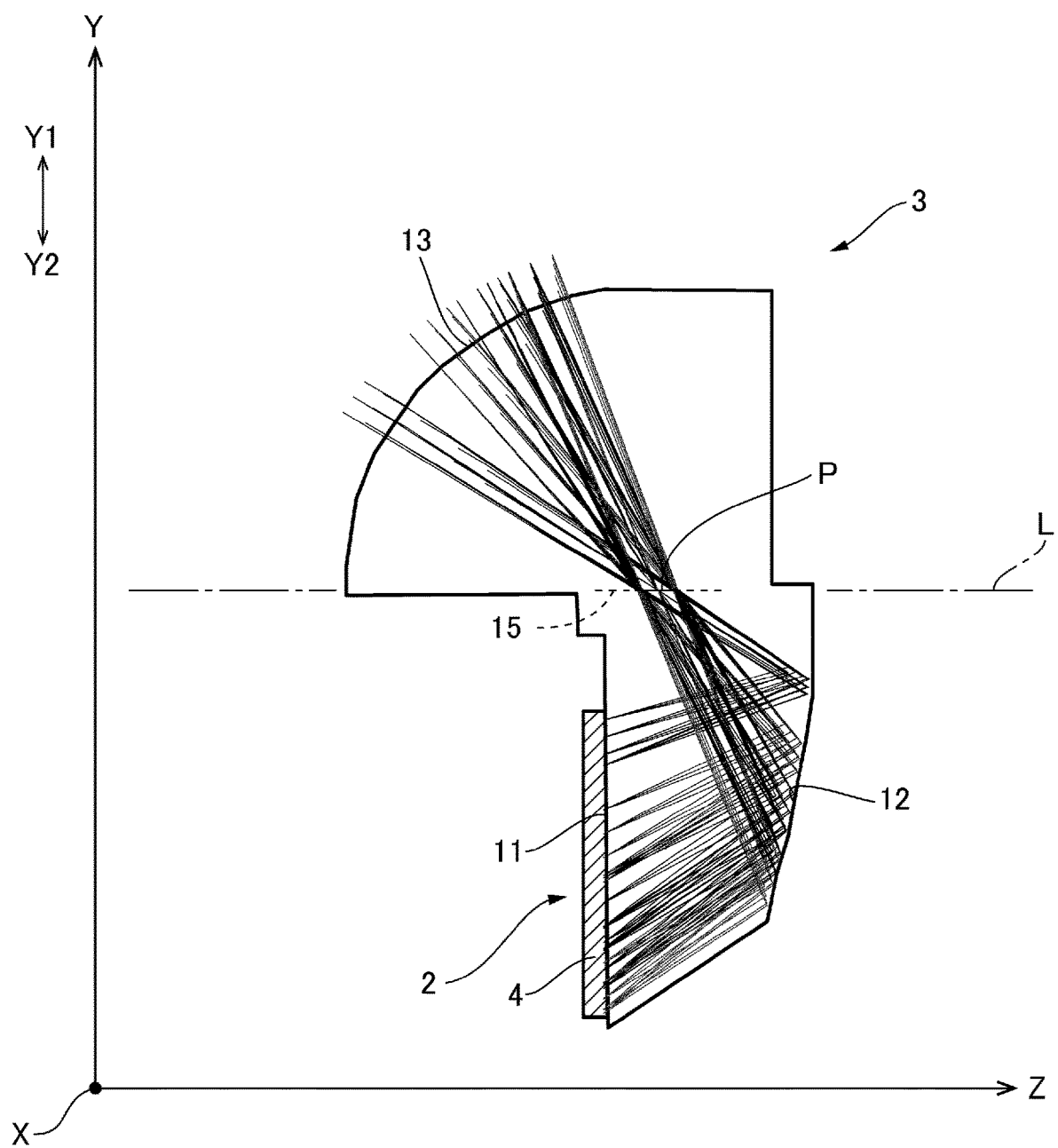
FIG. 19 is a light ray diagram showing light rays passing through a lens in the projection-type image display apparatus according to Embodiment 2.
Figure 20:
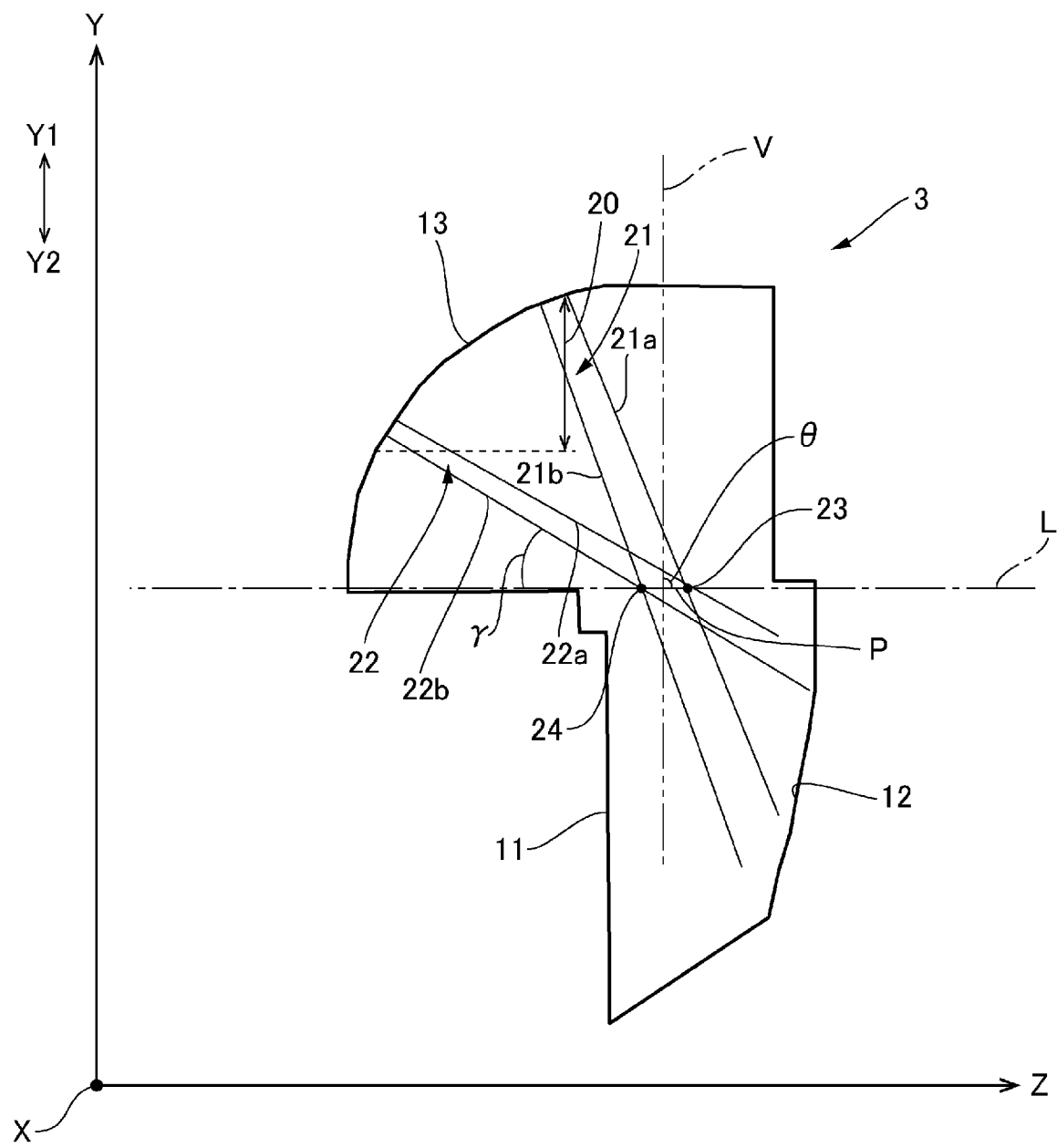
FIG. 20 describes an imaginary line specified in the lens in FIG. 19.

A projection-type image display apparatus according to Embodiment 2, to which the present disclosure is applied, will next be described. FIG. 18 is a light ray diagram of the projection-type image display apparatus according to Embodiment 2. FIG. 19 is a light ray diagram showing light rays passing through a lens in the projection-type image display apparatus according to Embodiment 2. FIG. 20 describes the imaginary line P specified in the lens. A projection-type image display apparatus 1B according to the present embodiment differs from the projection-type image display apparatus 1A according to Embodiment 1 in terms of the angle by which the imaginary line P inclines with respect to the imaginary vertical line V but is the same as the projection-type image display apparatus 1A according to Embodiment 1 in terms of the other configurations. The components corresponding to those of the projection-type image display apparatus 1A according to Embodiment 1 therefore have the same reference characters.

The projection-type image display apparatus 1B according to the present embodiment includes the image formation section 2 and the lens 3, as shown in FIG. 18. The image formation section 2 is disposed on the demagnifying side of the lens 3. The image formation section 2 is a display. The display, for example, includes a light source apparatus and a light modulator. The light modulator includes the liquid crystal light valve 4. The lens 3 is made of resin. The lens 3 has the first transmissive surface 11, the reflective surface 12, and the second transmissive surface 13 sequentially arranged from the demagnifying side toward the magnifying side, as shown in FIG. 19. The liquid crystal light valve 4 is attached to the first transmissive surface 11. The projection image displayed on the liquid crystal light valve 4 is projected on the screen S via the first transmissive surface 11, the reflective surface 12, and the second transmissive surface 13 in the present order. The final image projected on the screen S has an oblong shape elongated in the lateral direction. The final image has the aspect ratio of 16:10. Also in the present embodiment, the imaginary axis L extending in the axis-Z direction is set in the plane YZ. The imaginary axis L is the reference axis used in the design of the lens.

The first transmissive surface 11 and the reflective surface 12 are located at the lower side Y2 of the imaginary axis L. The second transmissive surface 13 is located at the upper side Y1 of the imaginary axis L. The reflective surface 12 has a concave shape. The reflective surface 12 is provided by externally forming a reflective coating on the lens 3. The second transmissive surface 13 has a convex shape protruding toward the magnifying side. The first transmissive surface 11, the reflective surface 12, and the second transmissive surface 13 form a coaxial optical system. Therefore, the imaginary axis L is the reference axis used in the design of the lens 3 and is the optical axis of the lens 3. The upper and lower halves of the lens 3 are configured to be rotationally symmetric with respect to the imaginary axis L. That is, the first transmissive surface 11, the reflective surface 12, and the second transmissive surface 13 are so shaped that the cross-sectional shape in the plane YZ shown in FIG. 19 is rotated around the imaginary axis L over the angular range of 90° toward one side and the other side of the axis-X direction.

The imaginary line P can be specified in the lens 3, as shown in FIG. 20. The imaginary line P connects the upper intersection 23 to the lower intersection 24, the upper intersection 23 being an intersection where the upper peripheral light ray 21a of the upper-end light flux 21, where the upper-end light flux 21 is the light flux passing through the axis-Y-direction upper end of the effective range 20 of the second transmissive surface 13, and the upper peripheral light ray 22a of the lower-end light flux 22, where the lower-end light flux 22 is the light flux passing through the axis-Y-direction lower end of the effective range 20, intersect with each other in the plane YZ, and the lower intersection 24 being an intersection where the lower peripheral light ray 21b of the upper-end light flux 21 and the lower peripheral light ray 22b of the lower-end light flux 22 intersect with each other in the plane YZ. The imaginary line P inclines with respect to the imaginary vertical line V, which is perpendicular to the imaginary axis L in the plane YZ. In the present embodiment, the imaginary axis L, which is the optical axis, passes through the center of the imaginary line P. The imaginary line P is therefore the pupil in the plane YZ.

Lens data on the lens 3 according to Embodiment 2 are as follows: In the lens data, the surface number 1 is the second transmissive surface 13 and is a refractive surface. The surface number 2 is the pupil. The surface number 3 is the reflective surface 12. The surface number 4 is the first transmissive surface 11 and is a refractive surface. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | Surface type | r | d | nd | vd | Y | X |
|---|---|---|---|---|---|---|---|
| Object plane | Spherical | 0 | 295 | | | | |
| 1 | Aspheric | 15 | 10 | 1.531132 | 55.75 | 9.298 | 9.298 |
| 2 | Spherical | 0 | 5 | 1.531132 | 55.75 | 0.65 | 1 |
| 3 | Aspheric | −11 | −6.7085 | 1.531132 | 55.75 | 10.326 | 10.326 |
| 4 (Image plane) | Spherical | 0 | 0 | 1.531132 | 55.75 | 13.715 | 13.715 |

The refractive index nd of the lens 3 is 1.531132. The Abbe number vd of the lens 3 is 55.75. The on-axis inter-surface distance d in the field of the object plane is the distance between the screen S and the surface number 1. The on-axis inter-surface distance d in the field of the object plane is therefore the projection distance f of the projection-type image display apparatus 1B. In the present embodiment, f=295 mm.

In the present embodiment, the surface number 1 is an aspheric surface. The decenter & return α of the surface number 2 is −90°. That is, the pupil inclines with respect to the imaginary vertical line V, which is perpendicular to the optical axis in the plane YZ, and is parallel to the imaginary axis L. The surface number 3 is an aspheric surface. The surface number 4 is a spherical surface.

Aspheric data of the surface number 1 are as follows.

| | |
|---|---|
| Conic constant | 1.15204E+00 |
| Fourth-order coefficient | 8.342038E−04 |
| Sixth-order coefficient | −1.131847E−05 |
| Eighth-order coefficient | 9.347004E−08 |
| Tenth-order coefficient | −1.983545E−10 |

Aspheric data of the surface number 3 are as follows:

| | |
|---|---|
| Conic constant | −1.267929E+02 |
| Fourth-order coefficient | −1.683019E−04 |
| Sixth-order coefficient | 1.672023E−06 |
| Eighth-order coefficient | −9.961324E−09 |
| Tenth-order coefficient | 2.404807E−11 |

Projection Image

Figure 21:
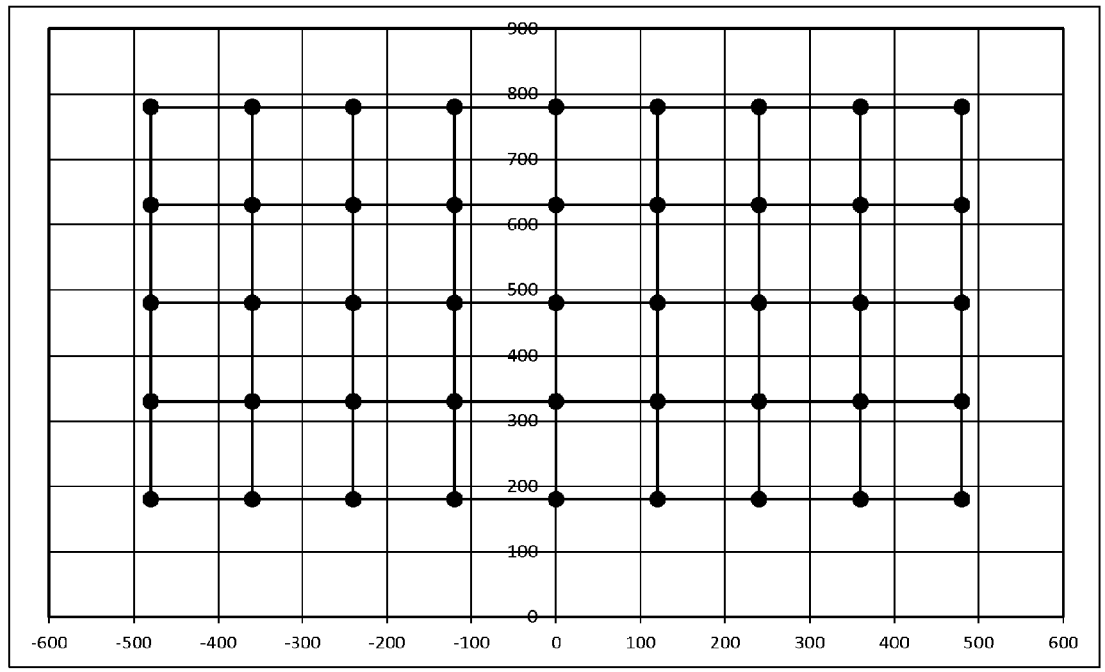
FIG. 21 shows a distortion lattice on the screen.
Figure 22:
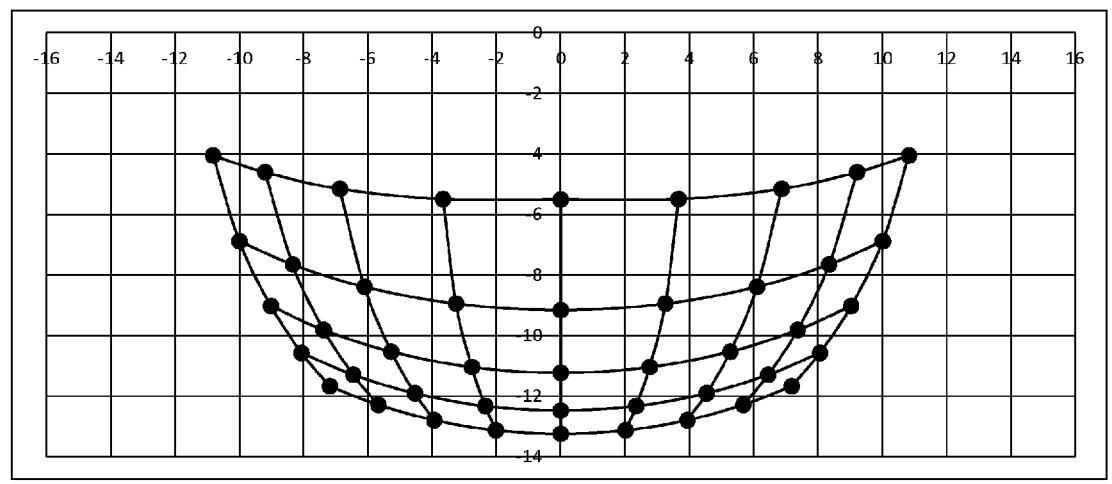
FIG. 22 shows a distortion lattice in the demagnifying-side image formation plane of the lens.

The projection image formed by the image formation section 2 will next be described. FIG. 21 shows a distortion lattice on the screen S. FIG. 22 shows the distortion lattice in the demagnifying-side image formation plane of the lens 3. The distortion lattice in the demagnifying-side image formation plane of the lens 3 is distorted but has no field curvature. The image formation section 2 forms a projection image that is an inverted final image turned upside down in the demagnifying-side image formation plane. The image formation section 2 forms an image distorted in advance in the demagnifying-side image formation plane of the lens 3 so that an oblong projection image is projected on the screen S, which is the magnifying-side image formation plane. That is, the image formation section 2 forms a distorted projection image corresponding to the distortion lattice shown in FIG. 22 in the demagnifying-side image formation plane so that a final image corresponding to the distortion lattice shown in FIG. 21 is projected on the screen S.

Lens Performance

Figure 23:
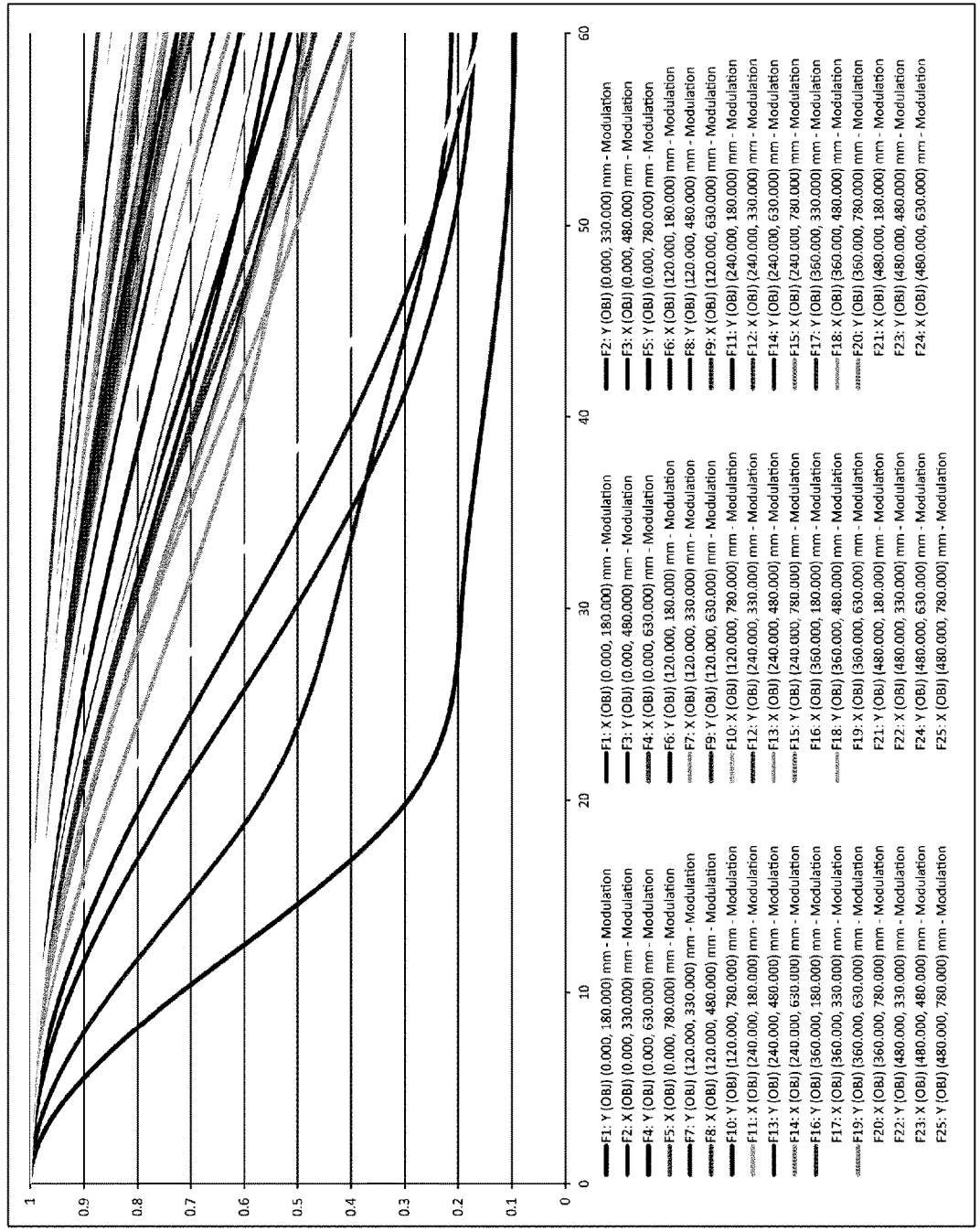
FIG. 23 shows an MTF of the lens according to Embodiment 2 on the demagnifying side.
Figure 24:
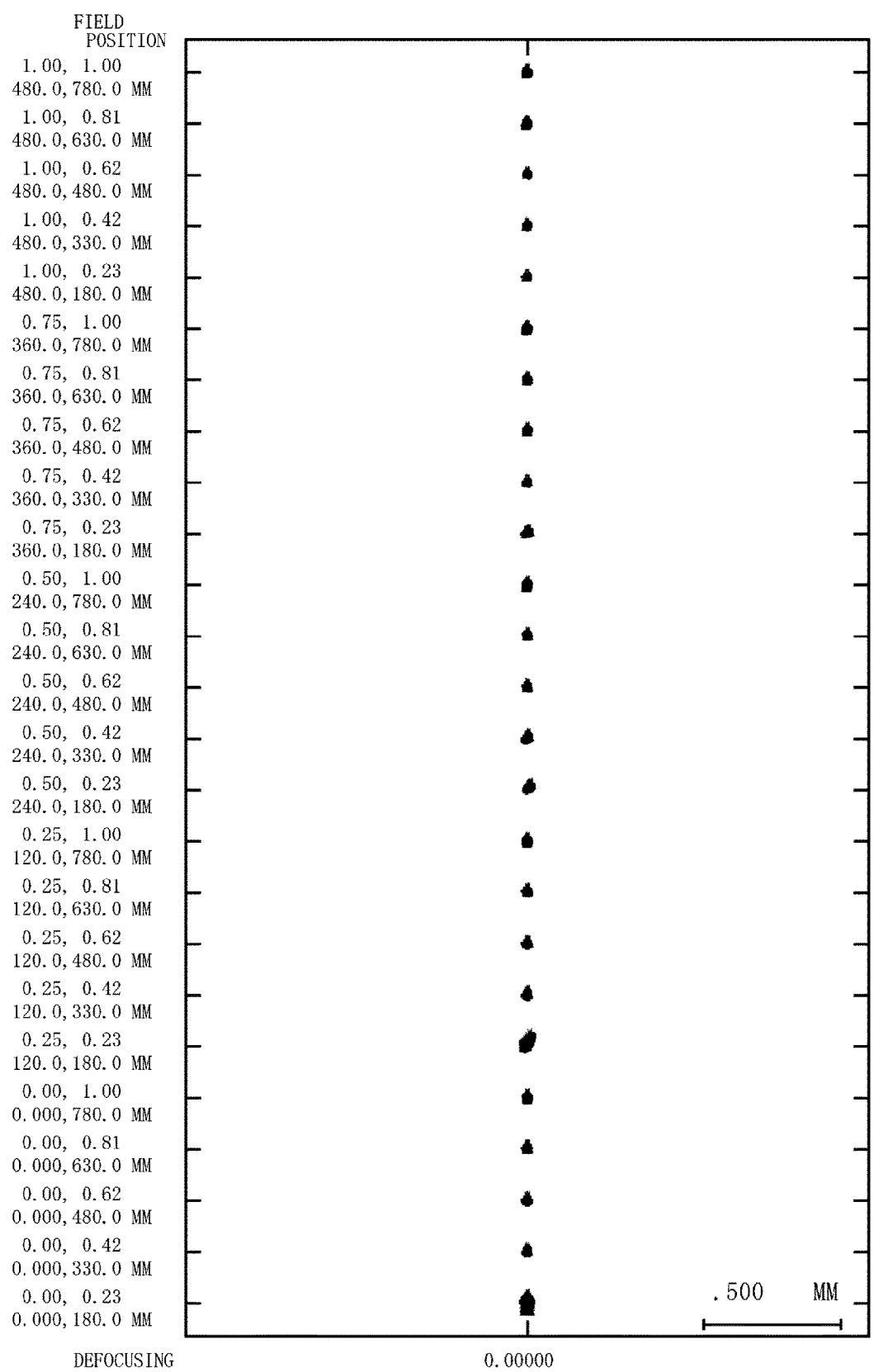
FIG. 24 is a spot diagram showing spots produced by the lens according to Embodiment 2.

In the present embodiment, the reflective surface 12 and the second transmissive surface 13 are each an aspheric surface. The amount of aberrations produced by the lens can therefore be suppressed. FIG. 23 shows an MTF of the lens 3 according to Embodiment 2 on the demagnifying side. The MTF was calculated in the same manner in the embodiments described above. FIG. 24 is a spot diagram showing spots produced by the lens 3 according to Embodiment 2. The MTF and the spot diagram show the same tendencies as those in Embodiment 1.

The lens 3 according to the present embodiment satisfies the following conditional expression (1).

$$0°<\theta<90°+\gamma \quad (1)$$

θ: Inclination angle over which an end of the imaginary line P facing the upper intersection 23 rotates counterclockwise relative to the imaginary vertical line V around the intersection of the imaginary vertical line V and the imaginary line P γ: angle from the imaginary axis L to the lower peripheral light ray 22b passing through the effective range 20 of the second transmissive surface 13 and intersects the imaginary axis L.

That is, in the present embodiment, the imaginary line P inclines by 90° with respect to the imaginary vertical line V. In other words, the pupil inclines by 90° with respect to the imaginary vertical line V and is parallel to the imaginary axis L. Therefore, θ=90°, which satisfies the conditional expression (1).

In the present embodiment, in which the conditional expression (1) is satisfied, the pupil inclines with respect to the imaginary vertical line V. In the case where θ=0° in the conditional expression (1), the imaginary line P is perpendicular to the imaginary axis L. That is, the pupil is perpendicular to the design reference axis. In the case where θ is greater than the upper limit in the conditional expression (1), the lower-end light flux 22 is blocked. In the present embodiment, in which the conditional expression (1) is satisfied, the lower-end light flux 22 passing through the lower end of the effective range 20 of the second transmissive surface 13 is not blocked and reaches the screen S.

Further, since the lens 3 according to the present embodiment satisfies the conditional expression (1), a decrease of brightness at the upper periphery of the screen S can be suppressed, as compared with the case where the imaginary line P is parallel to the imaginary vertical line V. That is, when the pupil inclines with respect to the imaginary vertical line V, which is perpendicular to the imaginary line P, the divergence angle θ0 of each of the light fluxes that reach the upper portion of the screen S increases. The amount of light that reaches the upper portion of the screen S therefore increases. Further, when the divergence angle θ0 of each of the light fluxes that reach the upper portion of the screen S increases, the difference in the divergence angle θ0 between the light fluxes that reach the upper portion of the image formation plane and the light fluxes that reach the lower portion of the image formation plane decreases. The situation in which the amount of light at the upper periphery of the screen S is smaller than the amount of light at the lower periphery of the screen S can therefore be suppressed.

Data on the divergence angle θ0 of each of light fluxes F1 to F5, which reach the corresponding image heights on the screen S, are shown below. The angle θ1 is the angle of the lower peripheral light ray of each of the light fluxes F1 to F5 and is the angle at which the lower peripheral light ray of each of the light fluxes F1 to F5 intersects the screen S. The angle θ2 is the angle of the upper peripheral light ray of each of the light fluxes F1 to F5 and is the angle at which the upper peripheral light ray of each of the light fluxes F1 to F5 intersects the screen S. The angle θ0 is the divergence angle and is the difference between θ2 and θ1. Reference character R denotes the divergence angle ratio. The divergence angle ratio is the proportion assuming that the divergence angle of the light flux F1, which has the highest divergence angle, is 100%.

| Light flux | θ1 | θ2 | θ0 | R |
|---|---|---|---|---|
| F1 | 30.40 | 30.59 | 0.19 | 100% |
| F2 | 47.11 | 47.30 | 0.18 | 94% |
| F3 | 57.47 | 57.62 | 0.15 | 78% |
| F4 | 64.10 | 64.22 | 0.13 | 64% |
| F5 | 68.59 | 68.70 | 0.11 | 54% |

In the present embodiment, the divergence angle θ0 of the light flux F5, which reaches the highest image height position, is 54% of the divergence angle θ0 of the light flux F1, which reaches the lowest image height position. The divergence angle θ0 of the light flux F4, which reaches the second highest image height position, is 64% of the divergence angle θ0 of the light flux F1, which reaches the lowest image height position. The divergence angle θ0 of the light flux F3, which reaches the third highest image height position, is 78% of the divergence angle θ0 of the light flux F1, which reaches the lowest image height position. The divergence angle θ0 of the light flux F2, which reaches the fourth highest image height position, is 94% of the divergence angle θ0 of the light flux F1, which reaches the lowest image height position. These values are greater than those when the imaginary line P is perpendicular to the imaginary axis L, that is, as compared with the values in the projection-type image display apparatus 100 according to Comparative Embodiment. The amount of light of the light fluxes that reach the upper portion of the screen S therefore increases.

Embodiment 3

Figure 25:
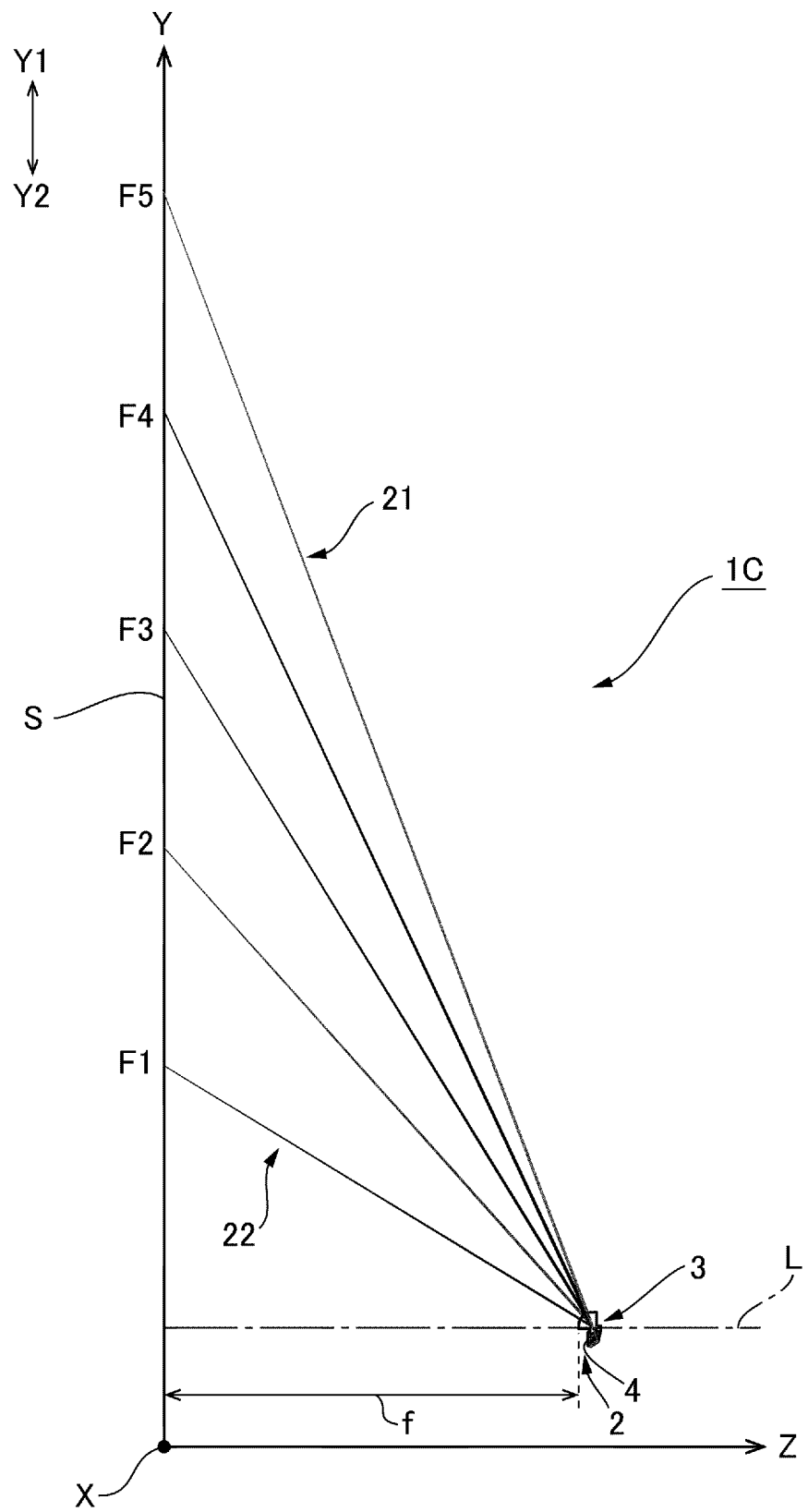
FIG. 25 is a light ray diagram of a projection-type image display apparatus according to Embodiment 3.
Figure 26:
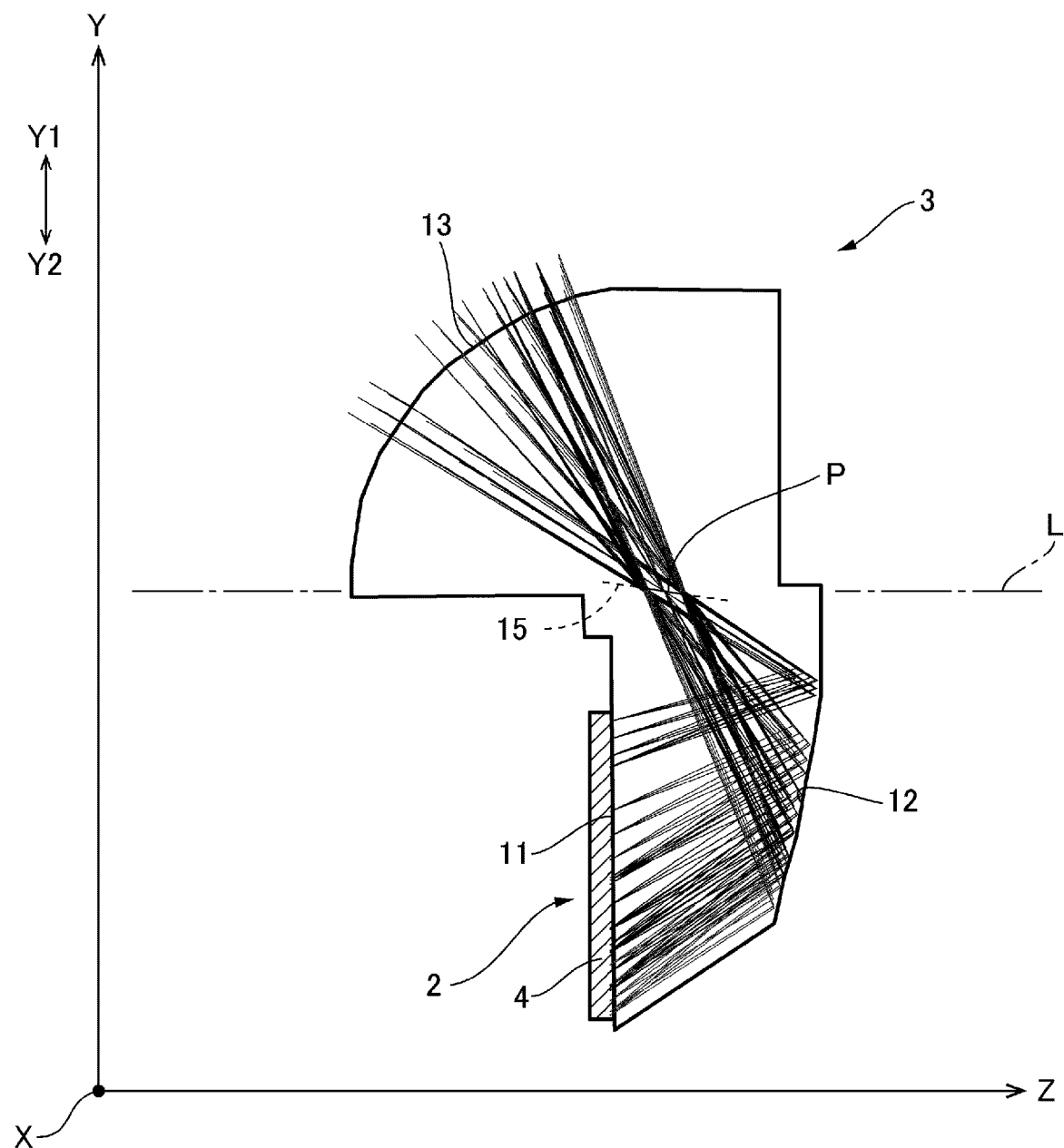
FIG. 26 is a light ray diagram showing light rays passing through a lens in the projection-type image display apparatus according to Embodiment 3.
Figure 27:
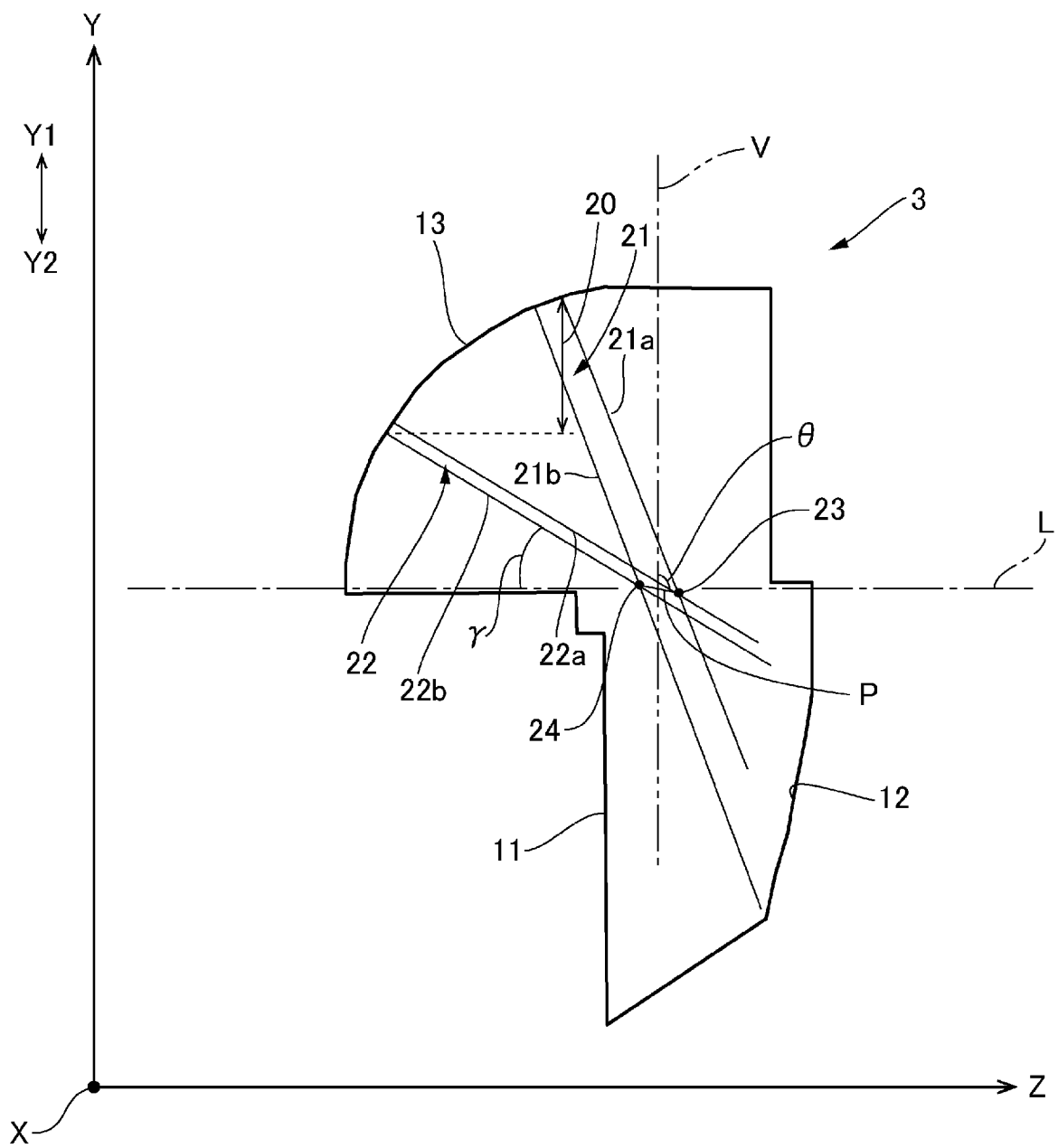
FIG. 27 describes an imaginary line specified in the lens in FIG. 26.

A projection-type image display apparatus according to Embodiment 3, to which the present disclosure is applied, will next be described. FIG. 25 is a light ray diagram of the projection-type image display apparatus according to Embodiment 3. FIG. 26 is a light ray diagram showing light rays passing through a lens in the projection-type image display apparatus according to Embodiment 3. FIG. 27 describes the imaginary line P specified in the lens. A projection-type image display apparatus 1C according to the present embodiment differs from the projection-type image display apparatus 1A according to Embodiment 1 in terms of the angle by which the imaginary line P inclines with respect to the imaginary vertical line V but is the same as the projection-type image display apparatus 1A according to Embodiment 1 in terms of the other configurations. The components corresponding to those of the projection-type image display apparatus 1A according to Embodiment 1 therefore have the same reference characters.

The projection-type image display apparatus 1C according to the present embodiment includes the image formation section 2 and the lens 3, as shown in FIG. 25. The image formation section 2 is disposed on the demagnifying side of the lens 3. The image formation section 2 is a display. The display, for example, includes a light source apparatus and a light modulator. The light modulator includes the liquid crystal light valve 4. The lens 3 is made of resin. The lens 3 has the first transmissive surface 11, the reflective surface 12, and the second transmissive surface 13 sequentially arranged from the demagnifying side toward the magnifying side, as shown in FIG. 26. The liquid crystal light valve 4 is attached to the first transmissive surface 11. The projection image displayed on the liquid crystal light valve 4 is projected on the screen S via the first transmissive surface 11, the reflective surface 12, and the second transmissive surface 13 in the present order. The final image projected on the screen S has an oblong shape elongated in the lateral direction. The final image has the aspect ratio of 16:10. Also in the present embodiment, the imaginary axis L extending in the axis-Z direction is set in the plane YZ. The imaginary axis L is the reference axis used in the design of the lens.

The first transmissive surface 11 and the reflective surface 12 are located at the lower side Y2 of the imaginary axis L. The second transmissive surface 13 is located at the upper side Y1 of the imaginary axis L. The reflective surface 12 has a concave shape. The reflective surface 12 is provided by externally forming a reflective coating on the lens 3. The second transmissive surface 13 has a convex shape protruding toward the magnifying side. The first transmissive surface 11, the reflective surface 12, and the second transmissive surface 13 form a coaxial optical system. Therefore, the imaginary axis L is the reference axis used in the design of the lens 3 and is the optical axis of the lens 3. The upper and lower halves of the lens 3 are configured to be rotationally symmetric with respect to the imaginary axis L. That is, the first transmissive surface 11, the reflective surface 12, and the second transmissive surface 13 are so shaped that the cross-sectional shape in the plane YZ shown in FIG. 26 is rotated around the imaginary axis L over the angular range of 90° toward one side and the other side of the axis-X direction.

The imaginary line P can be specified in the lens 3, as shown in FIG. 27. The imaginary line P connects the upper intersection 23 to the lower intersection 24, the upper intersection 23 being an intersection where the upper peripheral light ray 21a of the upper-end light flux 21, where the upper-end light flux 21 is the light flux passing through the axis-Y-direction upper end of the effective range 20 of the second transmissive surface 13, and the upper peripheral light ray 22a of the lower-end light flux 22, where the lower-end light flux 22 is the light flux passing through the axis-Y-direction lower end of the effective range 20, intersect with each other in the plane YZ, and the lower intersection 24 being an intersection where the lower peripheral light ray 21b of the upper-end light flux 21 and the lower peripheral light ray 22b of the lower-end light flux 22 intersect with each other in the plane YZ. The imaginary line P inclines by 100° with respect to the imaginary vertical line V, which is perpendicular to the imaginary axis L in the plane YZ. In the present embodiment, the imaginary axis L, which is the optical axis, passes through the center of the imaginary line P. The imaginary line P is therefore the pupil in the plane YZ.

Lens data on the lens 3 according to Embodiment 3 are as follows: In the lens data, the surface number 1 is the second transmissive surface 13 and is a refractive surface. The surface number 2 is the pupil. The surface number 3 is the reflective surface 12. The surface number 4 is the first transmissive surface 11 and is a refractive surface. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | Surface type | r | d | nd | vd | Y | X |
|---|---|---|---|---|---|---|---|
| Object plane | Spherical | 0 | 295 | | | | |
| 1 | Aspheric | 15 | 10 | 1.531132 | 55.75 | 9.282 | 9.282 |
| 2 | Spherical | 0 | 5 | 1.531132 | 55.75 | 0.65 | 1 |
| 3 | Aspheric | −11 | −6.7044 | 1.531132 | 55.75 | 10.296 | 10.296 |
| 4 (Image plane) | Spherical | 0 | 0 | 1.531132 | 55.75 | 13.718 | 13.718 |

The refractive index nd of the lens 3 is 1.531132. The Abbe number vd of the lens 3 is 55.75. The on-axis inter-surface distance d in the field of the object plane is the distance between the screen S and the surface number 1. The on-axis inter-surface distance d in the field of the object plane is therefore the projection distance f of the projection-type image display apparatus 1C. In the present embodiment, f=295 mm.

In the present embodiment, the surface number 1 is an aspheric surface. The decenter & return α of the surface number 2 is −100°. That is, the pupil inclines by 100° with respect to the imaginary vertical line V, which is perpendicular to the optical axis in the plane YZ. The surface number 3 is an aspheric surface. The surface number 4 is a spherical surface.

Aspheric data of the surface number 1 are as follows.

| Conic constant | 1.160286E+00 |
|---|---|
| Fourth-order coefficient | 8.34994E−04 |
| Sixth-order coefficient | −1.1E−05 |
| Eighth-order coefficient | 8.69E−08 |
| Tenth-order coefficient | −1.65E−10 |

Aspheric data of the surface number 3 are as follows:

| Conic constant | −1.344131E+02 |
|---|---|
| Fourth-order coefficient | −1.75603E−04 |
| Sixth-order coefficient | 1.79E−06 |
| Eighth-order coefficient | −1.08E−08 |
| Tenth-order coefficient | 2.64E−11 |

Projection Image

Figure 28:
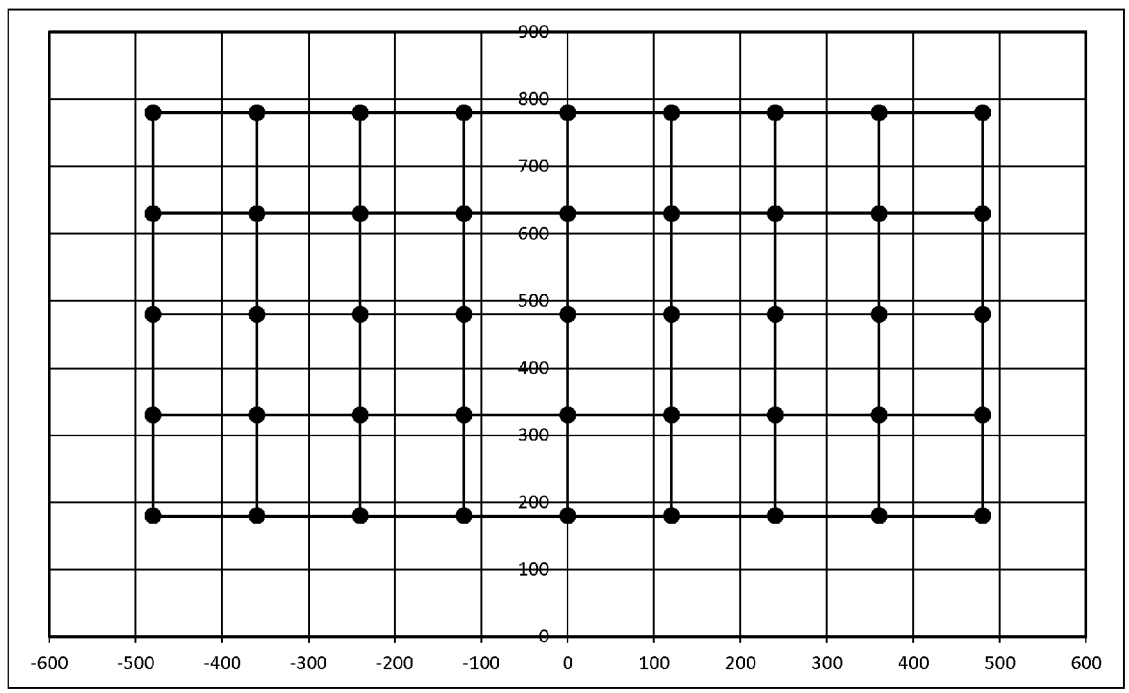
FIG. 28 shows a distortion lattice on the screen.
Figure 29:
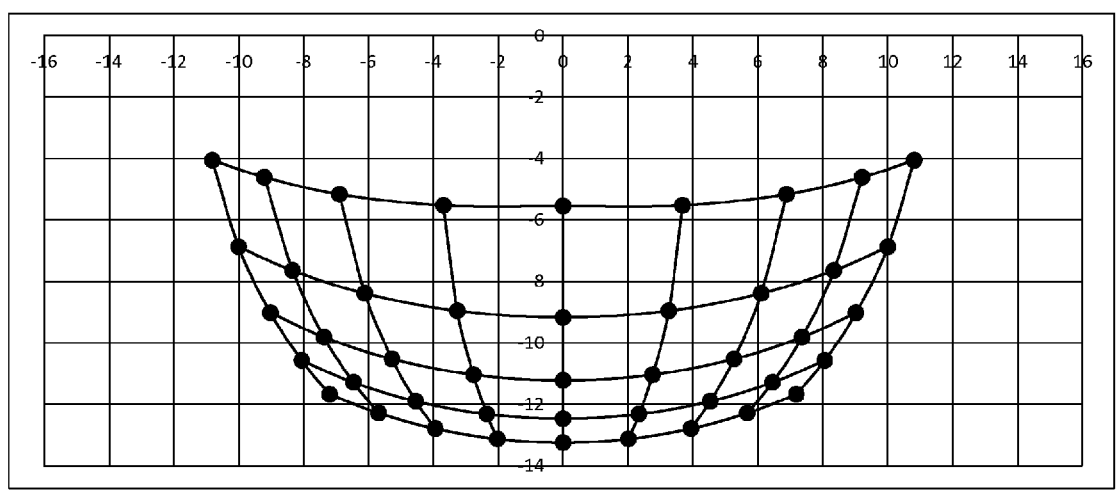
FIG. 29 shows a distortion lattice in the demagnifying-side image formation plane of the lens.

The projection image formed by the image formation section 2 will next be described. FIG. 28 shows a distortion lattice on the screen S. FIG. 29 shows the distortion lattice in the demagnifying-side image formation plane of the lens 3. The distortion lattice in the demagnifying-side image formation plane of the lens 3 is distorted but has no field curvature. The image formation section 2 forms a projection image that is an inverted final image turned upside down in the demagnifying-side image formation plane. The image formation section 2 forms an image distorted in advance in the demagnifying-side image formation plane of the lens 3 so that an oblong projection image is projected on the screen S, which is the magnifying-side image formation plane. That is, the image formation section 2 forms a distorted projection image corresponding to the distortion lattice shown in FIG. 29 in the demagnifying-side image formation plane so that a final image corresponding to the distortion lattice shown in FIG. 28 is projected on the screen S.

Lens Performance

Figure 30:
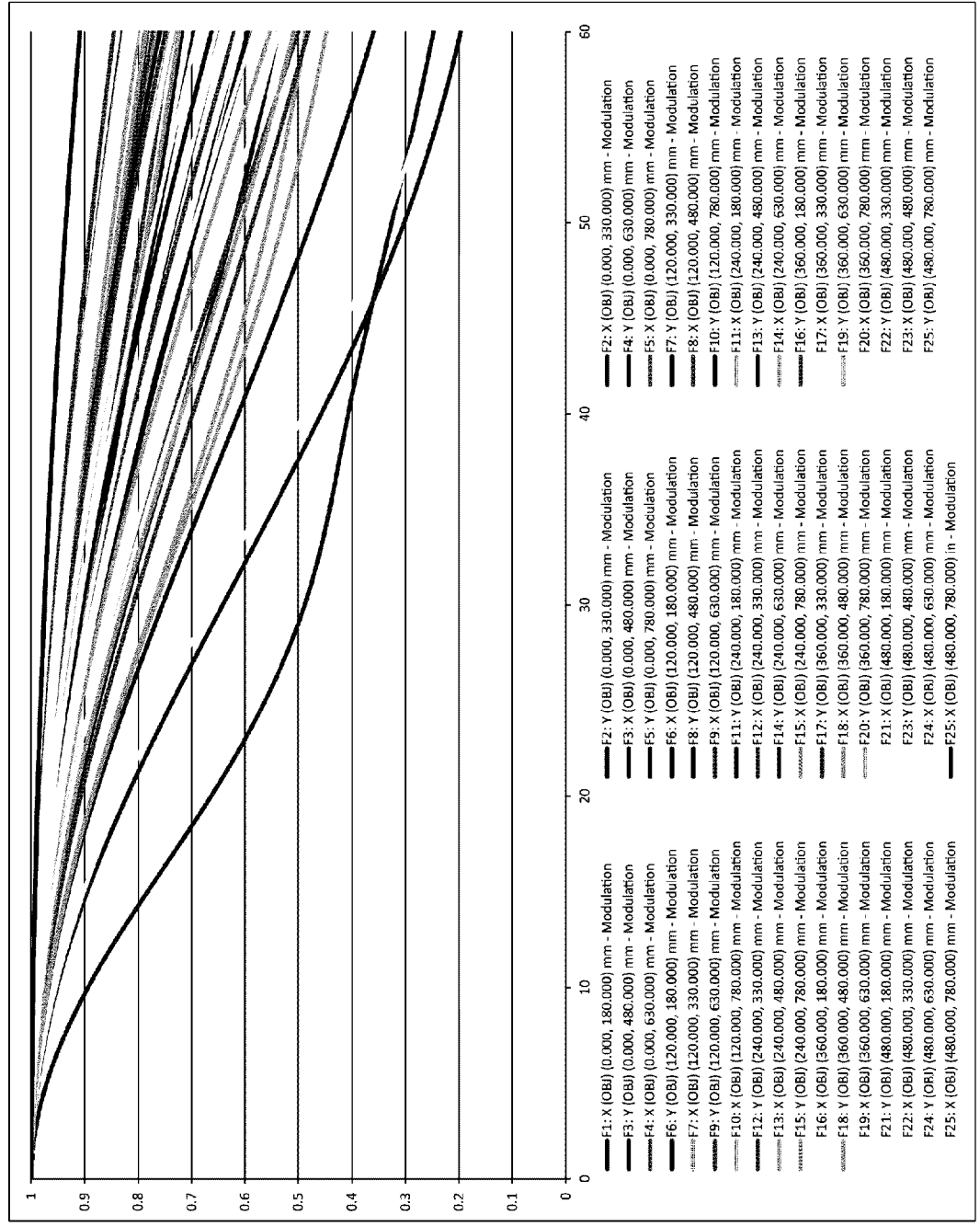
FIG. 30 shows an MTF of the lens according to Embodiment 3 on the demagnifying side.
Figure 31:
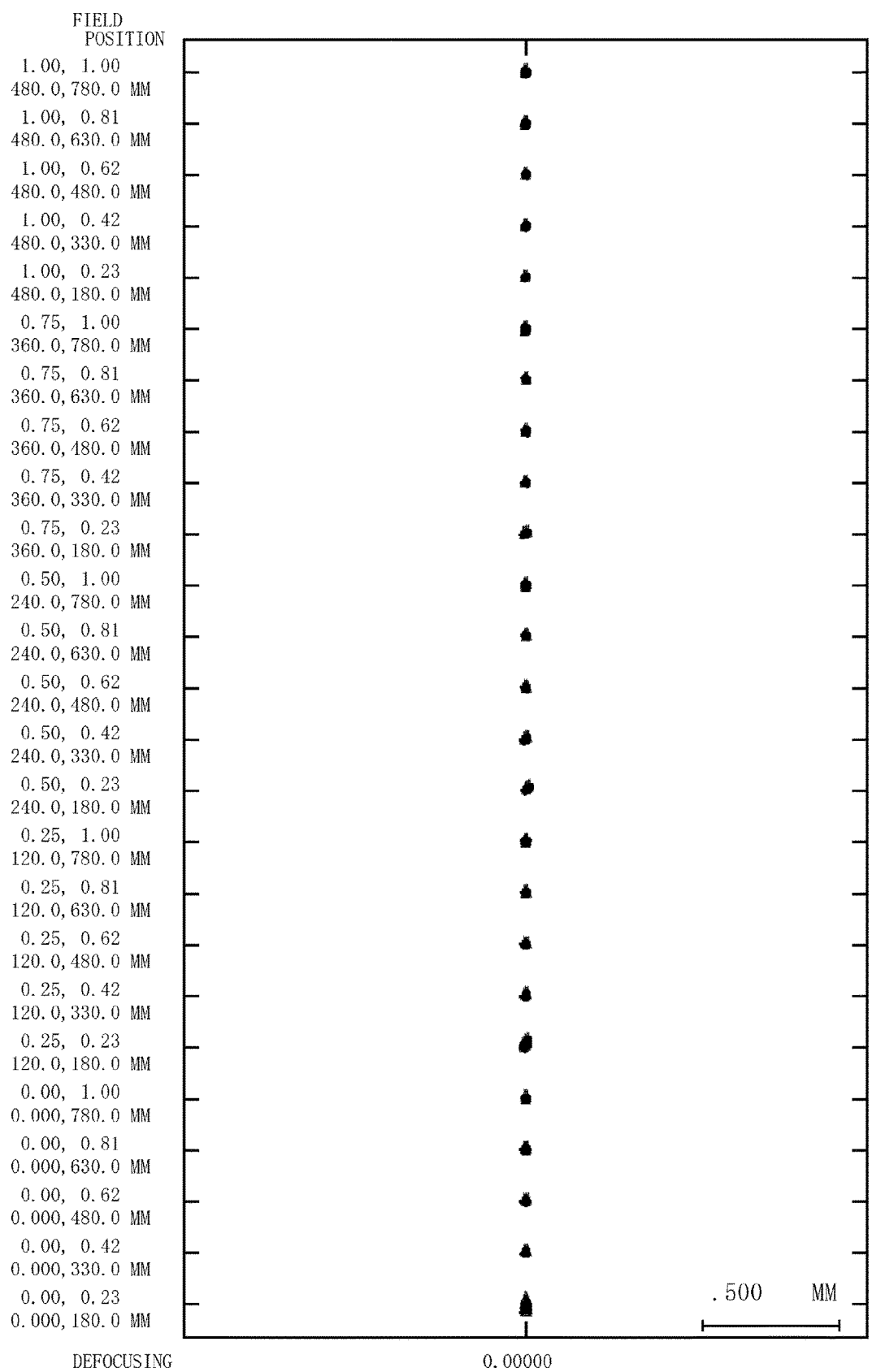
FIG. 31 is a spot diagram showing spots produced by the lens according to Embodiment 3.

In the present embodiment, the reflective surface 12 and the second transmissive surface 13 are each an aspheric surface. The amount of aberrations produced by the lens can therefore be suppressed. FIG. 30 shows the MTF of the lens 3 according to Embodiment 3 on the demagnifying side. The MTF was calculated in the same manner in the embodiments described above. FIG. 31 is a spot diagram showing spots produced by the lens 3 according to Embodiment 3. The MTF and the spot diagram show the same tendencies as those in Embodiment 1.

The lens 3 according to the present embodiment satisfies the following conditional expressions (1) and (2).

$$0° < θ < 90° + γ \quad (1)$$

$$90° < θ \quad (2)$$

θ: Inclination angle over which an end of the imaginary line P facing the upper intersection 23 rotates counterclockwise relative to the imaginary vertical line V around the intersection of the imaginary vertical line V and the imaginary line P γ: angle from the imaginary axis L to the lower peripheral light ray 22b passing through the effective range 20 of the second transmissive surface 13 and intersects the imaginary axis L.

That is, in the present embodiment, the imaginary line P inclines by 100° with respect to the imaginary vertical line V. In other words, the pupil inclines by 100° with respect to the imaginary vertical line V. Therefore, θ=100°, which satisfies the conditional expressions (1) and (2).

In the present embodiment, in which the conditional expression (1) is satisfied, the pupil inclines with respect to the imaginary vertical line V. In the case where θ=0° in the conditional expression (1), the imaginary line P is perpendicular to the imaginary axis L. That is, the pupil is perpendicular to the design reference axis. In the case where θ is greater than the upper limit in the conditional expression (1), the lower-end light flux 22 is blocked. In the present embodiment, in which the conditional expression (1) is satisfied, the lower-end light flux 22 passing through the lower end of the effective range 20 of the second transmissive surface 13 is not blocked and reaches the screen S.

Further, since the lens 3 according to the present embodiment satisfies the conditional expression (1), a decrease of brightness at the upper periphery of the screen S can be suppressed, as compared with the case where the imaginary line P is parallel to the imaginary vertical line V. That is, when the pupil inclines with respect to the imaginary vertical line V, which is perpendicular to the imaginary line P, the divergence angle θ0 of each of the light fluxes that reach the upper portion of the screen S increases. The amount of light that reaches the upper portion of the screen S therefore increases. Further, when the divergence angle θ0 of each of the light fluxes that reach the upper portion of the screen S increases, the difference in the divergence angle θ0 between the light fluxes that reach the upper portion of the image formation plane and the light fluxes that reach the lower portion of the image formation plane decreases. The situation in which the amount of light at the upper periphery of the screen S is smaller than the amount of light at the lower periphery of the screen S can therefore be suppressed.

In addition to the above, since the lens 3 according to the present embodiment satisfies the conditional expression (2), the divergence angle θ0 of the light flux F1, which reaches the lower portion of the screen S decreases. The difference in the divergence angle θ0 between the light fluxes that reach the upper portion of the screen S and the light fluxes that reach the lower portion of the screen S therefore decreases, whereby the difference in the amount of light between the upper portion and the lower portion of the screen S can be suppressed.

Data on the divergence angle θ0 of each of light fluxes F1 to F5, which reach the corresponding image heights on the screen S, are shown below. The angle θ1 is the angle of the lower peripheral light ray of each of the light fluxes F1 to F5 and is the angle at which the lower peripheral light ray of each of the light fluxes F1 to F5 intersects the screen S. The angle θ2 is the angle of the upper peripheral light ray of each of the light fluxes F1 to F5 and is the angle at which the upper peripheral light ray of each of the light fluxes F1 to F5 intersects the screen S. The angle θ0 is the divergence angle and is the difference between θ2 and θ1. Reference character R denotes the divergence angle ratio. The divergence angle ratio is the proportion assuming that the divergence angle of the light flux F2, which has the highest divergence angle, is 100%.

| Light flux | θ1 | θ2 | θ0 | R |
|---|---|---|---|---|
| F1 | 30.42 | 30.56 | 0.14 | 91% |
| F2 | 47.13 | 47.28 | 0.15 | 100% |
| F3 | 57.48 | 57.61 | 0.13 | 88% |
| F4 | 64.10 | 64.22 | 0.11 | 74% |
| F5 | 68.60 | 68.69 | 0.10 | 63% |

In the present embodiment, the divergence angle θ0 of the light flux F2, which reaches the fourth highest image height position, is greater than those of the other light fluxes F1 to F3 and F5. The divergence angle θ0 of the light flux F5, which reaches the highest image height position, is 63% of the divergence angle θ0 of the light flux F2. The divergence angle θ0 of the light flux F4, which reaches the second highest image height position, is 74% of the divergence angle θ0 of the light flux F2. The divergence angle θ0 of the light flux F3, which reaches the third highest image height position, is 88% of the divergence angle θ0 of the light flux F2. The divergence angle θ0 of the light flux F5, which reaches the lowest image height position, is 91% of the divergence angle θ0 of the light flux F2. As described above, in the present embodiment, the light fluxes F3, F4, and F5, which reach the upper portion of the screen S, each have a large divergence angle θ0. The amount of light of the light fluxes that reach the upper portion of the screen S therefore increases. Further, in the present embodiment, the difference in the divergence angle θ0 between the light fluxes F4 and F5, which reach the upper portion of the screen S, and the light flux F1, which reaches the lower portion of the screen S, is relatively small. The difference in the amount of light between the upper portion and the lower portion of the screen S can therefore be suppressed.

Embodiment 4

Figure 32:
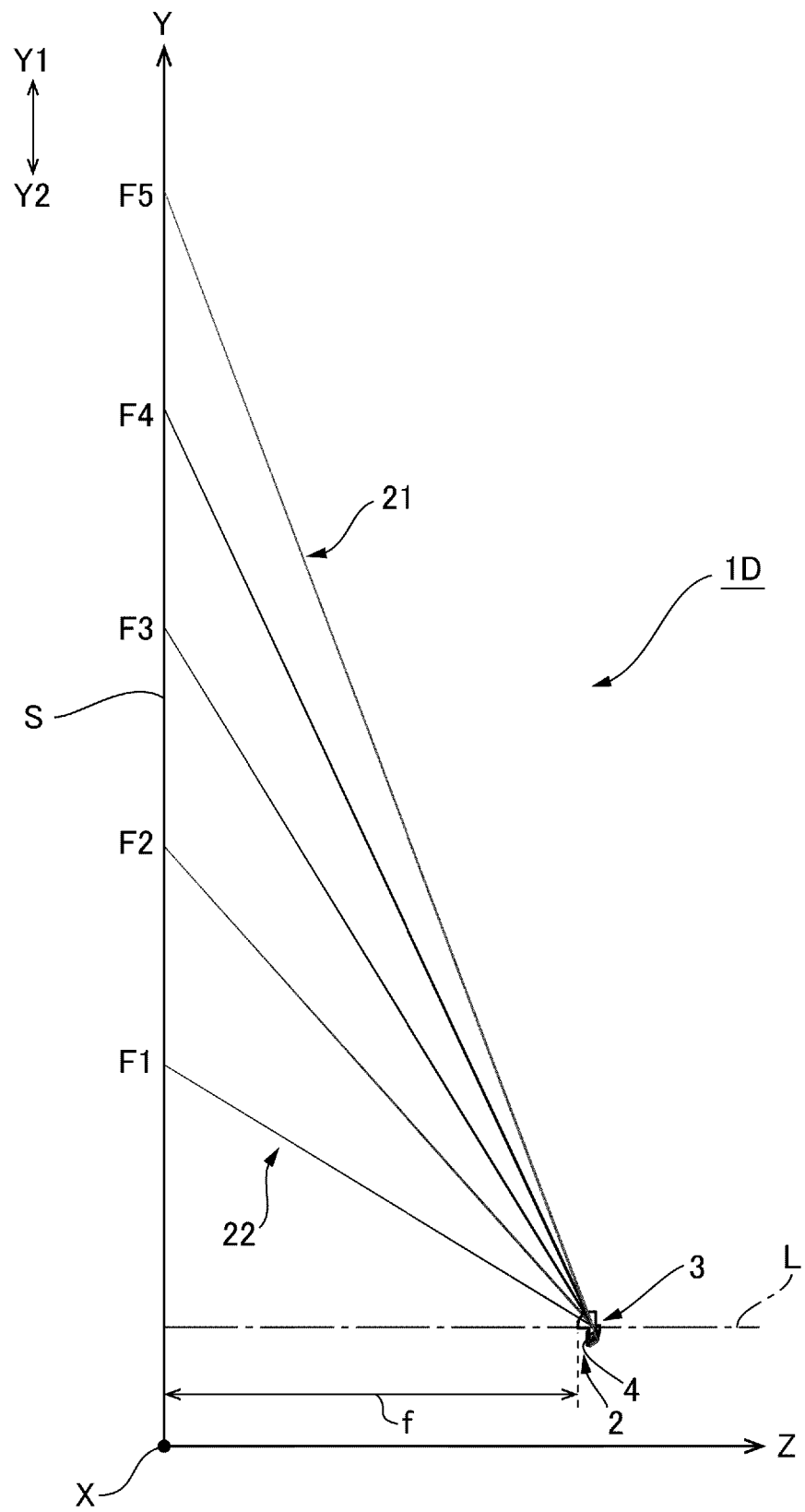
FIG. 32 is a light ray diagram of a projection-type image display apparatus according to Embodiment 4.
Figure 33:
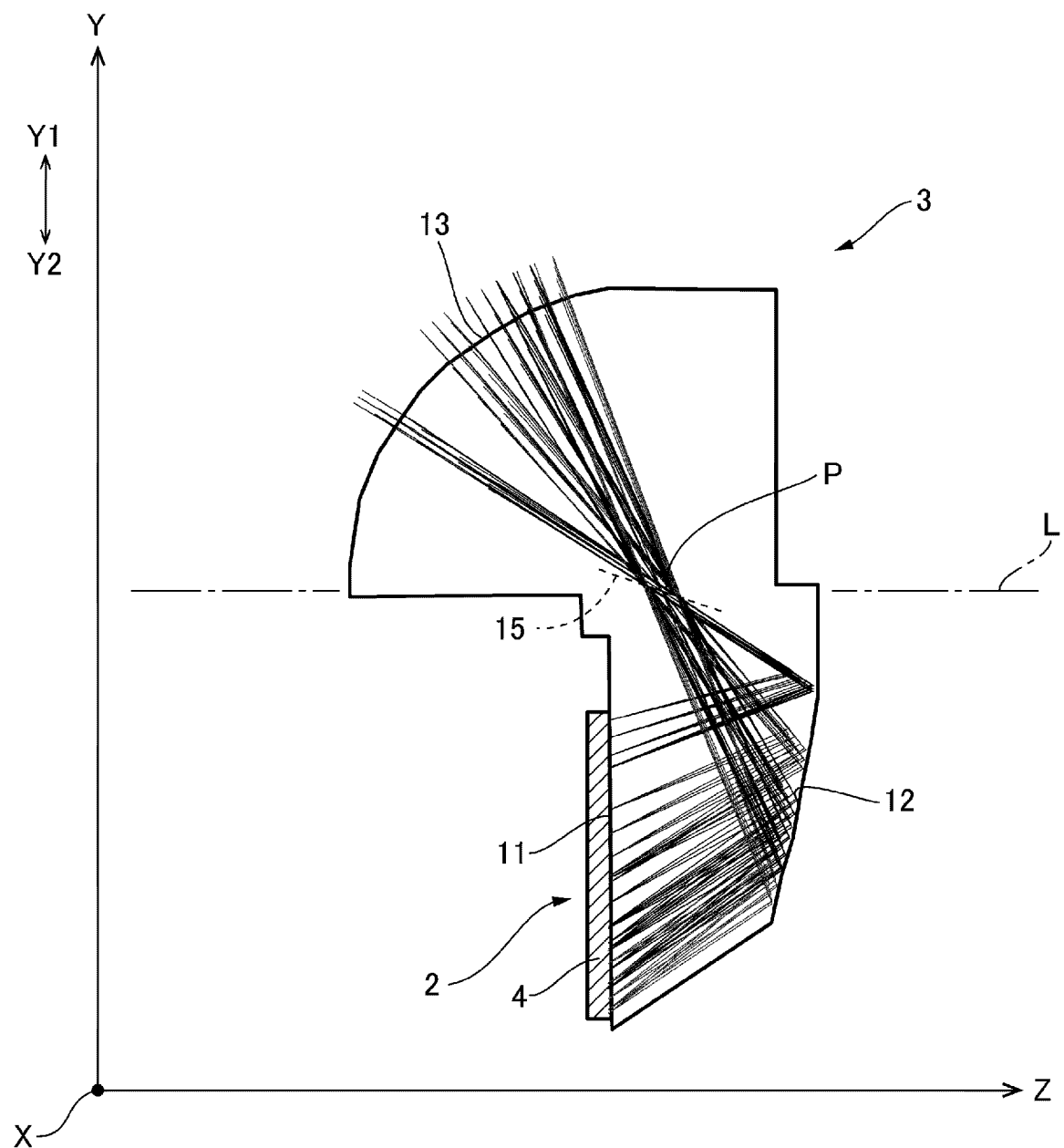
FIG. 33 is a light ray diagram showing light rays passing through a lens in the projection-type image display apparatus according to Embodiment 4.
Figure 34:
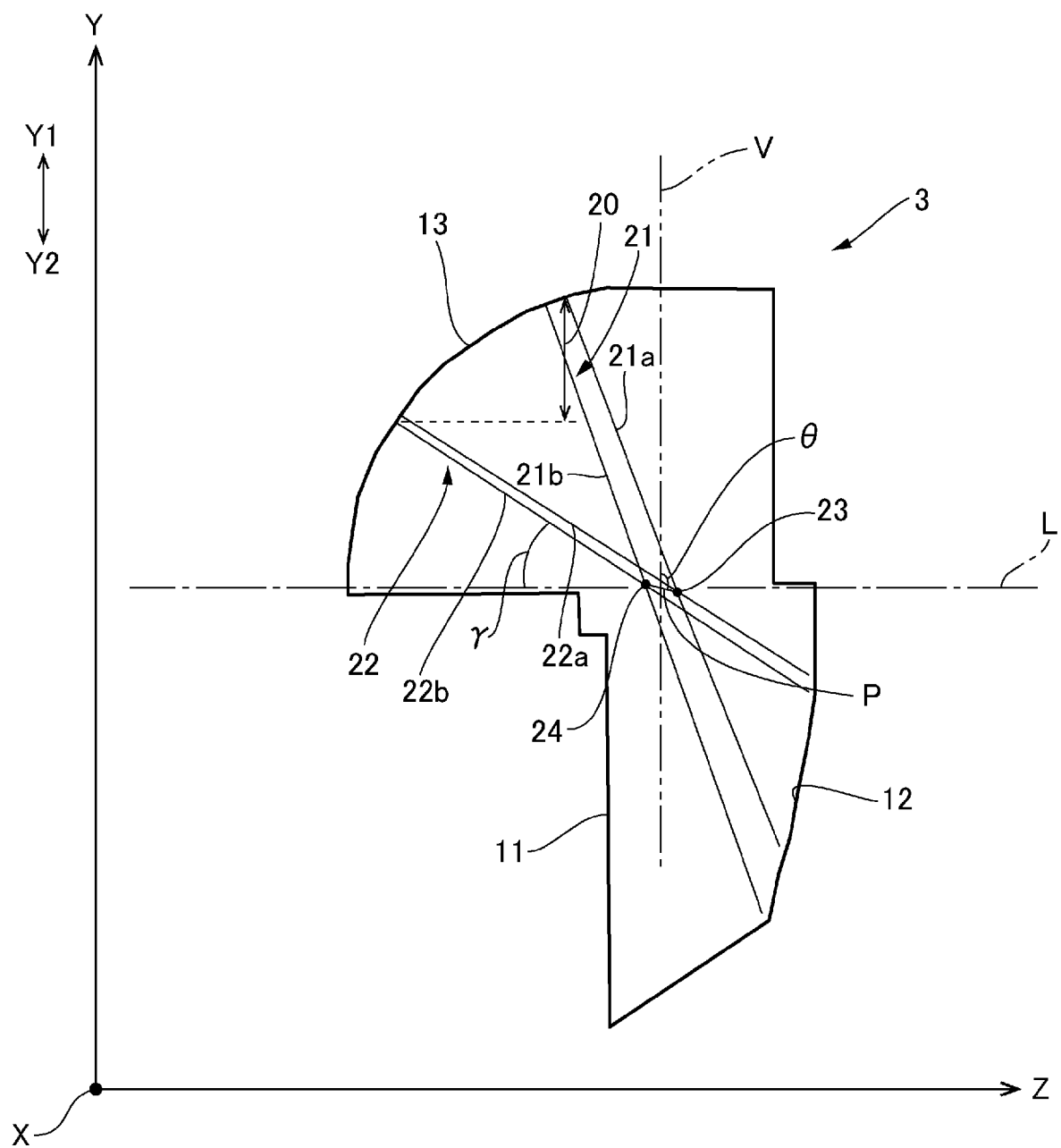
FIG. 34 describes an imaginary line specified in the lens in FIG. 33.

A projection-type image display apparatus according to Embodiment 4, to which the present disclosure is applied, will next be described. FIG. 32 is a light ray diagram of the projection-type image display apparatus according to Embodiment 4. FIG. 33 is a light ray diagram showing light rays passing through a lens in the projection-type image display apparatus according to Embodiment 4. FIG. 34 describes the imaginary line P specified in the lens. A projection-type image display apparatus 1D according to the present embodiment differs from the projection-type image display apparatus 1A according to Embodiment 1 in terms of the angle by which the imaginary line P inclines with respect to the imaginary vertical line V but is the same as the projection-type image display apparatus 1A according to Embodiment 1 in terms of the other configurations. The components corresponding to those of the projection-type image display apparatus 1A according to Embodiment 1 therefore have the same reference characters.

The projection-type image display apparatus 1D according to the present embodiment includes the image formation section 2 and the lens 3, as shown in FIG. 32. The image formation section 2 is disposed on the demagnifying side of the lens 3. The image formation section 2 is a display. The display, for example, includes a light source apparatus and a light modulator. The light modulator includes the liquid crystal light valve 4. The lens 3 is made of resin. The lens 3 has the first transmissive surface 11, the reflective surface 12, and the second transmissive surface 13 sequentially arranged from the demagnifying side toward the magnifying side, as shown in FIG. 33. The liquid crystal light valve 4 is attached to the first transmissive surface 11. The projection image displayed on the liquid crystal light valve 4 is projected on the screen S via the first transmissive surface 11, the reflective surface 12, and the second transmissive surface 13 in the present order. The final image projected on the screen S has an oblong shape elongated in the lateral direction. The final image has the aspect ratio of 16:10. Also in the present embodiment, the imaginary axis L extending in the axis-Z direction is set in the plane YZ. The imaginary axis L is the reference axis used in the design of the lens.

The first transmissive surface 11 and the reflective surface 12 are located at the lower side Y2 of the imaginary axis L. The second transmissive surface 13 is located at the upper side Y1 of the imaginary axis L. The reflective surface 12 has a concave shape. The reflective surface 12 is provided by externally forming a reflective coating on the lens 3. The second transmissive surface 13 has a convex shape protruding toward the magnifying side. The first transmissive surface 11, the reflective surface 12, and the second transmissive surface 13 form a coaxial optical system. Therefore, the imaginary axis L is the reference axis used in the design of the lens 3 and is the optical axis of the lens 3. The upper and lower halves of the lens 3 are configured to be rotationally symmetric with respect to the imaginary axis L. That is, the first transmissive surface 11, the reflective surface 12, and the second transmissive surface 13 are so shaped that the cross-sectional shape in the plane YZ shown in FIG. 33 is rotated around the imaginary axis L over the angular range of 90° toward one side and the other side of the axis-X direction.

The imaginary line P can be specified in the lens 3, as shown in FIG. 34. The imaginary line P connects the upper intersection 23 to the lower intersection 24, the upper intersection 23 being an intersection where the upper peripheral light ray 21a of the upper-end light flux 21, where the upper-end light flux 21 is the light flux passing through the axis-Y-direction upper end of the effective range 20 of the second transmissive surface 13, and the upper peripheral light ray 22a of the lower-end light flux 22, where the lower-end light flux 22 is the light flux passing through the axis-Y-direction lower end of the effective range 20, intersect with each other in the plane YZ, and the lower intersection 24 being an intersection where the lower peripheral light ray 21b of the upper-end light flux 21 and the lower peripheral light ray 22b of the lower-end light flux 22 intersect with each other in the plane YZ. The imaginary line P inclines by 110° with respect to the imaginary vertical line V, which is perpendicular to the imaginary axis L in the plane YZ. In the present embodiment, the imaginary axis L, which is the optical axis, passes through the center of the imaginary line P. The imaginary line P is therefore the pupil in the plane YZ.

Lens data on the lens 3 according to Embodiment 4 are as follows: In the lens data, the surface number 1 is the second transmissive surface 13 and is a refractive surface. The surface number 2 is the pupil. The surface number 3 is the reflective surface 12. The surface number 4 is the first transmissive surface 11 and is a refractive surface. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | Surface type | r | d | nd | vd | Y | X |
|---|---|---|---|---|---|---|---|
| Object plane | Spherical | 0 | 295 | | | | |
| 1 | Aspheric | 15 | 10 | 1.531132 | 55.75 | 9.262 | 9.262 |
| 2 | Spherical | 0 | 5 | 1.531132 | 55.75 | 0.65 | 1 |
| 3 | Aspheric | −11 | −6.692 | 1.531132 | 55.75 | 10.268 | 10.268 |
| 4 (Image plane) | Spherical | 0 | 0 | 1.531132 | 55.75 | 13.715 | 13.715 |

The refractive index nd of the lens 3 is 1.531132. The Abbe number vd of the lens 3 is 55.75. The on-axis inter-surface distance d in the field of the object plane is the distance between the screen S and the surface number 1. The on-axis inter-surface distance d in the field of the object plane is therefore the projection distance f of the projection-type image display apparatus 1D. In the present embodiment, f=295 mm.

In the present embodiment, the surface number 1 is an aspheric surface. The decenter & return α of the surface number 2 is −110°. That is, the pupil inclines by 110° with respect to the imaginary vertical line V, which is perpendicular to the optical axis in the plane YZ. The surface number 3 is an aspheric surface. The surface number 4 is a spherical surface.

Aspheric data of the surface number 1 are as follows.

| | |
|---|---|
| Conic constant | 1.18452E+00 |
| Fourth-order coefficient | 8.265522E−04 |
| Sixth-order coefficient | −1.047826E−05 |
| Eighth-order coefficient | 7.814277E−08 |
| Tenth-order coefficient | −1.229762E−10 |

Aspheric data of the surface number 3 are as follows:

| | |
|---|---|
| Conic constant | −1.391089E+02 |
| Fourth-order coefficient | −1.810712E−04 |
| Sixth-order coefficient | 1.884068E−06 |
| Eighth-order coefficient | −1.150694E−08 |
| Tenth-order coefficient | 2.840449E−11 |

Projection Image

Figure 35:
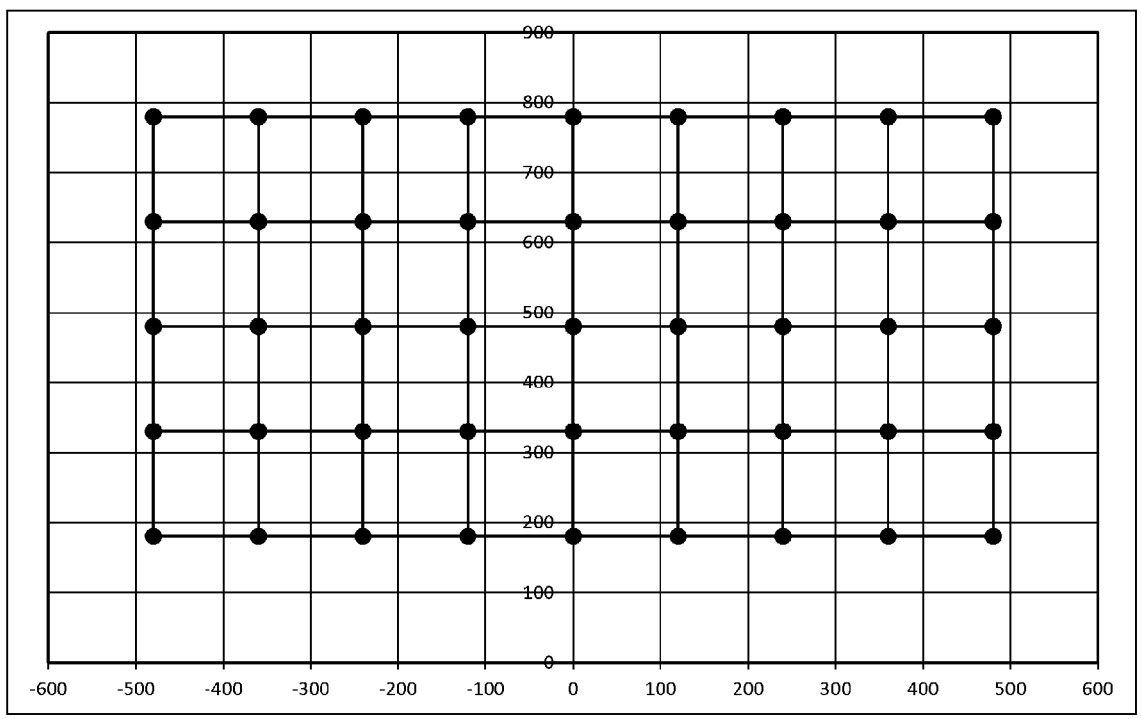
FIG. 35 shows a distortion lattice on the screen.
Figure 36:
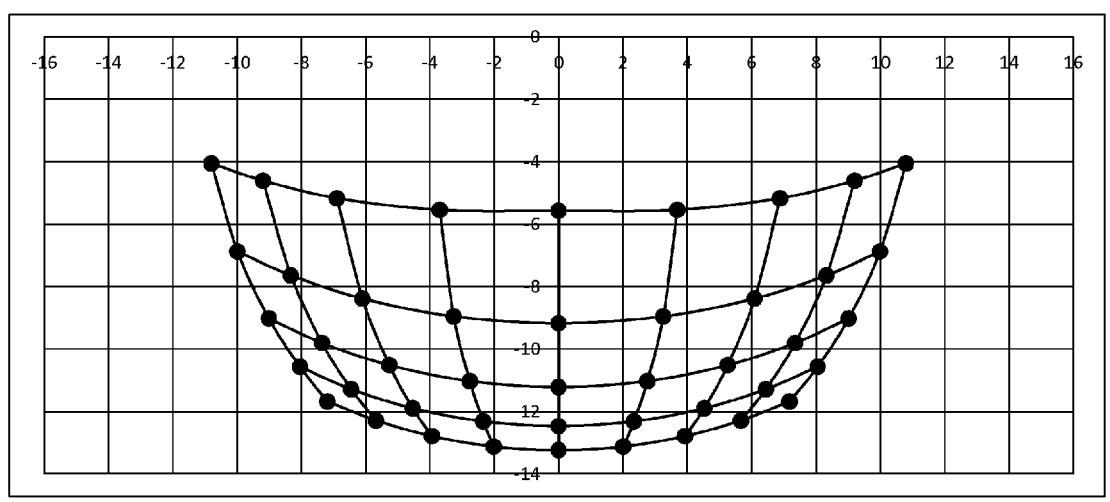
FIG. 36 shows a distortion lattice in the demagnifying-side image formation plane of the lens.

The projection image formed by the image formation section 2 will next be described. FIG. 35 shows a distortion lattice on the screen S. FIG. 36 shows the distortion lattice in the demagnifying-side image formation plane of the lens 3. The distortion lattice in the demagnifying-side image formation plane of the lens 3 is distorted but has no field curvature. The image formation section 2 forms a projection image that is an inverted final image turned upside down in the demagnifying-side image formation plane. The image formation section 2 forms an image distorted in advance in the demagnifying-side image formation plane of the lens 3 so that an oblong projection image is projected on the screen S, which is the magnifying-side image formation plane. That is, the image formation section 2 forms a distorted projection image corresponding to the distortion lattice shown in FIG. 36 in the demagnifying-side image formation plane so that a final image corresponding to the distortion lattice shown in FIG. 35 is projected on the screen S.

Lens Performance

Figure 37:
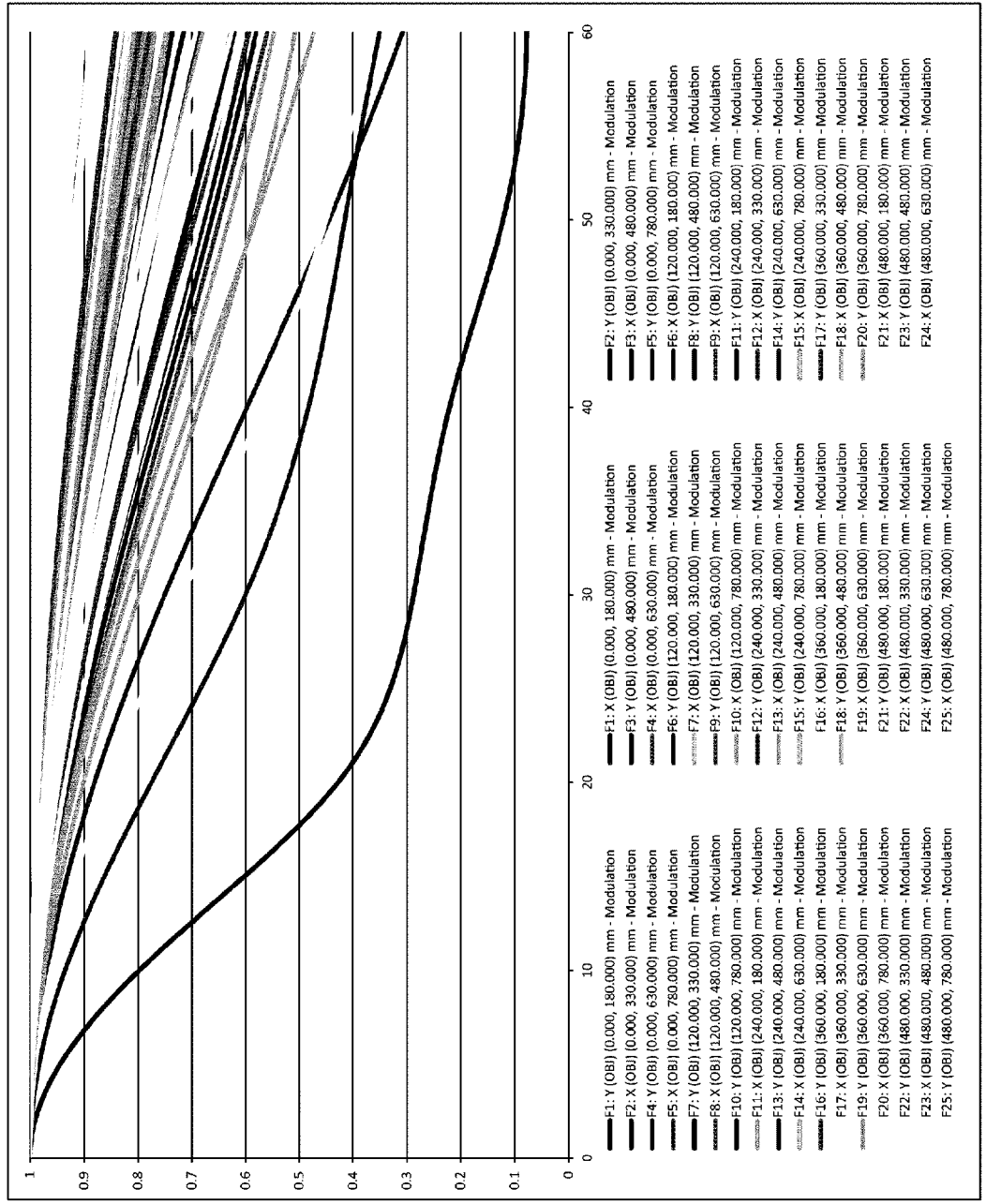
FIG. 37 shows an MTF of the lens according to Embodiment 4 on the demagnifying side.
Figure 38:
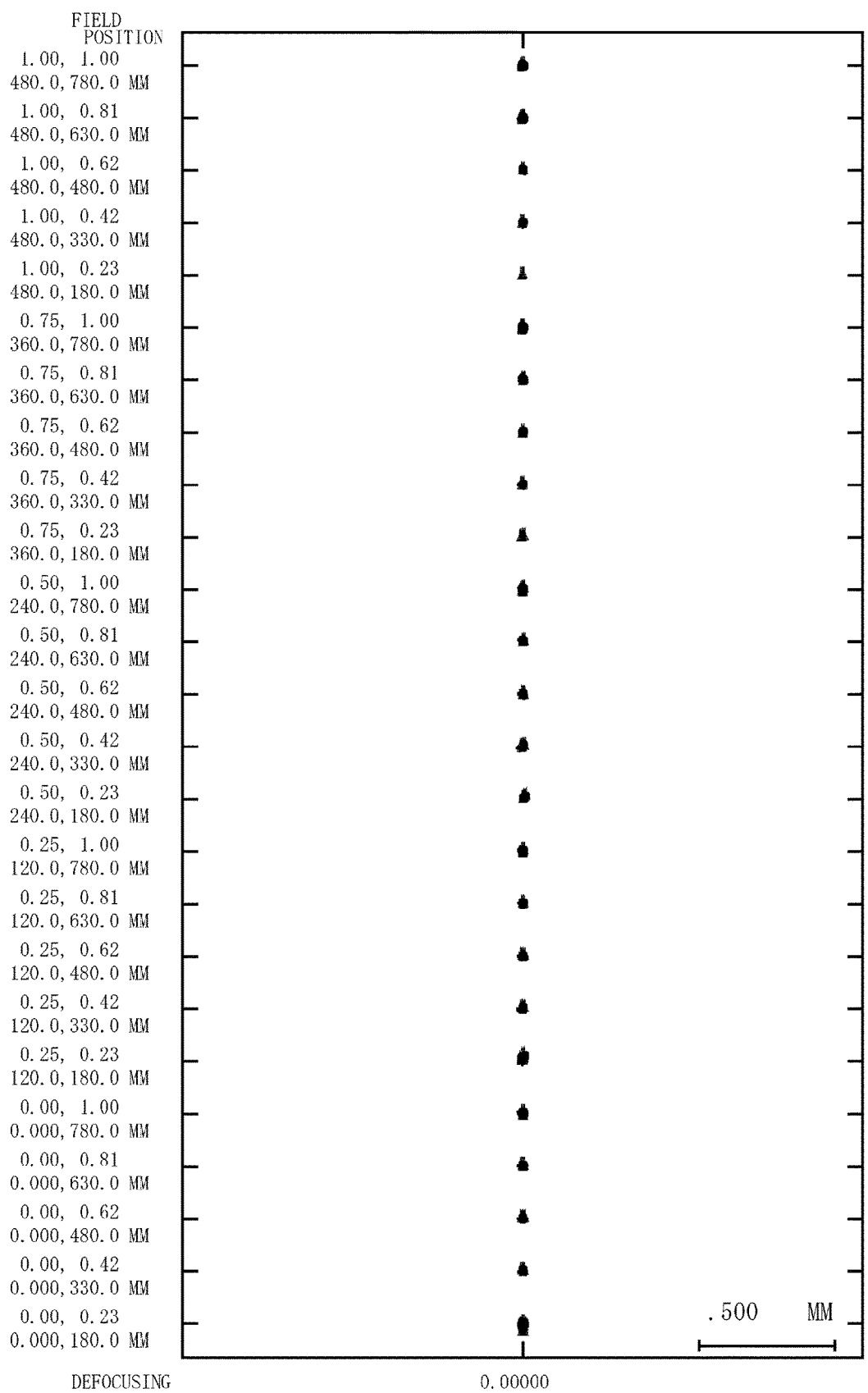
FIG. 38 is a spot diagram showing spots produced by the lens according to Embodiment 4.

In the present embodiment, the reflective surface 12 and the second transmissive surface 13 are each an aspheric surface. The amount of aberrations produced by the lens can therefore be suppressed. FIG. 37 shows the MTF of the lens 3 according to Embodiment 4 on the demagnifying side. The MTF was calculated in the same manner in the embodiments described above. FIG. 38 is a spot diagram showing spots produced by the lens 3 according to Embodiment 4. The MTF and the spot diagram show the same tendencies as those in Embodiment 1.

The lens 3 according to the present embodiment satisfies the following conditional expressions (1) and (2).

$$0° < \theta < 90° + \gamma \qquad (1)$$

$$90° < \theta \qquad (2)$$

θ: Inclination angle over which an end of the imaginary line P facing the upper intersection 23 rotates counterclockwise relative to the imaginary vertical line V around the intersection of the imaginary vertical line V and the imaginary line P γ: angle from the imaginary axis L to the lower peripheral light ray 22b passing through the effective range 20 of the second transmissive surface 13 and intersects the imaginary axis L.

That is, in the present embodiment, the imaginary line P inclines by 110° with respect to the imaginary vertical line V. In other words, the pupil inclines by 110° with respect to the imaginary vertical line V. Therefore, θ=110°, which satisfies the conditional expressions (1) and (2).

In the present embodiment, in which the conditional expression (1) is satisfied, the pupil inclines with respect to the imaginary vertical line V. In the case where θ=0° in the conditional expression (1), the imaginary line P is perpendicular to the imaginary axis L. That is, the pupil is perpendicular to the design reference axis. In the case where θ is greater than the upper limit in the conditional expression (1), the lower-end light flux 22 is blocked. In the present embodiment, in which the conditional expression (1) is satisfied, the lower-end light flux 22 passing through the lower end of the effective range 20 of the second transmissive surface 13 is not blocked but reaches the screen S.

Further, since the lens 3 according to the present embodiment satisfies the conditional expression (1), a decrease of brightness at the upper periphery of the screen S can be suppressed, as compared with the case where the imaginary line P is parallel to the imaginary vertical line V. That is, when the pupil inclines with respect to the imaginary vertical line V, which is perpendicular to the imaginary line P, the divergence angle θ0 of each of the light fluxes that reach the upper portion of the screen S increases. The amount of light that reaches the upper portion of the screen S therefore increases. Further, when the divergence angle θ0 of each of the light fluxes that reach the upper portion of the screen S increases, the difference in the divergence angle θ0 between the light fluxes that reach the upper portion of the image formation plane and the light fluxes that reach the lower portion of the image formation plane decreases. The situation in which the amount of light at the upper periphery of the screen S is smaller than the amount of light at the lower periphery of the screen S can therefore be suppressed.

In addition to the above, since the lens 3 according to the present embodiment satisfies the conditional expression (2), the divergence angle θ0 of the light flux F1, which reaches the lower portion of the screen S decreases. The difference in the divergence angle θ0 between the light fluxes that reach the upper portion of the screen S and the light fluxes that reach the lower portion of the screen S therefore decreases, whereby the difference in the amount of light between the upper portion and the lower portion of the screen S can be suppressed.

Data on the divergence angle θ0 of each of light fluxes F1 to F5, which reach the corresponding image heights on the screen S, are shown below. The angle θ1 is the angle of the lower peripheral light ray of each of the light fluxes F1 to F5 and is the angle at which the lower peripheral light ray of each of the light fluxes F1 to F5 intersects the screen S. The angle θ2 is the angle of the upper peripheral light ray of each of the light fluxes F1 to F5 and is the angle at which the upper peripheral light ray of each of the light fluxes F1 to F5 intersects the screen S. The angle θ0 is the divergence angle and is the difference between θ2 and θ1. Reference character R denotes the divergence angle ratio. The divergence angle ratio is the proportion assuming that the divergence angle of the light flux F2, which has the highest divergence angle, is 100%.

| Light flux | θ1 | θ2 | θ0 | R |
| --- | --- | --- | --- | --- |
| F1 | 30.45 | 30.53 | 0.08 | 67% |
| F2 | 47.14 | 47.26 | 0.12 | 100% |
| F3 | 57.49 | 57.60 | 0.11 | 95% |
| F4 | 64.11 | 64.21 | 0.10 | 83% |
| F5 | 68.60 | 68.69 | 0.09 | 72% |

In the present embodiment, the divergence angle θ0 of the light flux F2, which reaches the fourth highest image height position, is greater than those of the other light fluxes F1 to F3 and F5. The divergence angle θ0 of the light flux F5, which reaches the highest image height position, is 72% of the divergence angle θ0 of the light flux F2. The divergence angle θ0 of the light flux F4, which reaches the second highest image height position, is 83% of the divergence angle θ0 of the light flux F2. The divergence angle θ0 of the light flux F3, which reaches the third highest image height position, is 95% of the divergence angle θ0 of the light flux F2. The divergence angle θ0 of the light flux F5, which reaches the lowest image height position, is 67% of the divergence angle θ0 of the light flux F2. As described above, in the present embodiment, the light fluxes F3, F4, and F5, which reach the upper portion of the screen S, each have a large divergence angle θ0. The amount of light of the light fluxes that reach the upper portion of the screen S therefore increases. Further, in the present embodiment, the difference in the divergence angle θ0 between the light fluxes F4 and F5, which reach the upper portion of the screen S, and the light flux F1, which reaches the lower portion of the screen S, is relatively small. The difference in the amount of light between the upper portion and the lower portion of the screen S can therefore be suppressed.

Figure 39:
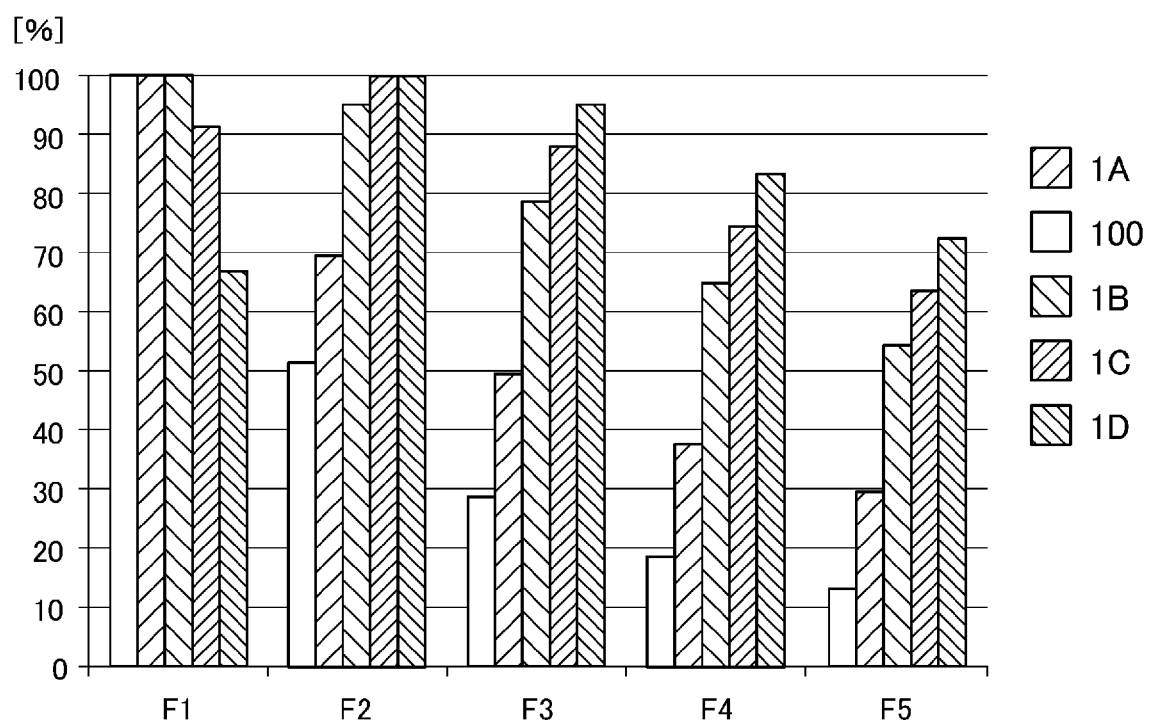
FIG. 39 shows graphs that compare the divergence angle of each light flux between Embodiments 1 to 4 and Comparative Embodiment.

FIG. 39 shows graphs that compare the divergence angle θ0 of each of light fluxes F1 to F5, which reach the corresponding image heights on the screen S, between Embodiments 1 to 4 and Comparative Embodiment. In Embodiments 3 and 4, in which the inclination angle θ of the imaginary line P with respect to the imaginary perpendicular line V is greater than 90°, the difference in the divergence angle θ0 of the light fluxes F3, F4 and F5, which reach the upper portion of the screen S, and the light flux F1, which reaches the lower portion of the screen S, is small, as shown in FIG. 39. The difference in the amount of light between the upper portion and the lower portion of the screen S can therefore be further suppressed in Embodiments 3 and 4.

Embodiment 5

Figure 40:
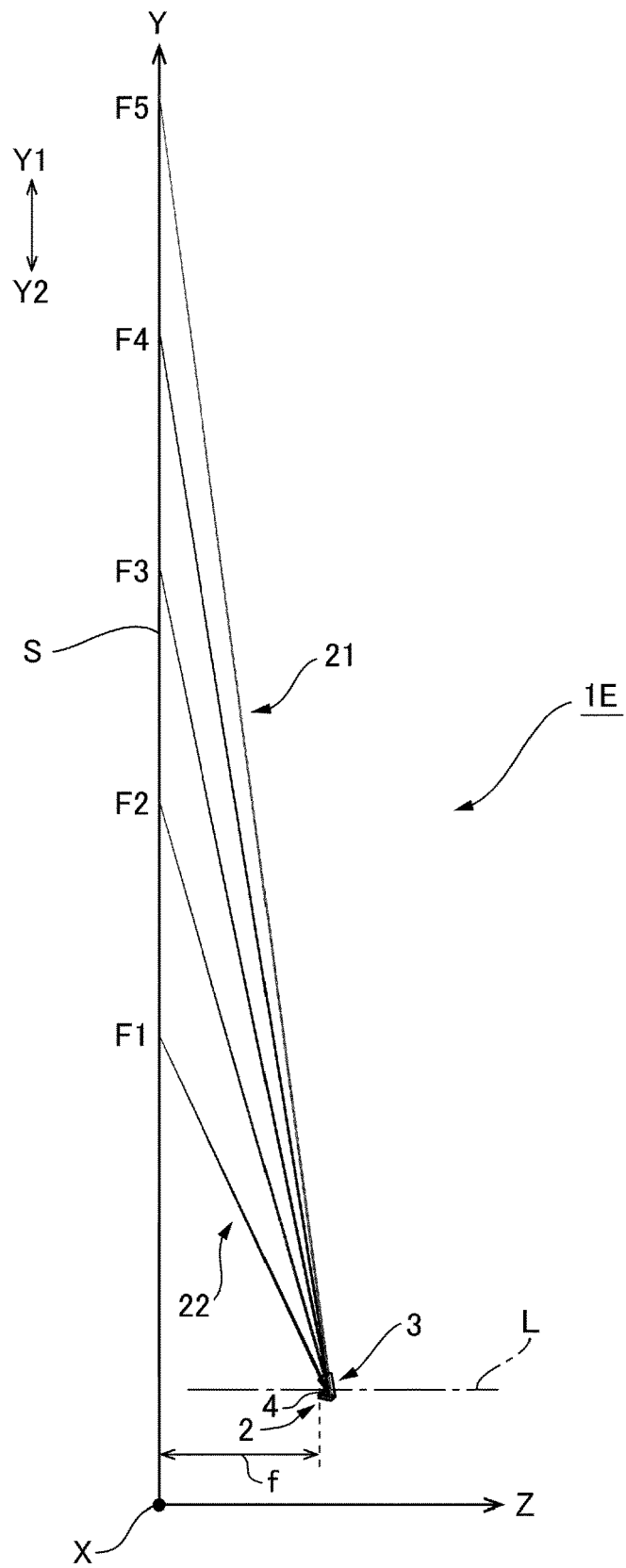
FIG. 40 is a light ray diagram of a projection-type image display apparatus according to Embodiment 5.
Figure 41:
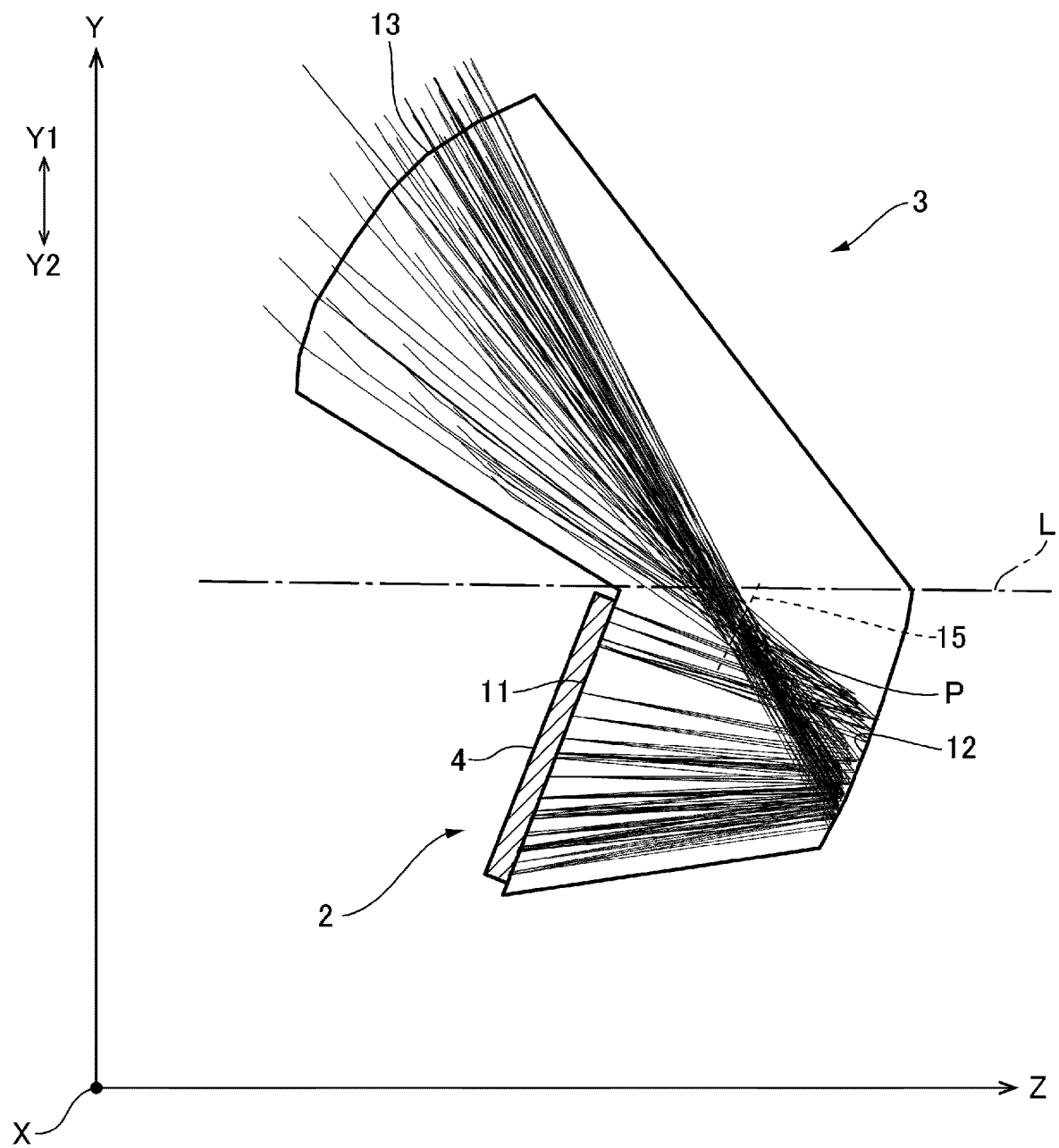
FIG. 41 is a light ray diagram showing light rays passing through a lens in the projection-type image display apparatus according to Embodiment 5.
Figure 42:
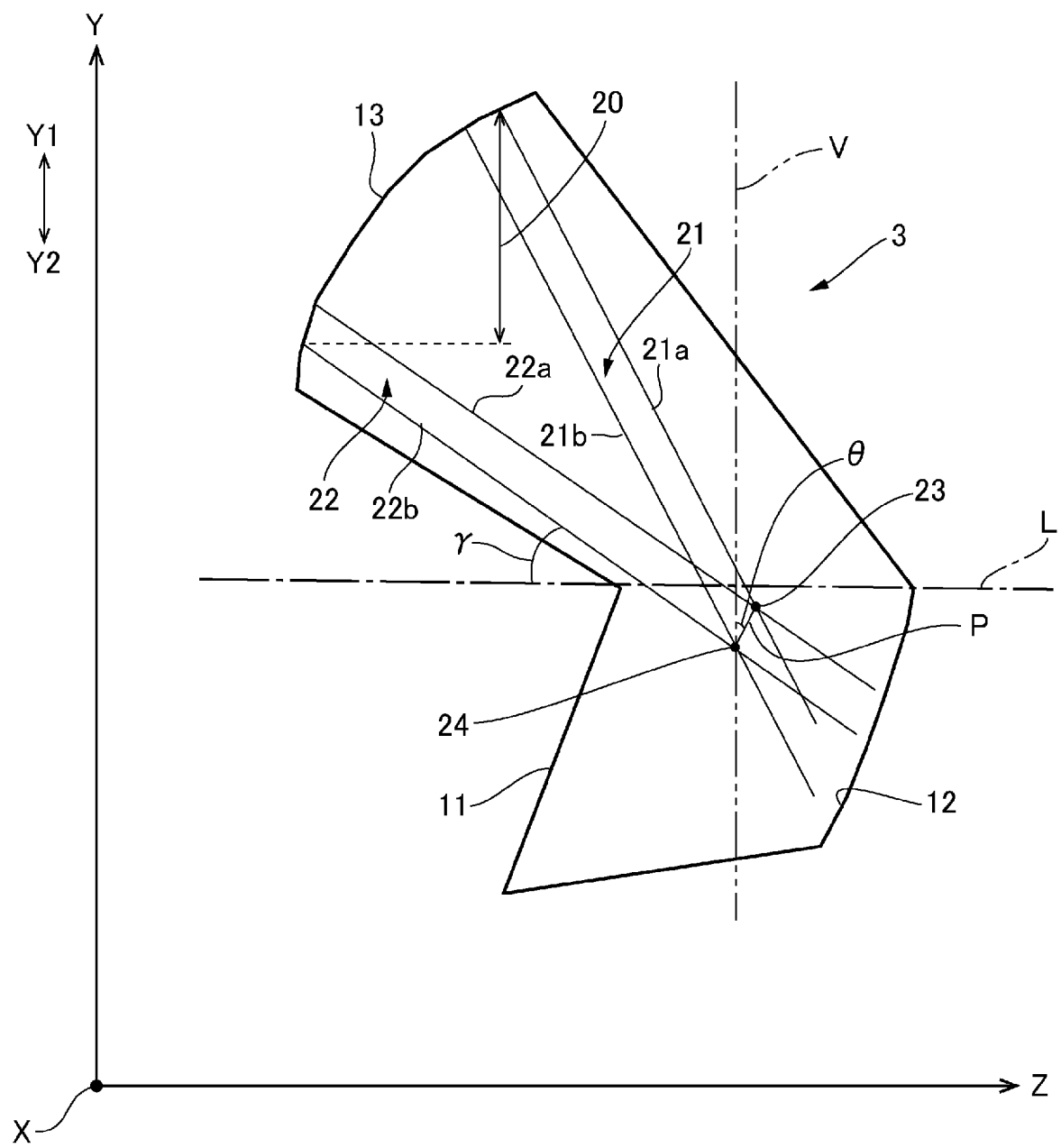
FIG. 42 describes an imaginary line specified in the lens in FIG. 41.

A projection-type image display apparatus according to Embodiment 5, to which the present disclosure is applied, will next be described. FIG. 40 is a light ray diagram of the projection-type image display apparatus according to Embodiment 5. FIG. 41 is a light ray diagram showing light rays passing through a lens in the projection-type image display apparatus according to Embodiment 5. FIG. 42 describes the imaginary line P specified in the lens. A projection-type image display apparatus 1E according to the present embodiment differs from the projection-type image display apparatus 1A according to Embodiment 1 in terms of the angle by which the imaginary line P inclines with respect to the imaginary vertical line V but is the same as the projection-type image display apparatus 1A according to Embodiment 1 in terms of the other configurations. The components corresponding to those of the projection-type image display apparatus 1A according to Embodiment 1 therefore have the same reference characters.

The projection-type image display apparatus 1E according to the present embodiment includes the image formation section 2 and the lens 3, as shown in FIG. 40. The image formation section 2 is disposed on the demagnifying side of the lens 3. The image formation section 2 is a display. The display, for example, includes a light source apparatus and a light modulator. The light modulator includes the liquid crystal light valve 4. The lens 3 is made of resin. The lens 3 has the first transmissive surface 11, the reflective surface 12, and the second transmissive surface 13 sequentially arranged from the demagnifying side toward the magnifying side, as shown in FIG. 41. The liquid crystal light valve 4 is attached to the first transmissive surface 11. The projection image displayed on the liquid crystal light valve 4 is projected on the screen S via the first transmissive surface 11, the reflective surface 12, and the second transmissive surface 13 in the present order. The final image projected on the screen S has an oblong shape elongated in the lateral direction. The final image has the aspect ratio of 16:10. Also in the present embodiment, the imaginary axis L extending in the axis-Z direction is set in the plane YZ. The imaginary axis L extends perpendicularly to the screen S.

The first transmissive surface 11 and the reflective surface 12 are located at the lower side Y2 of the imaginary axis L. The second transmissive surface 13 is located at the upper side Y1 of the imaginary axis L. The reflective surface 12 has a concave shape. The reflective surface 12 is provided by externally forming a reflective coating on the lens 3. The second transmissive surface 13 has a convex shape protruding toward the magnifying side. The first transmissive surface 11 is a flat surface. The reflective surface 12 and the second transmissive surface 13 are each a free-form surface.

The imaginary line P can be specified in the lens 3, as shown in FIG. 42. The imaginary line P connects the upper intersection 23 to the lower intersection 24, the upper intersection 23 being an intersection where the upper peripheral light ray 21a of the upper-end light flux 21, where the upper-end light flux 21 is the light flux passing through the axis-Y-direction upper end of the effective range 20 of the second transmissive surface 13, and the upper peripheral light ray 22a of the lower-end light flux 22, where the lower-end light flux 22 is the light flux passing through the axis-Y-direction lower end of the effective range 20, intersect with each other in the plane YZ, and the lower intersection 24 being an intersection where the lower peripheral light ray 21b of the upper-end light flux 21 and the lower peripheral light ray 22b of the lower-end light flux 22 intersect with each other in the plane YZ. The imaginary line P inclines by 1.1647° with respect to the imaginary vertical line V, which is perpendicular to the imaginary axis L in the plane YZ. In the present embodiment, although the imaginary line P does not intersect the optical axis of the lens 3, the imaginary line P is referred to as the "pupil" in the plane YZ.

Lens data on the lens 3 according to Embodiment 5 are as follows: In the lens data, the surface number 1 is the second transmissive surface 13 and is a refractive surface. The surface number 2 is the pupil. The surface number 3 is the reflective surface 12. The surface number 4 is the first transmissive surface 11 and is a refractive surface. Reference character r denotes the radius of curvature in millimeters. Reference character d denotes the on-axis inter-surface distance in millimeters. Reference character nd denotes the refractive index. Reference character vd denotes the Abbe number. Reference character Y denotes the effective radius in the axis-Y direction. Reference character X denotes the effective radius in the axis-X direction.

| Surface number | Surface type | r | d | nd | vd | Y | X |
|---|---|---|---|---|---|---|---|
| Object plane | Spherical | 0 | 100 | | | | |
| 1 | XY polynomial surface | 170.60961 | 10 | 1.531132 | 55.75 | 11.112 | 11.112 |
| 2 | Spherical | 0 | 5 | 1.531132 | 55.75 | 0.479 | 0.479 |
| 3 | XY polynomial surface | −2.21043 | −6.8 | 1.531132 | 55.75 | 6.767 | 6.767 |
| 4 (Image plane) | Spherical | 0 | 0 | 1.531132 | 55.75 | 10.642 | 10.642 |

Data on decenter of first surface: Y = −44.515 α = −21.4981
Data on decenter of third surface: Y = 1.585 α = −22.6628

The data on decenter is also effective on the downstream of the surfaces each having a specified decenter.

The refractive index nd of the lens 3 is 1.531132. The Abbe number vd of the lens 3 is 55.75. The on-axis inter-surface distance d in the field of the object plane is the distance between the screen S and the surface number 1. The on-axis inter-surface distance d in the field of the object plane is therefore the projection distance f of the projection-type image display apparatus 1E. In the present embodiment, f=100 mm.

In the present embodiment, the surface number 1 is a free-form surface and is an XY polynomial surface. Since the decenter of the surface number 1 is effective on the surface number 2, the decenter & return α of the second surface is −21.4981°. That is, the pupil inclines by −21.4981° with respect to the imaginary vertical line V, which is perpendicular to the imaginary axis L in the plane YZ. The surface number 3 is a free-form surface and is an XY polynomial surface. The surface number 4 is a planar surface.

The XY polynomial coefficients of the surface number 1 are as follows.

| | |
|---|---|
| Conic constant | 2.241006E+02 |
| X | 0 |
| Y | 0 |
| X**2 | 4.712531E−02 |
| X * Y | 0 |
| Y**2 | −6.69858E−02 |
| X**3 | 0 |
| X**2 * Y | −1.731672E−02 |
| X Y**2 | 0 |
| Y**3 | 1.203742E−02 |
| X**4 | −7.823583E−05 |
| X**3 * Y | 0 |
| X**2 * Y**2 | 4.753037E−03 |
| X * Y**3 | 0 |
| Y**4 | 2.463375E−04 |

-continued

| | |
|---|---|
| X**5 | 0 |
| X**4 * Y | 3.456907E−04 |
| X**3 * Y**2 | 0 |
| X**2 * Y**3 | −4.602323E−05 |
| X * Y**4 | 0 |
| Y**5 | −4.879982E−06 |
| X**6 | −1.886499E−06 |
| X**5 * Y | 0 |
| X**4 * Y**2 | −9.879932E−05 |
| X**3 * Y**3 | 0 |
| X**2 * Y**4 | −1.047511E−04 |
| X * Y**5 | 0 |
| Y**6 | −2.695591E−05 |
| X**7 | 0 |
| X**6 * Y | −2.333608E−06 |
| X**5 * Y**2 | 0 |
| X**4 * Y**3 | 3.706863E−06 |
| X**3 * Y**4 | 0 |
| X**2 * Y**5 | 4.817741E−06 |
| X * Y**6 | 0 |
| Y**7 | 1.671567E−06 |
| X**8 | 3.772486E−08 |
| X**7 * Y | 0 |
| X**6 * Y**2 | 7.845899E−07 |
| X**5 * Y**3 | 0 |
| X**4 * Y**4 | 1.806017E−06 |
| X**3 * Y**5 | 0 |
| X**2 * Y**6 | 1.91147E−06 |
| X * Y**7 | 0 |
| Y**8 | 3.943296E−07 |
| X**9 | 0 |
| X**8 * Y | 4.413154E−09 |
| X**7 * Y**2 | 0 |
| X**6 * Y**3 | −7.305624E−08 |
| X**5 * Y**4 | 0 |
| X**4 * Y**5 | −2.558126E−07 |
| X**3 * Y**6 | 0 |
| X**2 * Y**7 | −2.484268E−07 |
| X * Y**8 | 0 |
| Y**9 | −5.251836E−08 |
| X**10 | −1.689176E−10 |
| X**9 * Y | 0 |
| X**8 * Y**2 | −1.178575E−09 |
| X**7 * Y**3 | 0 |
| X**6 * Y**4 | 2.676732E−09 |
| X**5 * Y**5 | 0 |
| X**4 * Y**6 | 1.062032E−08 |
| X**3 * Y**7 | 0 |
| X**2 * Y**8 | 9.018839E−09 |
| X * Y**9 | 0 |
| Y**10 | 1.829322E−09 |

The XY polynomial coefficients of the surface number 3 are as follows.

| | |
|---|---|
| Conic constant | −9.479304E−01 |
| X | 0 |
| Y | 0 |
| X**2 | 1.668722E−01 |
| X * Y | 0 |
| Y**2 | 1.998643E−01 |
| X**3 | 0 |
| X**2 * Y | −1.355022E−02 |
| X Y**2 | 0 |
| Y**3 | −2.640562E−03 |
| X**4 | 1.553097E−03 |
| X**3 * Y | 0 |
| X**2 * Y**2 | −1.847857E−04 |
| X * Y**3 | 0 |
| Y**4 | 9.365945E−04 |
| X**5 | 0 |
| X**4 * Y | 7.033638E−05 |
| X**3 * Y**2 | 0 |
| X**2 * Y**3 | 3.058726E−05 |
| X * Y**4 | 0 |
| Y**5 | −1.555813E−06 |
| X**6 | −2.28477E−05 |
| X**5 * Y | 0 |
| X**4 * Y**2 | −6.082316E−05 |
| X**3 * Y**3 | 0 |
| X**2 * Y**4 | 8.767023E−06 |
| X * Y**5 | 0 |
| Y**6 | −1.35643E−05 |
| X**7 | 0 |
| X**6 * Y | −3.199121E−06 |
| X**5 * Y**2 | 0 |
| X**4 * Y**3 | −9.114938E−06 |
| X**3 * Y**4 | 0 |
| X**2 * Y**5 | −5.650188E−06 |
| X * Y**6 | 0 |
| Y**7 | −4.423264E−07 |
| X**8 | 3.395334E−07 |
| X**7 * Y | 0 |
| X**6 * Y**2 | 1.02412E−06 |
| X**5 * Y**3 | 0 |
| X**4 * Y**4 | 1.833997E−06 |
| X**3 * Y**5 | 0 |
| X**2 * Y**6 | −6.784795E−08 |
| X * Y**7 | 0 |
| Y**8 | 2.007252E−07 |
| X**9 | 0 |
| X**8 * Y | 6.109009E−08 |
| X**7 * Y**2 | 0 |
| X**6 * Y**3 | 2.276137E−07 |
| X**5 * Y**4 | 0 |
| X**4 * Y**5 | 5.020032E−07 |
| X**3 * Y**6 | 0 |
| X**2 * Y**7 | 1.907204E−07 |
| X * Y**8 | 0 |
| Y**9 | −3.622895E−09 |
| X**10 | −5.353813E−10 |
| X**9 * Y | 0 |
| X**8 * Y**2 | 6.208088E−09 |
| X**7 * Y**3 | 0 |
| X**6 * Y**4 | 1.946908E−08 |
| X**5 * Y**5 | 0 |
| X**4 * Y**6 | 3.927661E−08 |
| X**3 * Y**7 | 0 |
| X**2 * Y**8 | 1.962061E−08 |
| X * Y**9 | 0 |
| Y**10 | −1.204427E−09 |

Projection Image

Figure 43:
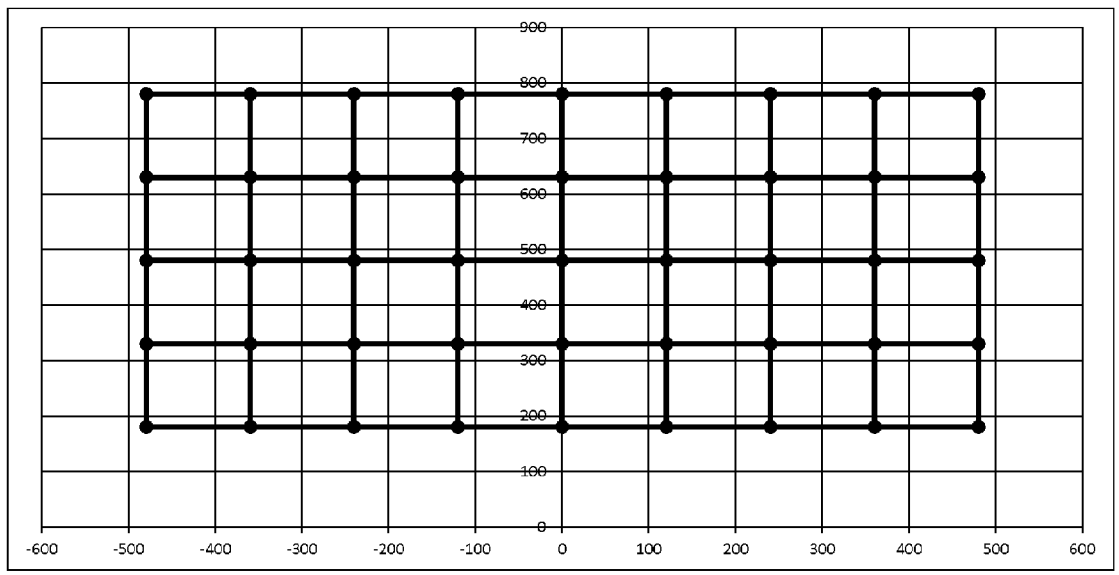
FIG. 43 shows a distortion lattice on the screen.
Figure 44:
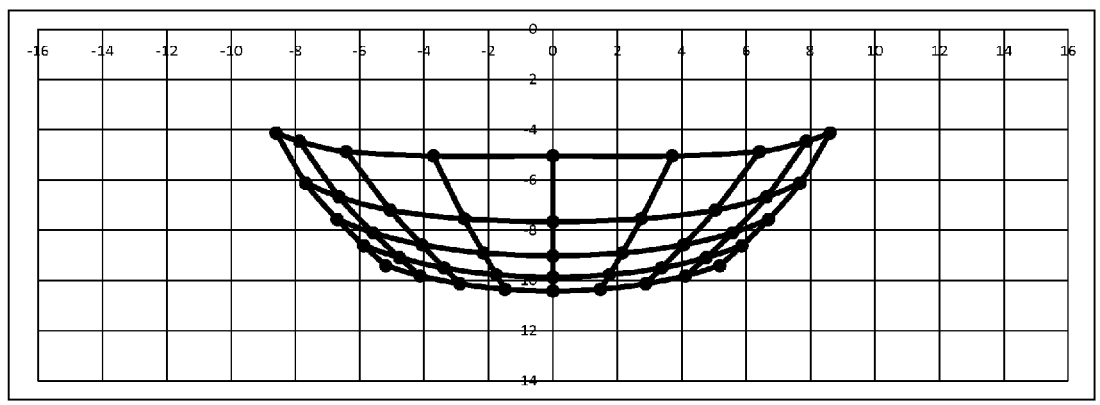
FIG. 44 shows a distortion lattice in the demagnifying-side image formation plane of the lens.

The projection image formed by the image formation section 2 will next be described. FIG. 43 shows a distortion lattice on the screen S. FIG. 44 shows the distortion lattice in the demagnifying-side image formation plane of the lens 3. The distortion lattice in the demagnifying-side image formation plane of the lens 3 is distorted but has no field curvature. The image formation section 2 forms a projection image that is an inverted final image turned upside down in the demagnifying-side image formation plane. The image formation section 2 forms an image distorted in advance in the demagnifying-side image formation plane of the lens 3 so that an oblong projection image is projected on the screen S, which is the magnifying-side image formation plane. That is, the image formation section 2 forms a distorted projection image corresponding to the distortion lattice shown in FIG. 44 in the demagnifying-side image formation plane so that a final image corresponding to the distortion lattice shown in FIG. 43 is projected on the screen S.

Lens Performance

Figure 45:
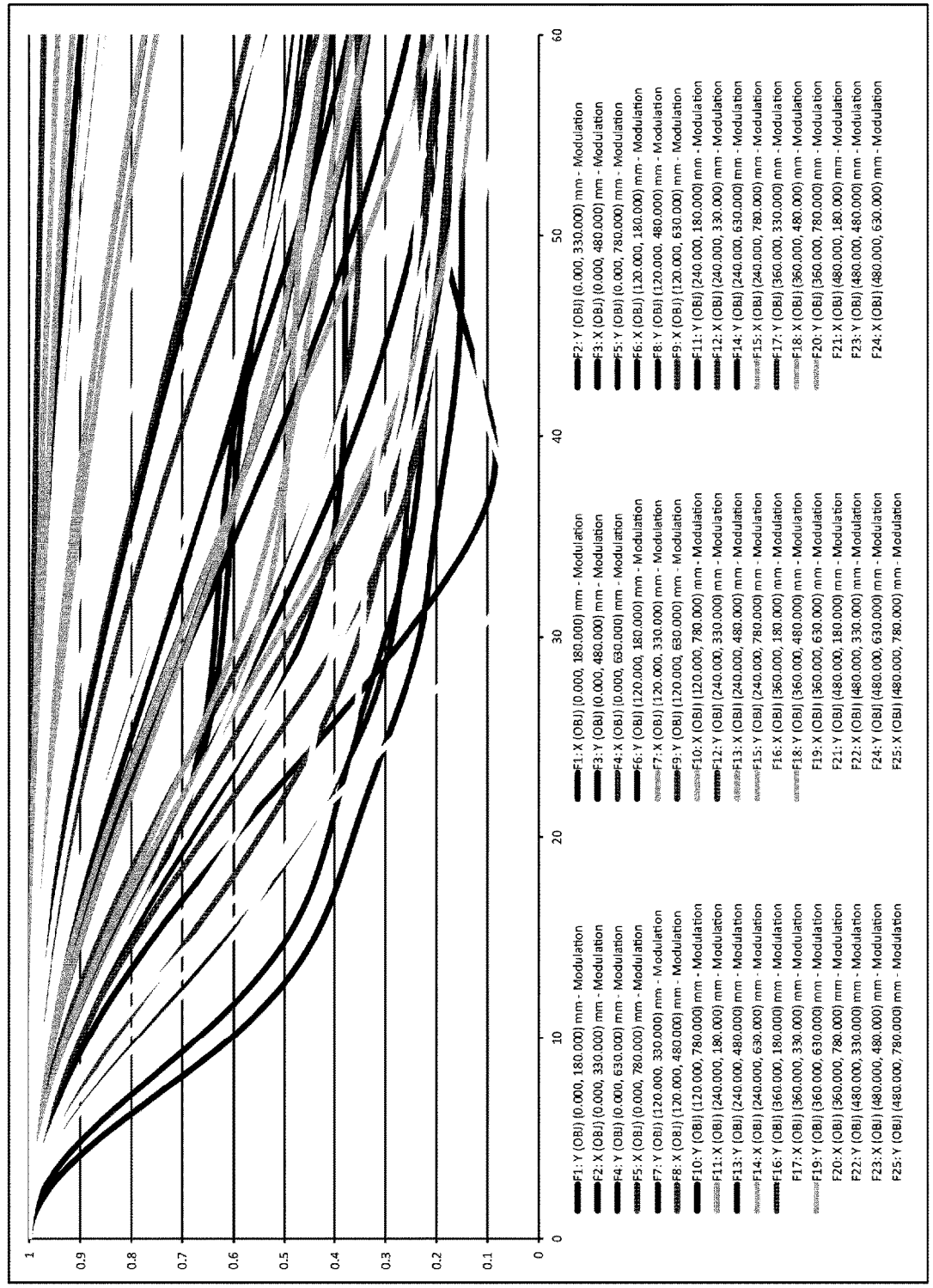
FIG. 45 shows an MTF of the lens according to Embodiment 5 on the demagnifying side.
Figure 46:
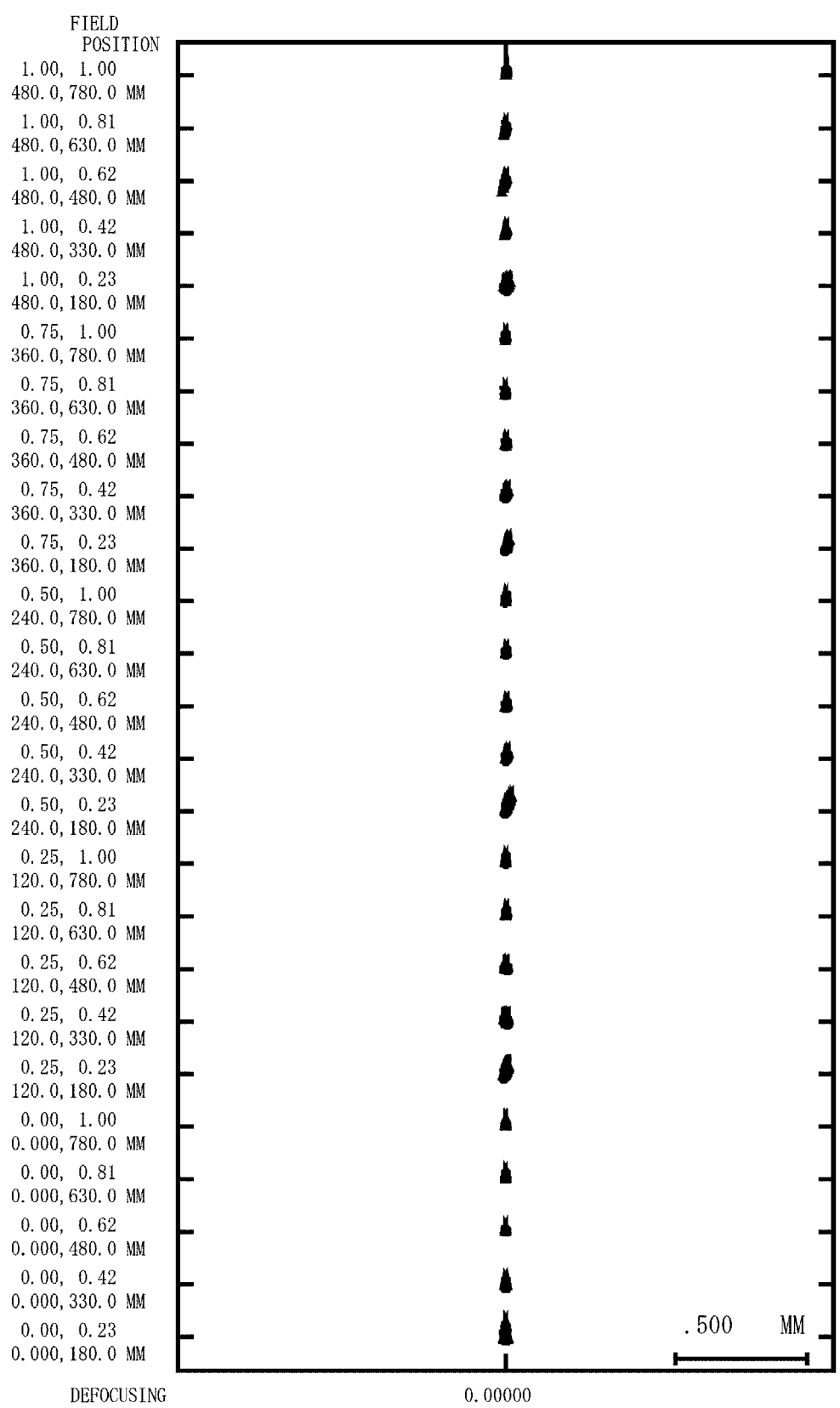
FIG. 46 is a spot diagram showing spots produced by the lens according to Embodiment 5.

In the present embodiment, the reflective surface 12 and the second transmissive surface 13 are each an aspheric surface. The amount of aberrations produced by the lens can therefore be suppressed. FIG. 45 shows the MTF of the lens 3 according to Embodiment 5 on the demagnifying side. The MTF was calculated in the same manners in the embodiment described above. FIG. 46 is a spot diagram showing spots produced by the lens 3 according to Embodiment 5. The MTF and the spot diagram show the same tendencies as those in Embodiment 1.

The lens 3 according to the present embodiment satisfies the following conditional expression (1).

$$0° < \theta < 90° + \gamma \qquad (1)$$

θ: Inclination angle over which an end of the imaginary line P facing the upper intersection 23 rotates counterclockwise relative to the imaginary vertical line V around the intersection of the imaginary vertical line V and the imaginary line P γ: angle from the imaginary axis L to the lower peripheral light ray 22b passing through the effective range 20 of the second transmissive surface 13 and intersects the imaginary axis L.

That is, in the present embodiment, the imaginary line P inclines by 21.4981° with respect to the imaginary vertical line V. In other words, the pupil inclines by 21.4981° with respect to the imaginary vertical line V. Therefore, θ=21.4981°, which satisfies the conditional expression (1).

In the present embodiment, in which the conditional expression (1) is satisfied, the pupil inclines with respect to the imaginary vertical line V. In the case where θ=0° in the conditional expression (1), the imaginary line P is perpendicular to the imaginary axis L. That is, the pupil is perpendicular to the design reference axis. In the case where θ is greater than the upper limit in the conditional expression (1), the lower-end light flux 22 is blocked. In the present embodiment, in which the conditional expression (1) is satisfied, the lower-end light flux 22 passing through the lower end of the effective range 20 of the second transmissive surface 13 is not blocked and reaches the screen S.

Further, since the lens 3 according to the present embodiment satisfies the conditional expression (1), a decrease of brightness at the upper periphery of the screen S can be suppressed, as compared with the case where the imaginary line P is parallel to the imaginary vertical line V. That is, when the pupil inclines with respect to the imaginary vertical line V, which is perpendicular to the imaginary line P, the divergence angle θ0 of each of the light fluxes that reach the upper portion of the screen S increases. The amount of light that reaches the upper portion of the screen S therefore increases. Further, when the divergence angle θ0 of each of the light fluxes that reach the upper portion of the screen S increases, the difference in the divergence angle θ0 between the light fluxes that reach the upper portion of the image formation plane and the light fluxes that reach the lower portion of the image formation plane decreases. The situation in which the amount of light at the upper periphery of the screen S is smaller than the amount of light at the lower periphery of the screen S can therefore be suppressed.

Data on the divergence angle θ0 of each of light fluxes F1 to F5, which reach the corresponding image heights on the screen S, are shown below. The angle θ1 is the angle of the lower peripheral light ray of each of the light fluxes F1 to F5 and is the angle at which the lower peripheral light ray of each of the light fluxes F1 to F5 intersects the screen S. The angle θ2 is the angle of the upper peripheral light ray of each of the light fluxes F1 to F5 and is the angle at which the upper peripheral light ray of each of the light fluxes F1 to F5 intersects the screen S. The angle θ0 is the divergence angle and is the difference between θ2 and θ1. Reference character R denotes the divergence angle ratio. The divergence angle ratio is the proportion assuming that the divergence angle of the light flux F2, which has the highest divergence angle, is 100%.

| Light flux | θ1 | θ2 | θ0 | R |
|---|---|---|---|---|
| F1 | 64.50 | 64.97 | 0.47 | 100% |
| F2 | 73.83 | 74.10 | 0.26 | 56% |
| F3 | 78.24 | 78.42 | 0.18 | 38% |
| F4 | 80.78 | 80.91 | 0.13 | 28% |
| F5 | 82.44 | 82.52 | 0.08 | 17% |

In the present embodiment, the divergence angle θ0 of the light flux F5, which reaches the highest image height position, is 17% of the divergence angle θ0 of the light flux F1, which reaches the lowest image height position. The divergence angle θ0 of the light flux F4, which reaches the second highest image height position, is 28% of the divergence angle θ0 of the light flux F1, which reaches the lowest image height position. The divergence angle θ0 of the light flux F3, which reaches the third highest image height position, is 38% of the divergence angle θ0 of the light flux F1, which reaches the lowest image height position. The divergence angle θ0 of the light flux F2, which reaches the fourth highest image height position, is 56% of the divergence angle θ0 of the light flux F1, which reaches the lowest image height position. These values are greater than those when the imaginary line P is perpendicular to the imaginary axis L, that is, as compared with the values in the projection-type image display apparatus 100 according to Comparative Embodiment. The amount of light of the light fluxes that reach the upper portion of the screen S therefore increases.

Other Embodiments

In the embodiments described above, the lens 3 is made of resin. The lens 3 can instead be made of glass. In the case where the lens 3 is made of glass, the lens 3 can be processed with high precision as compared with the case where the lens 3 is made of resin. Further, when the lens 3 is made of glass, the amount of expansion of the lens 3 can be suppressed when the temperature of the lens 3 rises due to internal absorption of light, as compared with the case where the lens 3 is made of resin. A lens made of glass can therefore maintain the optical performance of the lens and improve the reliability thereof even when the high luminance light is incident to the lens 3.

In each of Embodiments 1 to 5 described above, the lens 3 may be provided with a light shield. In this case, as shown in FIGS. 4, 19, 26, 33 and 41 by dotted lines, a light shield 15 blocks light rays that incline with respect to the imaginary line P and do not fall within the effective range through which the imaginary line P passes. Stray light produced in the lens 3 can thus be avoided. The light shield 15 can be provided by forming a cutout in the lens 3 and filling the cutout with ink. Further, the lens 3 may be divided along the imaginary line P into divided surfaces, and the light shield 15 may be provided on each of the divided surfaces. The divided lenses 3 may then be bonded to each other.

Figure 47:
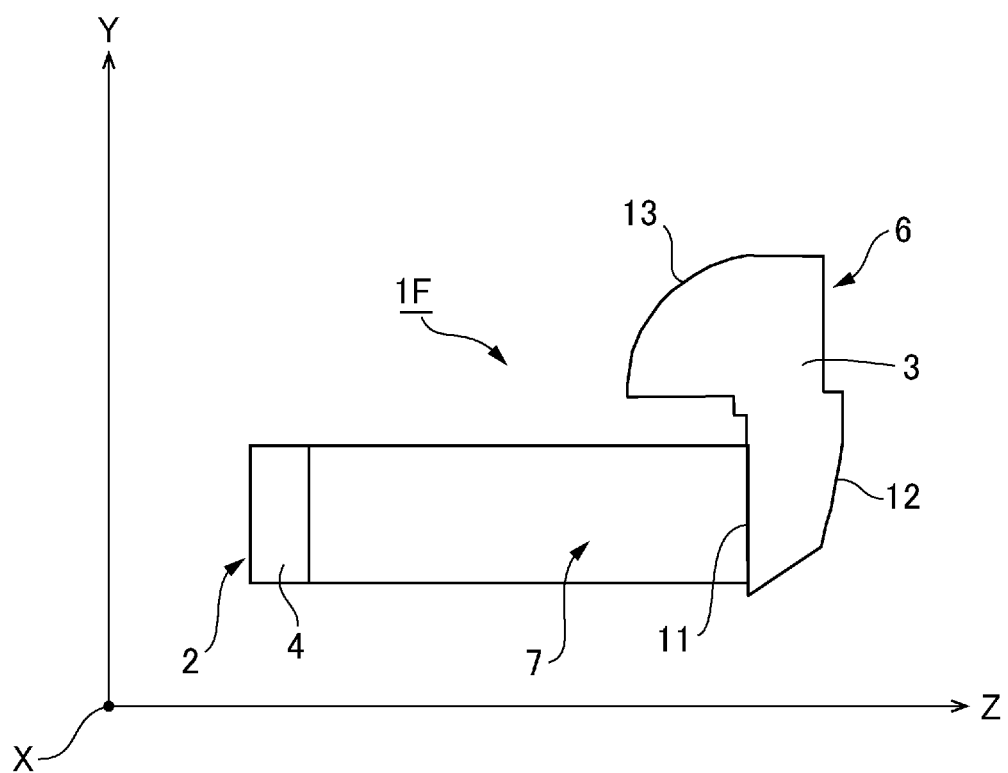
FIG. 47 describes a projection-type image display apparatus according to a variation.

FIG. 47 describes a projection-type image display apparatus according to a variation. In each of Embodiments 1 to 5 described above, the liquid crystal light valve 4 of the image formation section 2 is attached to the first transmissive surface 11 of the lens 3. Instead, in a projection-type image display apparatus 1F according to the variation shown in FIG. 47, an optical system is provided between the image formation section 2 and the lens 3. That is, the projection-type image display apparatus 1F according to the variation includes a first optical system 6, a second optical system 7, and the image formation section 2 and projects a projection image displayed by the image formation section 2 via the second optical system 7 and the first optical system 6. The first optical system 6 is the lens 3. The second optical system 7 disposed between the lens 3 and the image formation section 2 can be a refractive optical system including one or some lenses or a reflective optical system including one or some reflection mirrors.

The lens 3 according to the present embodiment can be used as an imaging optical system. In this case, an imaging device, such as a CCD, is disposed in the demagnifying-side image formation plane of the lens 3. The light shield 15 is provided in the lens 3. In the case where the lens 3 is used as an imaging optical system, a distorted image is formed in the demagnifying-side image formation plane. The distortion of the image can, however, be corrected by image processing performed on a signal from the imaging device.

What is claimed is:

1. A lens comprising:
a first transmissive surface, a reflective surface, and a second transmissive surface sequentially arranged from a demagnifying side toward a magnifying side,
wherein three axes perpendicular to one another are called axes X, Y, and Z, with an axis-Z direction being a direction in which the first transmissive surface and the reflective surface are arranged, a plane YZ being a plane perpendicular to the axis X and containing the axes Y and Z,
an imaginary axis extends in the axis-Z direction in the plane YZ,
the plane YZ has an upper side and a lower side, the upper side being one side that is above the imaginary axis in the axis Y, the lower side being another side that is below the imaginary axis in the axis Y,
the first transmissive surface and the reflective surface are located at the lower side,
the second transmissive surface is located at the upper side of the imaginary axis,
the reflective surface has a concave shape,
the second transmissive surface has an effective range and a convex shape protruding toward the magnifying side,
the effective range has an axis-Y-direction upper end and an axis-Y-direction lower end, the axis-Y-direction upper end being a part of the effective range that is farthest from the imaginary axis in the axis Y, the axis-Y-direction lower end being a part of the effective range that is closest to the imaginary axis in the axis Y,
an imaginary line that connects an upper intersection to a lower intersection inclines with respect to an imaginary vertical line perpendicular to the imaginary axis in the plane YZ,
the upper intersection is an intersection where an upper peripheral light ray of an upper-end light flux and an upper peripheral light ray of a lower-end light flux intersect with each other in the plane YZ,
the upper-end light flux is a light ray passing through the axis-Y-direction upper end,
the lower-end light flux a light ray passing through the axis-Y-direction lower end,
the upper peripheral light ray of the upper-end light flux being a part of the upper-end light flux that is farthest from the imaginary axis,
the upper peripheral light ray of the upper peripheral light ray of a lower-end light flux being a part of the lower-end light flux that is farthest from the imaginary axis,
the lower intersection being an intersection where a lower peripheral light ray of the upper-end light flux and a lower peripheral light ray of the lower-end light flux intersect with each other in the plane YZ,
the lower peripheral light ray of the upper-end light flux being a part of the upper-end light flux that is closest to the imaginary axis, and
the lower peripheral light ray of lower-end light flux being a part of the lower-end light flux that is closest to the imaginary axis.

2. The lens according to claim 1,
wherein the first transmissive surface, the reflective surface, and the second transmissive surface form a coaxial optical system having surfaces rotationally symmetric with respect to the imaginary axis, and
the imaginary axis is a design reference axis.

3. A projection-type image display apparatus comprising:
the lens according to claim 2; and
a display that displays a projection image in a demagnifying-side image formation plane of the lens.

4. A projection-type image display apparatus comprising:
a first optical system;
a second optical system; and
a display,
wherein the first optical system is the lens according to claim 2,
the second optical system is disposed between the first optical system and the display, and
a projection image displayed by the display is projected via the second optical system and the first optical system.

5. The lens according to claim 1,
wherein the lens satisfies a conditional expression below, $$0°<\theta<90°+\gamma \quad (1)$$

where $\theta$ is an inclination angle over which an end of the imaginary line facing the upper intersection rotates counterclockwise relative to the imaginary vertical line around an intersection of the imaginary vertical line and the imaginary line, and $\gamma$ is an angle from the imaginary axis to the lower peripheral light ray, which is a light ray of the lower-end light flux and intersects the imaginary axis.

6. The lens according to claim 5,
wherein the lens satisfies a conditional expression (2) below:

$$90°<\theta \quad (2).$$

7. A projection-type image display apparatus comprising:
the lens according to claim 6; and
a display that displays a projection image in a demagnifying-side image formation plane of the lens.

8. A projection-type image display apparatus comprising:
a first optical system;
a second optical system; and
a display,
wherein the first optical system is the lens according to claim 6,
the second optical system is disposed between the first optical system and the display, and
a projection image displayed by the display is projected via the second optical system and the first optical system.

9. A projection-type image display apparatus comprising:
the lens according to claim 5; and
a display that displays a projection image in a demagnifying-side image formation plane of the lens.

10. A projection-type image display apparatus comprising:
a first optical system;
a second optical system; and
a display,
wherein the first optical system is the lens according to claim 5,
the second optical system is disposed between the first optical system and the display, and
a projection image displayed by the display is projected via the second optical system and the first optical system.

11. The lens according to claim 1, wherein any of the first transmissive surface, the reflective surface, and the second transmissive surface is an aspheric surface.

12. A projection-type image display apparatus comprising:
the lens according to claim 11; and
a display that displays a projection image in a demagnifying-side image formation plane of the lens.

13. A projection-type image display apparatus comprising:
a first optical system;
a second optical system; and
a display,
wherein the first optical system is the lens according to claim 11,
the second optical system is disposed between the first optical system and the display, and
a projection image displayed by the display is projected via the second optical system and the first optical system.

14. The lens according to claim 1, further comprising a light shield that blocks light rays that incline with respect to the imaginary line and do not fall within the effective range through which the imaginary line passes.

15. The lens according to claim 1, wherein any of the first transmissive surface, the reflective surface, and the second transmissive surface is a free-form surface.

16. A projection-type image display apparatus comprising:
the lens according to claim 15; and
a display that displays a projection image in a demagnifying-side image formation plane of the lens.

17. A projection-type image display apparatus comprising:
a first optical system;
a second optical system; and
a display,
wherein the first optical system is the lens according to claim 15,
the second optical system is disposed between the first optical system and the display, and
a projection image displayed by the display is projected via the second optical system and the first optical system.

18. A projection-type image display apparatus comprising:
the lens according to claim 1; and
a display that displays a projection image in a demagnifying-side image formation plane of the lens.

19. A projection-type image display apparatus comprising:
a first optical system;
a second optical system; and
a display,
wherein the first optical system is the lens according to claim 1,
the second optical system is disposed between the first optical system and the display, and
a projection image displayed by the display is projected via the second optical system and the first optical system.

* * * * *